(12) United States Patent
Yamada et al.

(10) Patent No.: US 10,007,099 B2
(45) Date of Patent: Jun. 26, 2018

(54) VARIABLE-MAGNIFICATION OPTICAL SYSTEM, IMAGING OPTICAL DEVICE, AND DIGITAL APPLIANCE

(71) Applicant: KONICA MINOLTA, INC., Chiyoda-ku (JP)

(72) Inventors: Keiko Yamada, Chiyoda-ku (JP); Yoshihito Souma, Chiyoda-ku (JP)

(73) Assignee: Konica Minolta, Inc., Tokyo (JP)

(*) Notice: Subject to any disclaimer, the term of this patent is extended or adjusted under 35 U.S.C. 154(b) by 29 days.

(21) Appl. No.: 15/183,494

(22) Filed: Jun. 15, 2016

(65) Prior Publication Data
US 2016/0291299 A1  Oct. 6, 2016

Related U.S. Application Data

(62) Division of application No. 14/298,351, filed on Jun. 6, 2014, now Pat. No. 9,395,524.

(30) Foreign Application Priority Data

Jun. 10, 2013 (JP) .................. 2013-122084
Sep. 30, 2013 (JP) .................. 2013-203918

(51) Int. Cl.
*G02B 27/64* (2006.01)
*G02B 15/14* (2006.01)
(Continued)

(52) U.S. Cl.
CPC .......... *G02B 15/173* (2013.01); *G02B 13/009* (2013.01); *G02B 15/14* (2013.01);
(Continued)

(58) Field of Classification Search
CPC ........ G02B 15/00; G02B 15/14; G02B 15/15; G02B 15/16; G02B 15/163; G02B 15/173;
(Continued)

(56) References Cited

U.S. PATENT DOCUMENTS 5,000,549 A * 3/1991 Yamazaki ............ G02B 15/161
  359/557
5,185,678 A * 2/1993 Arimoto .............. G02B 15/173
  359/683
(Continued)

FOREIGN PATENT DOCUMENTS

JP  09-230240    9/1997
JP  2009-265655  11/2009
(Continued)

*Primary Examiner* — Thong Nguyen
(74) *Attorney, Agent, or Firm* — Cozen O'Connor

(57) ABSTRACT

A variable-magnification optical system has five lens groups, namely, from object side, positive, negative, positive, positive, and negative lens groups, and achieves magnification variation by varying all axial distances between the lens groups. Focusing is achieved by moving the fourth lens group along an optical axis. Vibration correction is achieved by moving all or part of the fifth lens group perpendicularly to the optical axis. Fulfilled are formulae $4.0<|f1/f2|<6.0$, $1.0<f4/f1<1.5$, and $2.0<|f4/fv|<4.0$, f1 representing a focal length of the first lens group, f2 a focal length of the second lens group, f4 a focal length of the fourth lens group, and fv a focal length of the vibration correction group.

10 Claims, 33 Drawing Sheets

(51) Int. Cl.
  *G02B 15/173* (2006.01)
  *G02B 15/22* (2006.01)
  *G02B 13/00* (2006.01)
  *G02B 15/20* (2006.01)
  *H04N 5/232* (2006.01)

(52) U.S. Cl.
  CPC .............. *G02B 15/20* (2013.01); *G02B 15/22* (2013.01); *G02B 27/646* (2013.01); *H04N 5/23245* (2013.01); *H04N 5/23296* (2013.01); *G02B 27/64* (2013.01)

(58) Field of Classification Search
  CPC ........ G02B 15/20; G02B 15/22; G02B 27/64; G02B 27/646
  See application file for complete search history.

(56) References Cited

U.S. PATENT DOCUMENTS

| | | | | |
|---|---|---|---|---|
| 5,241,420 | A * | 8/1993 | Yamanashi | G02B 15/173 359/676 |
| 5,638,210 | A * | 6/1997 | Sato | G02B 15/173 359/557 |
| 6,246,519 | B1 * | 6/2001 | Suzuki | G02B 15/17 359/554 |
| 8,514,496 | B2 | 8/2013 | Kato | |
| 2009/0251794 | A1 | 10/2009 | Adaci et al. | |
| 2010/0284092 | A1 * | 11/2010 | Hayakawa | G02B 15/173 359/683 |
| 2011/0007403 | A1 * | 1/2011 | Matsuo | G02B 15/173 359/684 |
| 2012/0242887 | A1 * | 9/2012 | Matsumura | G02B 15/173 348/345 |
| 2012/0262797 | A1 | 10/2012 | Sugita | |
| 2014/0211029 | A1 * | 7/2014 | Okumura | G02B 15/173 348/208.11 |

FOREIGN PATENT DOCUMENTS

| | | |
|---|---|---|
| JP | 2009-271471 | 11/2009 |
| JP | 2011-221422 | 11/2011 |
| JP | 2012-014005 | 1/2012 |
| JP | 2012-225987 | 11/2012 |

\* cited by examiner

FIG.3
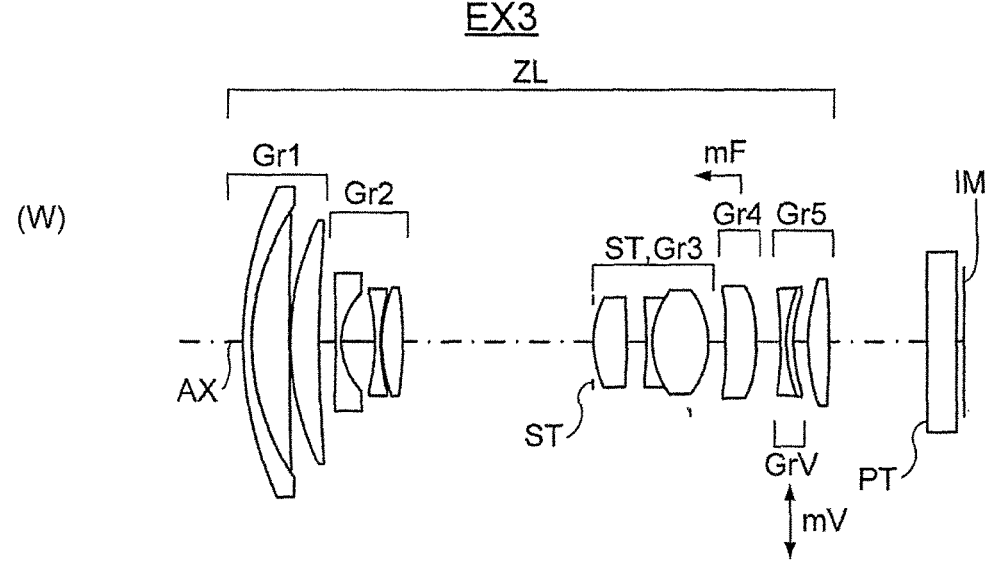
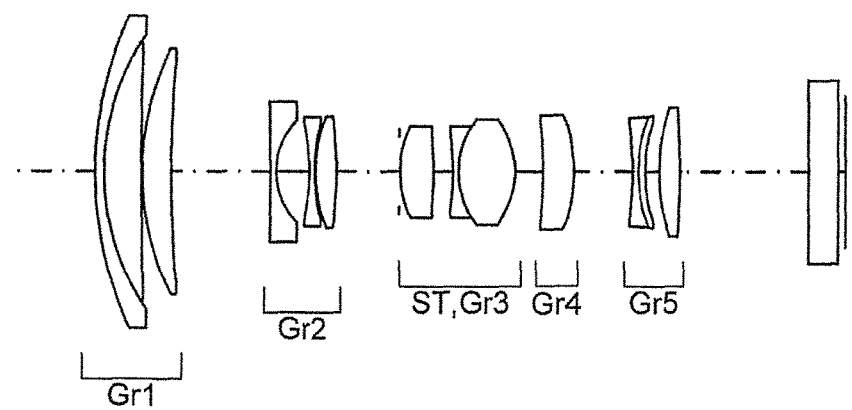
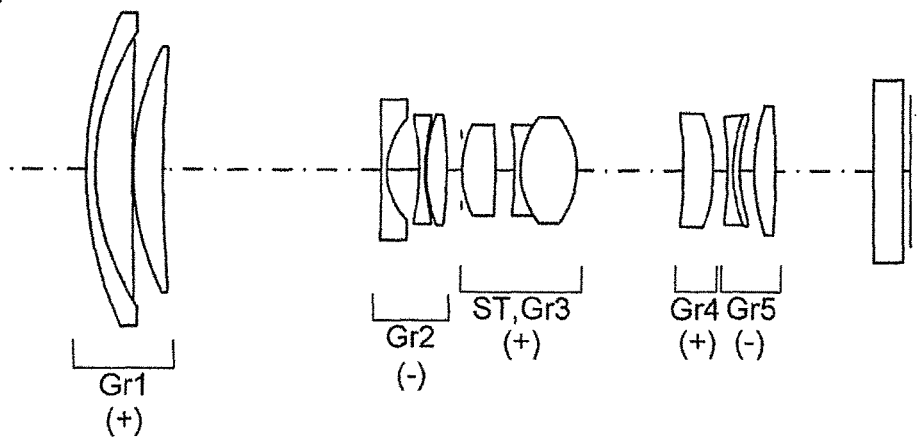

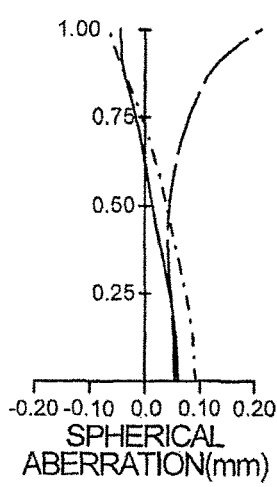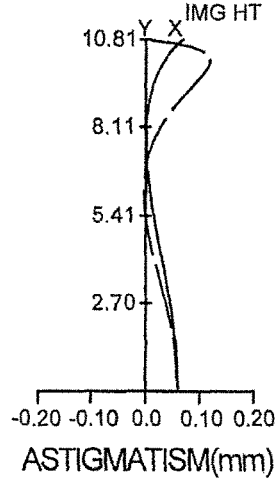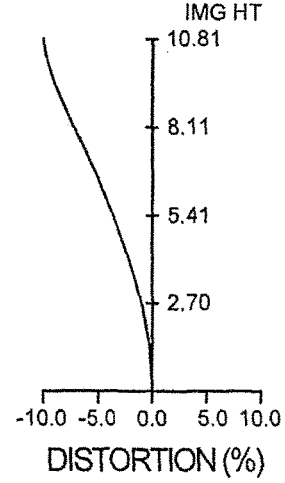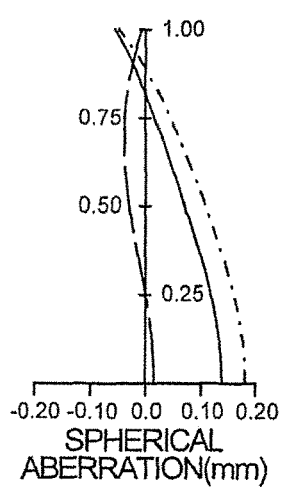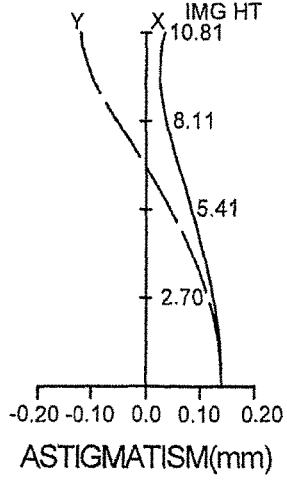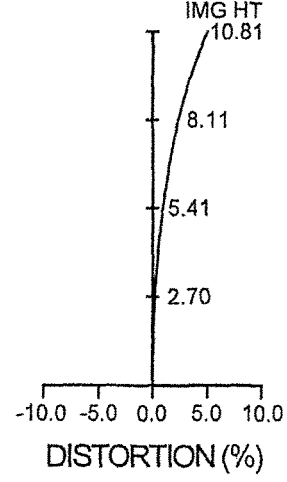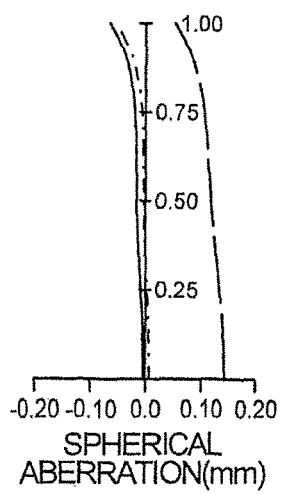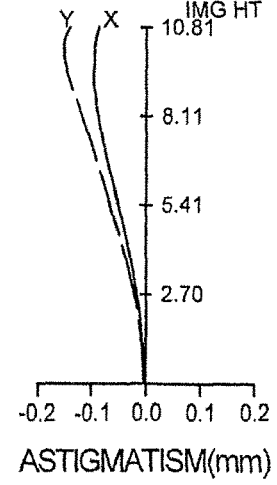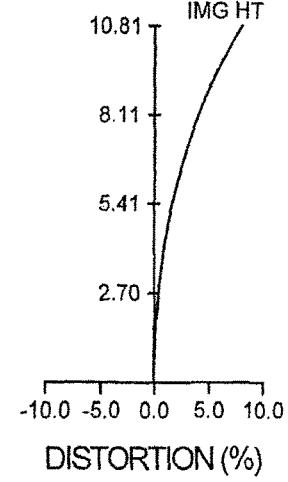

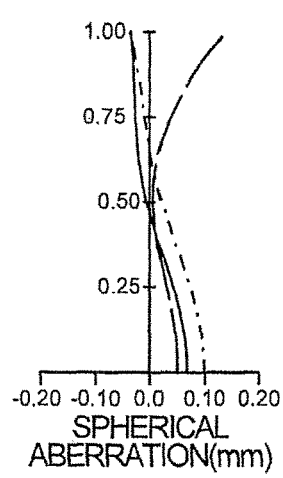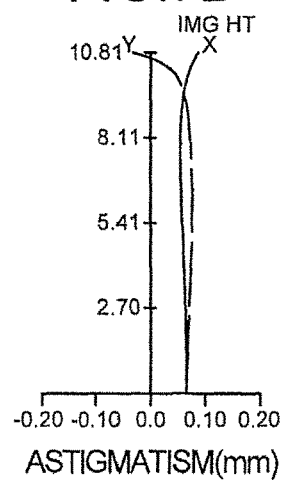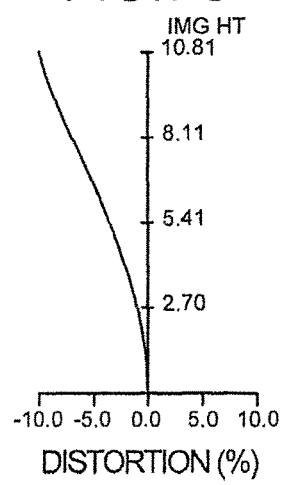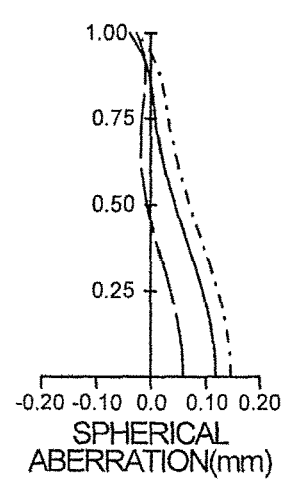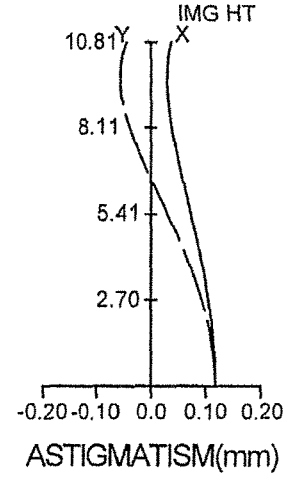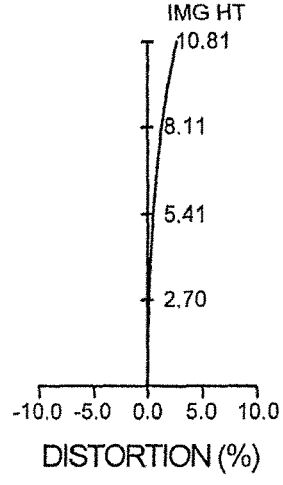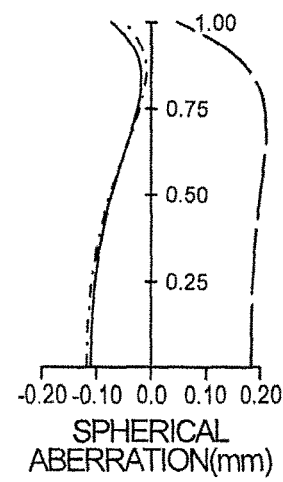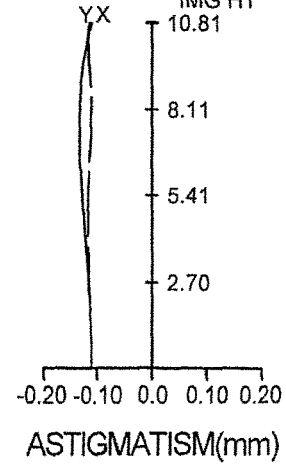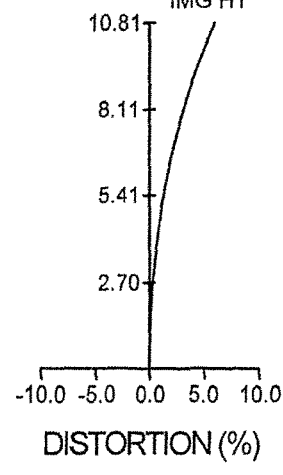

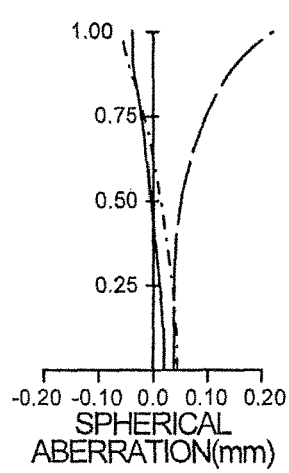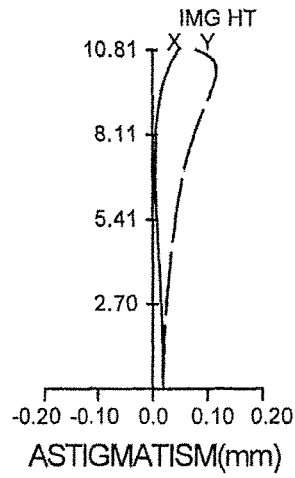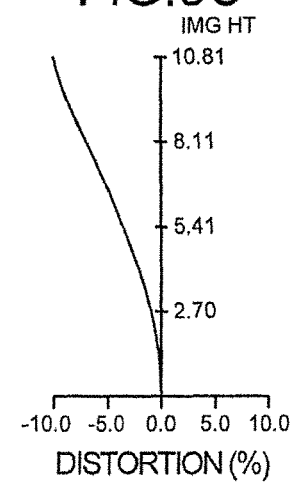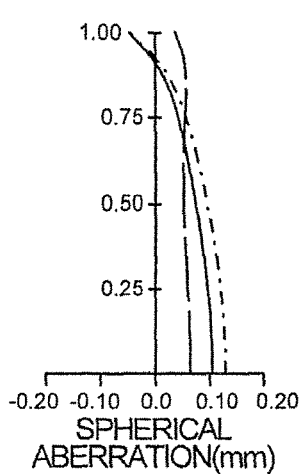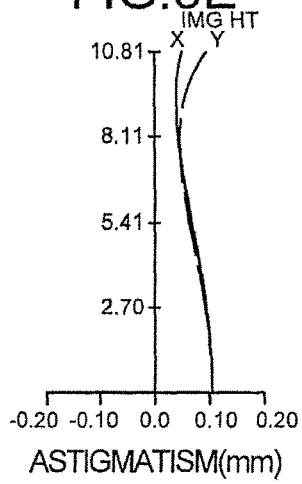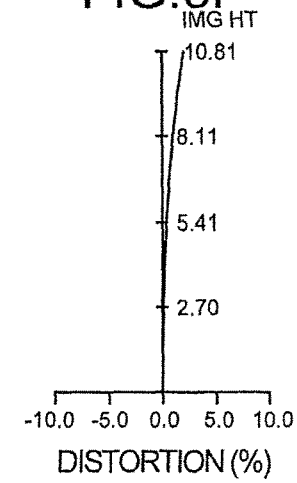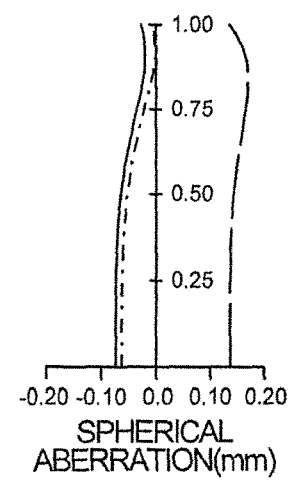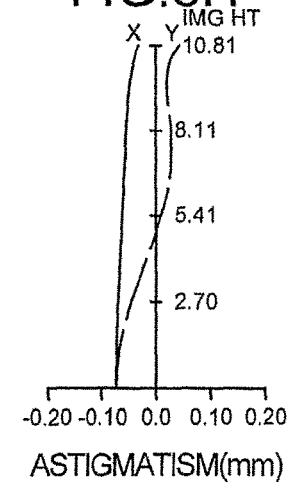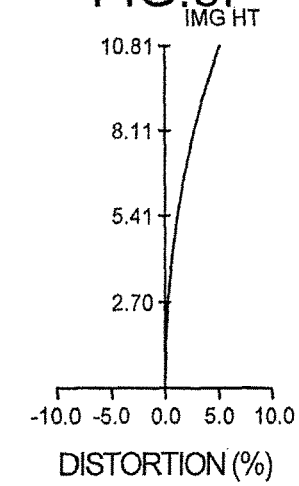

FIG.9A
FIG.9D
TANGENTIAL 1.00 RELATIVE FIELD HEIGHT (37.18°) SAGITTAL
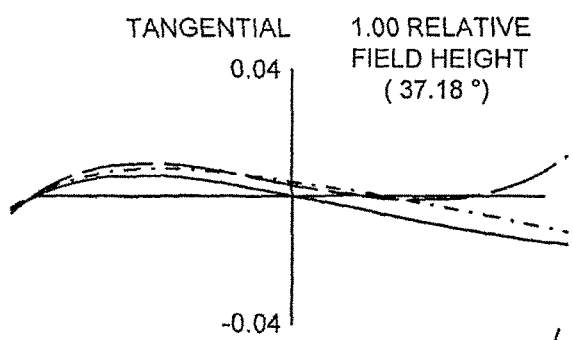
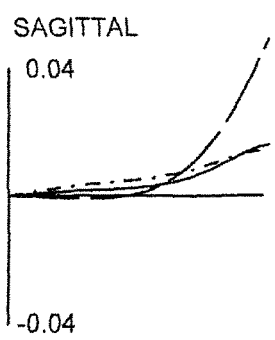
FIG.9B
FIG.9E
0.50 RELATIVE FIELD HEIGHT (20.77°)
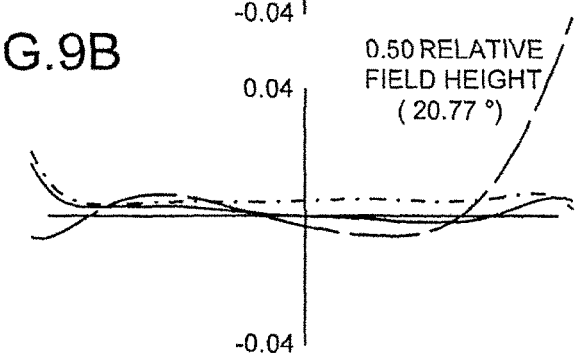
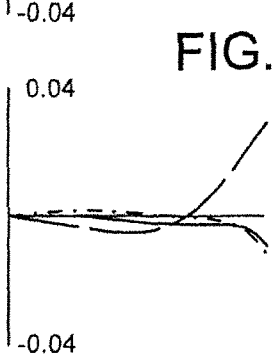
FIG.9C
FIG.9F
0.00 RELATIVE FIELD HEIGHT (0.000°)
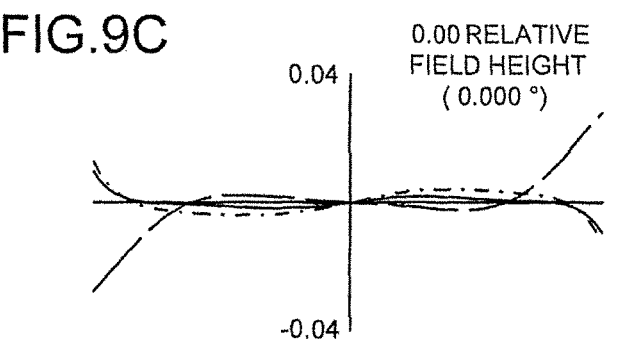
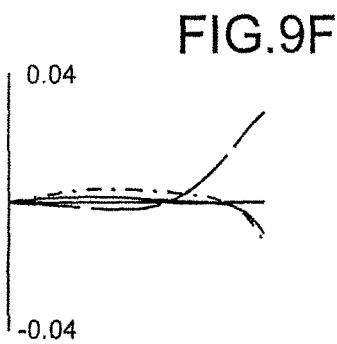

TANGENTIAL
1.00 RELATIVE FIELD HEIGHT
( 16.06 °)

SAGITTAL 0.50 RELATIVE FIELD HEIGHT
( 8.189 °)

0.00 RELATIVE FIELD HEIGHT
( 0.000 °)

TANGENTIAL
1.00 RELATIVE FIELD HEIGHT (6.232°)

SAGITTAL 0.50 RELATIVE FIELD HEIGHT (3.125°)

0.00 RELATIVE FIELD HEIGHT (0.000°)

FIG.12A
FIG.12D
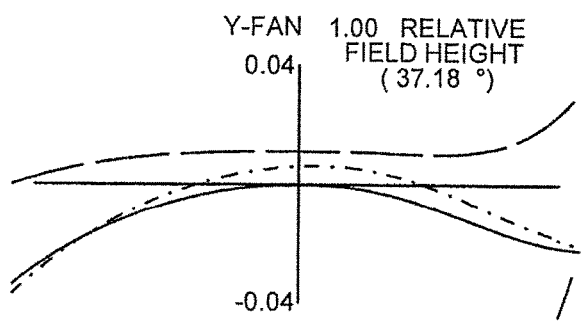
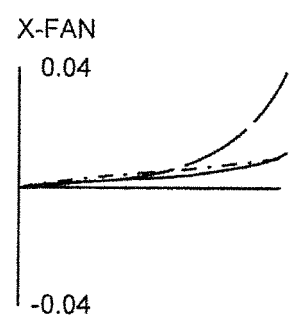
FIG.12B
FIG.12E
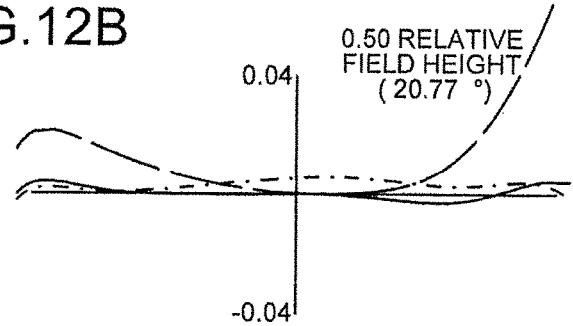
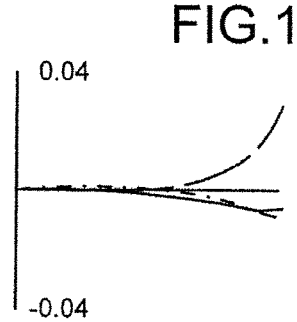
FIG.12C
FIG.12F
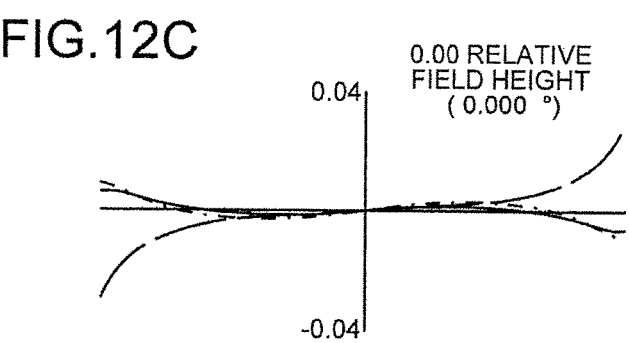
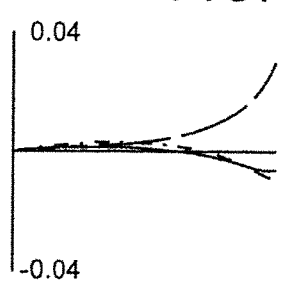

FIG.14A
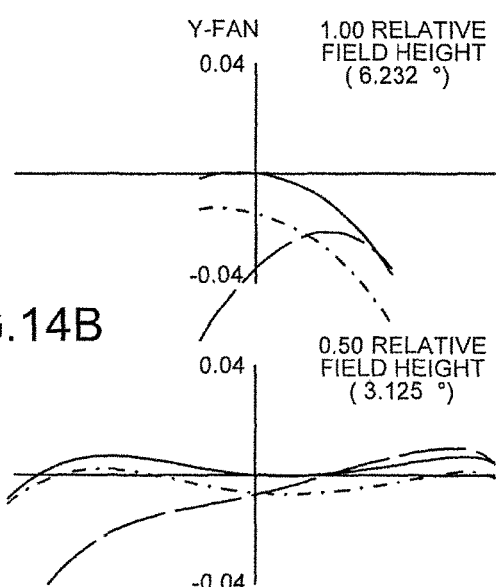
FIG.14B
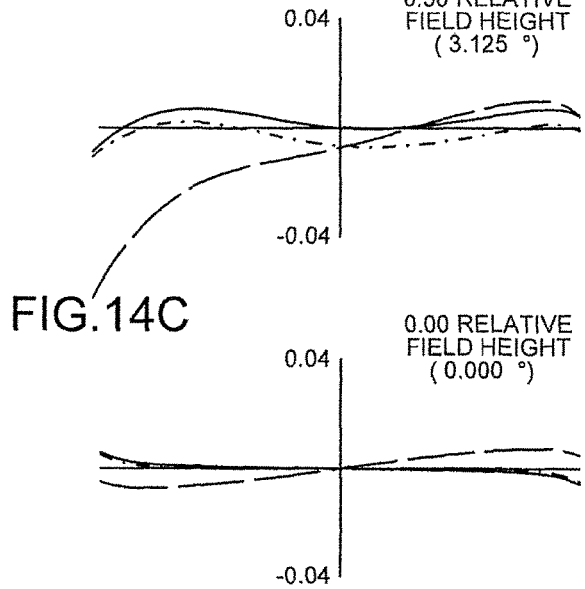
FIG.14C
FIG.14D
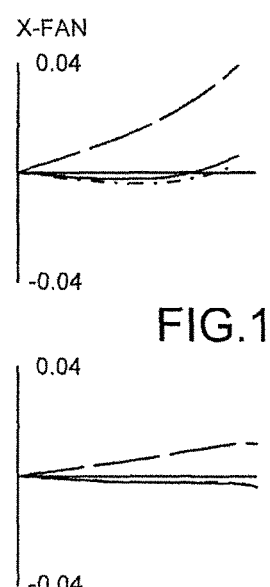
FIG.14E
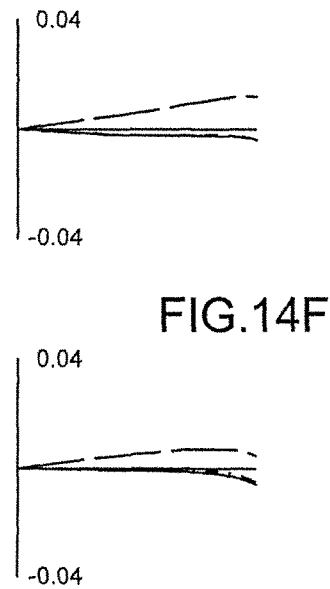
FIG.14F FIG.17A
FIG.17D
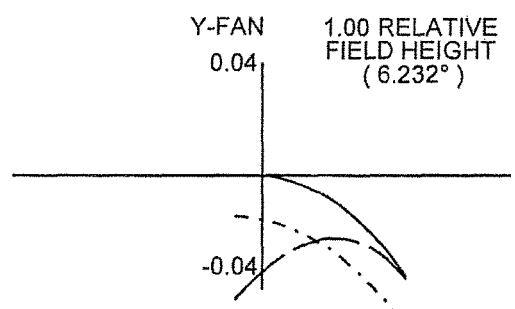
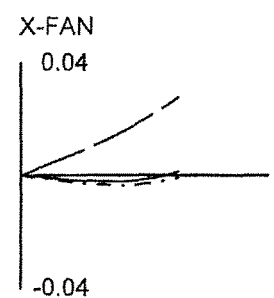
FIG.17B
FIG.17E
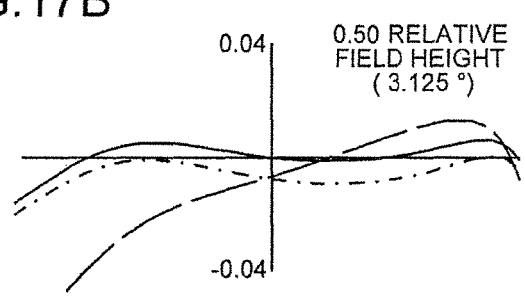
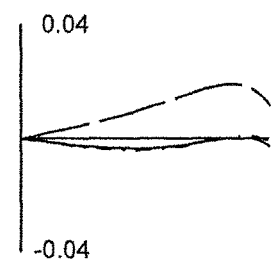
FIG.17C
FIG.17F
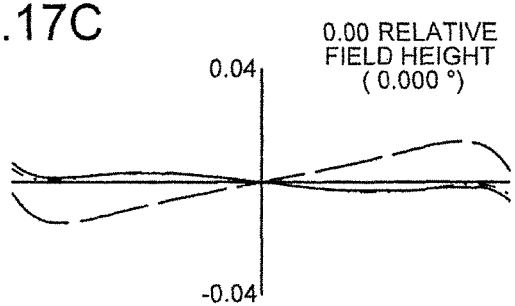
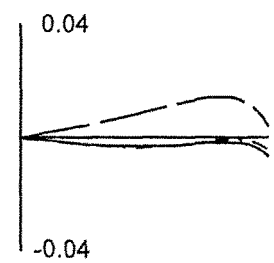

FIG.19A
FIG.19D
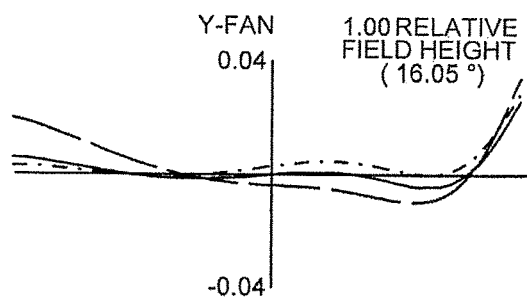
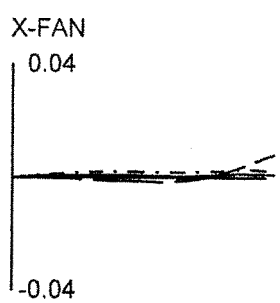
FIG.19B
FIG.19E
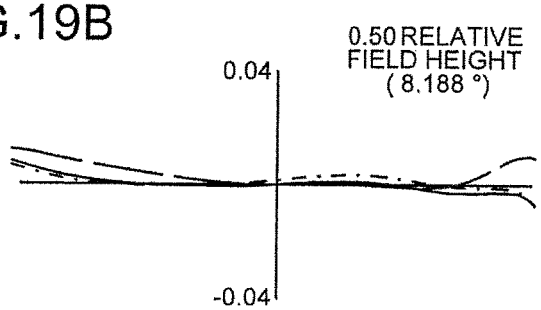
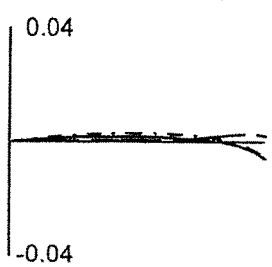
FIG.19C
FIG.19F
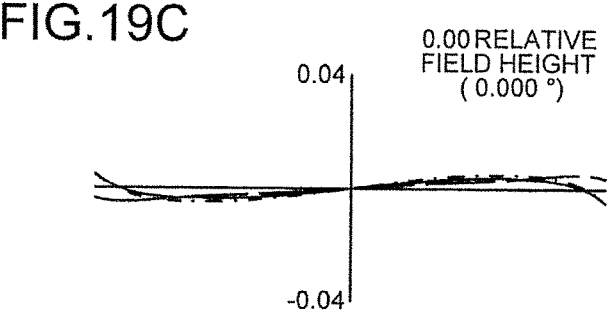
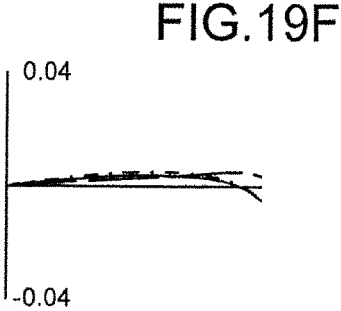

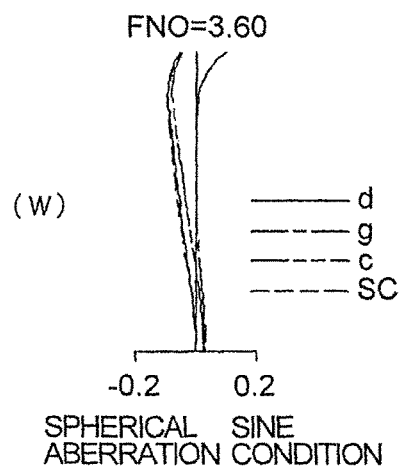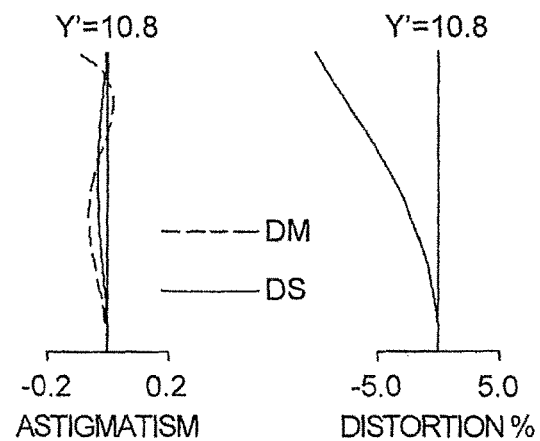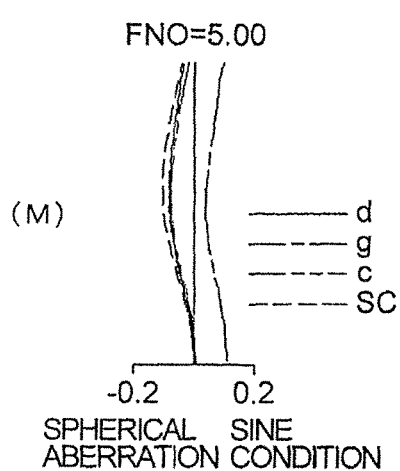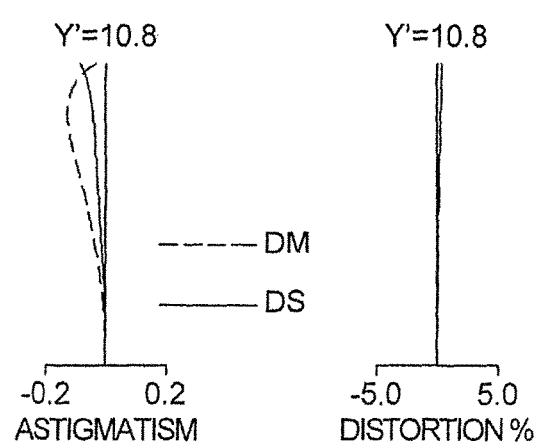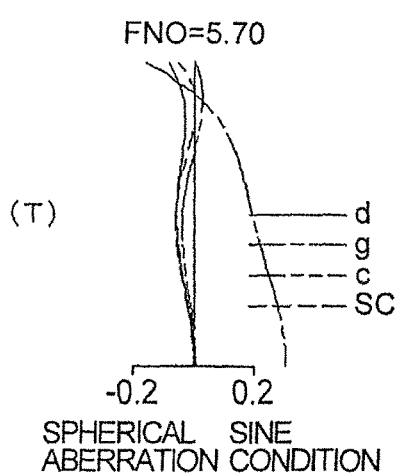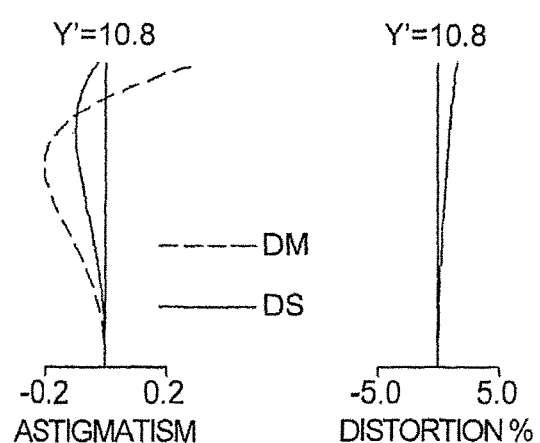

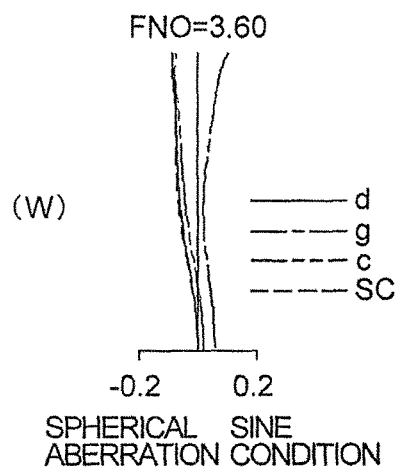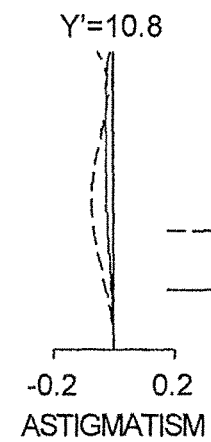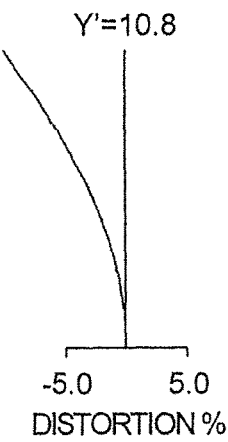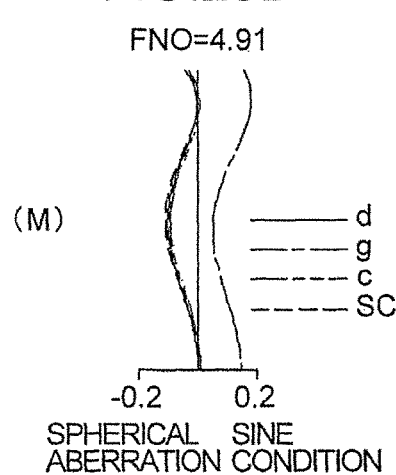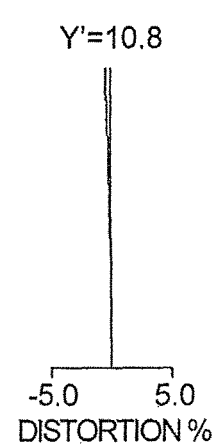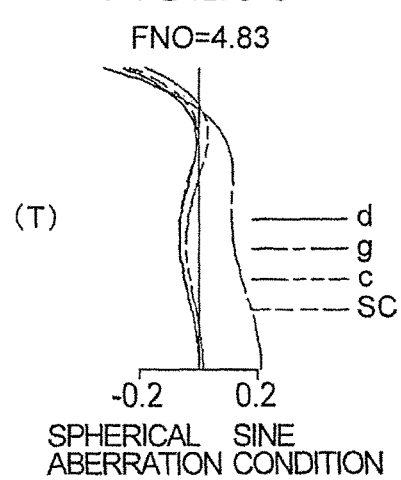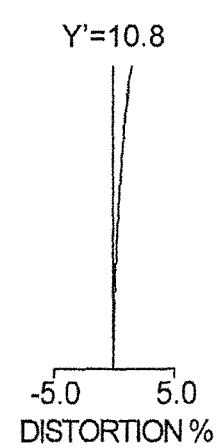

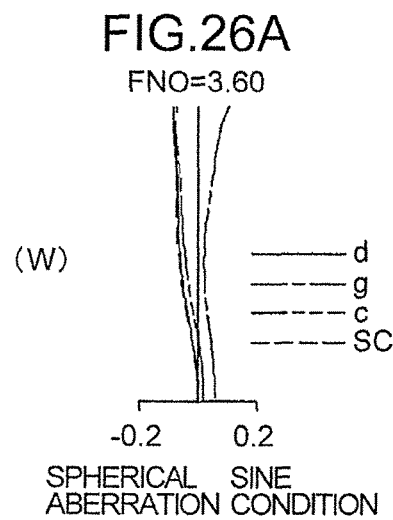
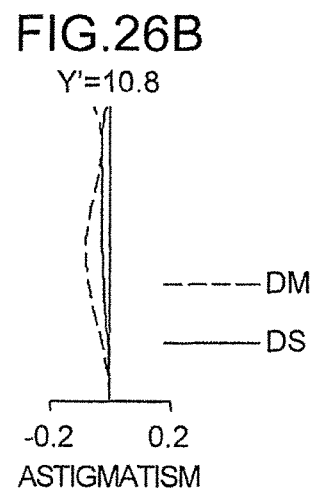
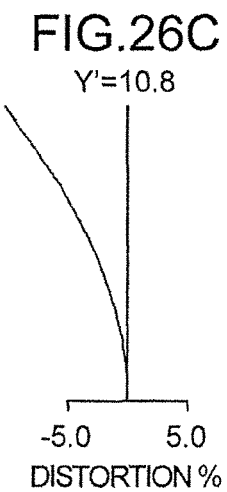
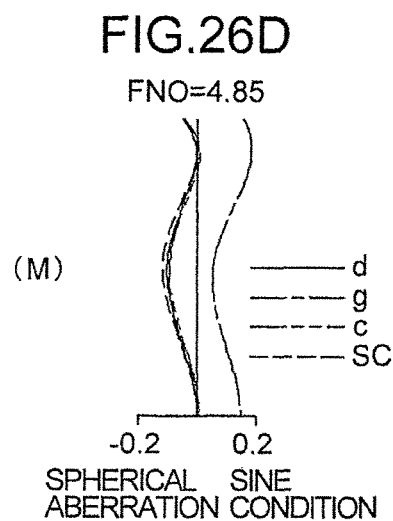
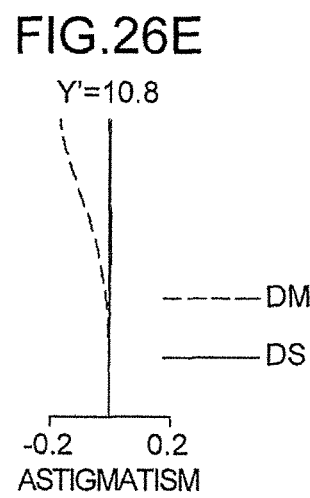
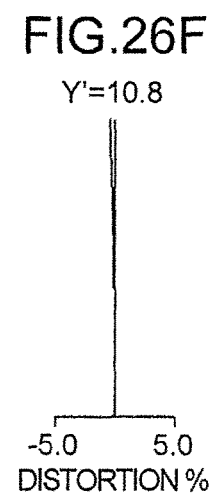
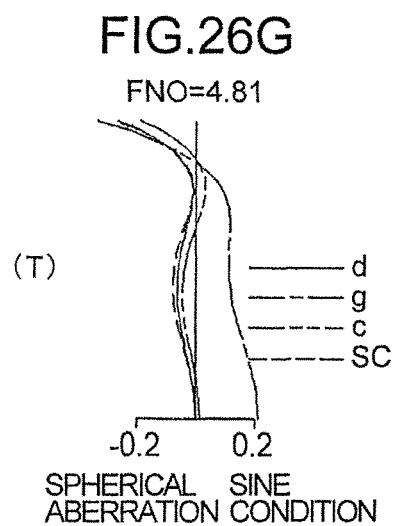

VARIABLE-MAGNIFICATION OPTICAL SYSTEM, IMAGING OPTICAL DEVICE, AND DIGITAL APPLIANCE

This application is a divisional of U.S. patent application Ser. No. 14/298,351 filed Jun. 6, 2014, now U.S. Pat. No. 9,395,524, which claims priority of Japanese Patent Application No. 2013-122084 filed on Jun. 10, 2013 and Japanese Patent Application No. 2013-203918 filed on Sep. 30, 2013, the contents of both of which are hereby incorporated by reference.

BACKGROUND OF THE INVENTION

1. Field of the Invention

The present invention relates to a variable-magnification optical system, an imaging optical device, and a digital appliance. More particularly, the present invention relates to, for example, a compact variable-magnification optical system suitable for use in an interchangeable-lens digital camera that takes in an image of a subject with an image sensing device, an imaging optical device that outputs an image of a subject taken in with such a variable-magnification optical system and an image sensing device in the form of an electric signal, and a digital appliance having an image input function, such as a digital camera, that is provided with such an imaging optical device.

2. Description of Related Art

In recent years, mirrorless interchangeable-lens digital cameras, which have no swing-up mirror as are provided in single-lens reflex cameras, have found acceptance among users and gained an increasingly large market. Some mirrorless interchangeable-lens digital cameras cannot adopt phase-difference AF (automatic focusing), which is the mainstream in conventional single-lens reflex cameras; those cameras have to adopt so-called contrast AF, whereby focusing is achieved by scanning for the highest-contrast position with a focusing lens group.

Here, the weight of the focusing group matters. With phase-difference AF, the amount of movement of the focusing group needed to achieve focusing can be calculated based on information from an AF sensor, and thus the focusing group can be moved according to the calculated amount. By contrast, with contrast AF, only the contrast values at given moments can be obtained from an AF sensor; thus, while the focusing group is moved, and meanwhile how the contrast value varies from one moment to another is read, the highest-contract position is searched for to achieve focusing. Thus, the amount of movement of the focusing group needed to achieve focusing is far larger with contrast AF than with phase-difference AF.

From the above perspective, in a variable-magnification optical system designed to be compatible with contrast AF, a reduced weight of the focusing group is a great advantage (for example, see Patent Documents 1 and 2 identified below). In conventional variable-magnification optical systems for use as interchangeable lenses for single-lens reflex cameras, for example, a positive-negative-positive-positive zoom type as disclosed in Patent Document 3 and a positive-negative-positive-negative-positive zoom type as disclosed in Patent Document 4 are the mainstream. However, from the above perspective, the focusing groups in the lens systems disclosed in Patent Documents 3 and 4 are not satisfactorily light. Thus, new optical solutions are being sought.

Patent Document 1: Japanese Patent Application Publication No. 2012-14005

Patent Document 2: Japanese Patent Application Publication No. 2012-225987

Patent Document 3: Japanese Patent Application Publication No. 2009-271471

Patent Document 4: Japanese Patent Application Publication No. 2011-221422

In the zoom lens system disclosed in Patent Document 1 mentioned above, the second lens group is used as a focusing group, and is not satisfactorily light as a focusing group. In the zoom lens system disclosed in Patent Document 2, the fourth lens group which is composed of a single lens element having a negative optical power is used as a focusing group, and is significantly light as a focusing group. Here, the second lens group in an ordinary positive-negative-positive-positive type zoom lens system is divided into a positive, a negative, and a positive sub groups to set apart the focusing group. In a zoom lens system that includes, from the object side, a positive, a negative, a positive, . . . lens group, magnification variation action ascribable to variation in the distances between the first and second lens groups and between the second and third lens groups accounts for the large part of the magnification variation action of the entire optical system. However, in the construction disclosed in Patent Document 2, as a result of the second lens group being divided, the second to fifth lens groups produce a low zoom ratio, and thus the sixth lens group needs to produce the large part of the desired zoom ratio. Obtaining the desired zoom ratio, therefore, requires an increased total optical length at the telephoto end.

In the lens systems disclosed in Patent Documents 3 and 4, a reduction in the weight of the focusing group may be achieved by performing focusing with a lens group located to the image side of the third lens group which has a small lens diameter. However, in the lens system disclosed in Patent Document 3, the fourth lens group serves for vibration correction, and therefore, arranging a focusing mechanism close to the fourth lens group results in a drive mechanism for focusing and a drive mechanism for vibration correction being arranged close together, which can be disadvantageous from the viewpoint of space efficiency Conventionally, a vibration correction function is incorporated exclusively in comparatively telephoto-oriented lens systems. However, as zoom lens systems are designed for increasingly high magnifications, more and more zoom lens systems now incorporate a vibration correction function. In this trend, in recent years, even low-magnification zoom lens systems have come to incorporate a vibration correction function. There are also available imaging devices that achieve vibration correction by moving an image sensor on a plane perpendicular to the optical axis. Thus, a vibration correction function is acquiring the status of almost a standard function.

SUMMARY OF THE INVENTION

Against the background discussed above, an object of the present invention is to provide a variable-magnification optical system that has a lightweight focusing group combined with a vibration correction function and that can be made compact in terms of the total optical length, and to provide an imaging optical device and a digital appliance provided with such a variable-magnification optical system.

According to one aspect of the present invention, a variable-magnification optical system includes, from the object side, a first lens group having a positive optical power, a second lens group having a negative optical power, a third lens group having a positive optical power, a fourth lens group having a positive optical power, and a fifth lens group having a negative optical power. The variable-magnification optical system achieves magnification variation from the wide-angle end to the telephoto end by varying all the axial distances between the lens groups. The variable-magnification optical system achieves focusing by moving the fourth lens group as a focusing group along an optical axis. The variable-magnification optical system achieves vibration correction by moving all or part of the fifth lens group as a vibration correction group in a direction perpendicular to the optical axis. Moreover, Formulae (1) to (3) below are fulfilled:

$$4.0<|f1/f2|<6.0 \quad (1)$$

$$1.0<f4/f1<1.5 \quad (2)$$

$$2.0<|f4/fv|<4.0 \quad (3)$$

where f1 represents the focal length of the first lens group;
f2 represents the focal length of the second lens group;
f4 represents the focal length of the fourth lens group; and
fv represents the focal length of the vibration correction group.

According to another aspect of the present invention, a variable-magnification optical system includes, from the object side, a first lens group having a positive optical power, a second lens group having a negative optical power, a third lens group having a positive optical power, a fourth lens group having a positive optical power, and a fifth lens group having a negative optical power. The variable-magnification optical system achieves magnification variation by varying axial distances between the lens groups. The variable-magnification optical system achieves focusing by moving the fourth lens group along the optical axis. The variable-magnification optical system achieves vibration correction by moving a sub group including the most image-side lens element within the second lens group on a plane perpendicular to the optical axis. Moreover, Formula (7) below is fulfilled:

$$M/N<0.5 \quad (7)$$

where

M represents a number of lens elements composing the sub group; and
N represents a number of lens elements composing the second lens group, lens elements constituting a doublet lens element being counted individually.

According to yet another aspect of the present invention, an imaging optical device includes a variable-magnification optical system as described above and an image sensing device for converting an optical image formed on its light-receiving surface into an electrical signal, and the variable-magnification optical system is arranged such that an optical image of a subject is formed on the light-receiving surface of the image sensing device.

According to still another aspect of the present invention, a digital appliance includes an imaging optical device as described above so as to additionally have at least one of a function of taking a still image of a subject and a function of taking a moving image of a subject.

BRIEF DESCRIPTION OF THE DRAWINGS

FIG. 3 comprises optical construction diagrams of a third embodiment (Example 3) of the present invention;

FIGS. 6A to 6I are longitudinal aberration diagrams of Example 2;

FIGS. 7A to 7I are longitudinal aberration diagrams of Example 3;

FIGS. 8A to 8I are longitudinal aberration diagrams of Example 4;

FIGS. 9A to 9F are lateral aberration diagram of Example 1, at the wide-angle end;

FIGS. 12A to 12F are lateral aberration diagram of Example 2, at the wide-angle end;

FIGS. 14A to 14F are lateral aberration diagram of Example 2, at the telephoto end;

FIGS. 17A to 17F are lateral aberration diagram of Example 3, at the telephoto end;

FIGS. 19A to 19F are lateral aberration diagram of Example 4, at the middle focal length;

FIGS. 24A to 24I are longitudinal aberration diagrams of Example 5;

FIGS. 25A to 25I are longitudinal aberration diagrams of Example 6;

FIGS. 26A to 26I are longitudinal aberration diagrams of Example 7;

DETAILED DESCRIPTION OF PREFERRED EMBODIMENTS

Figure 1:
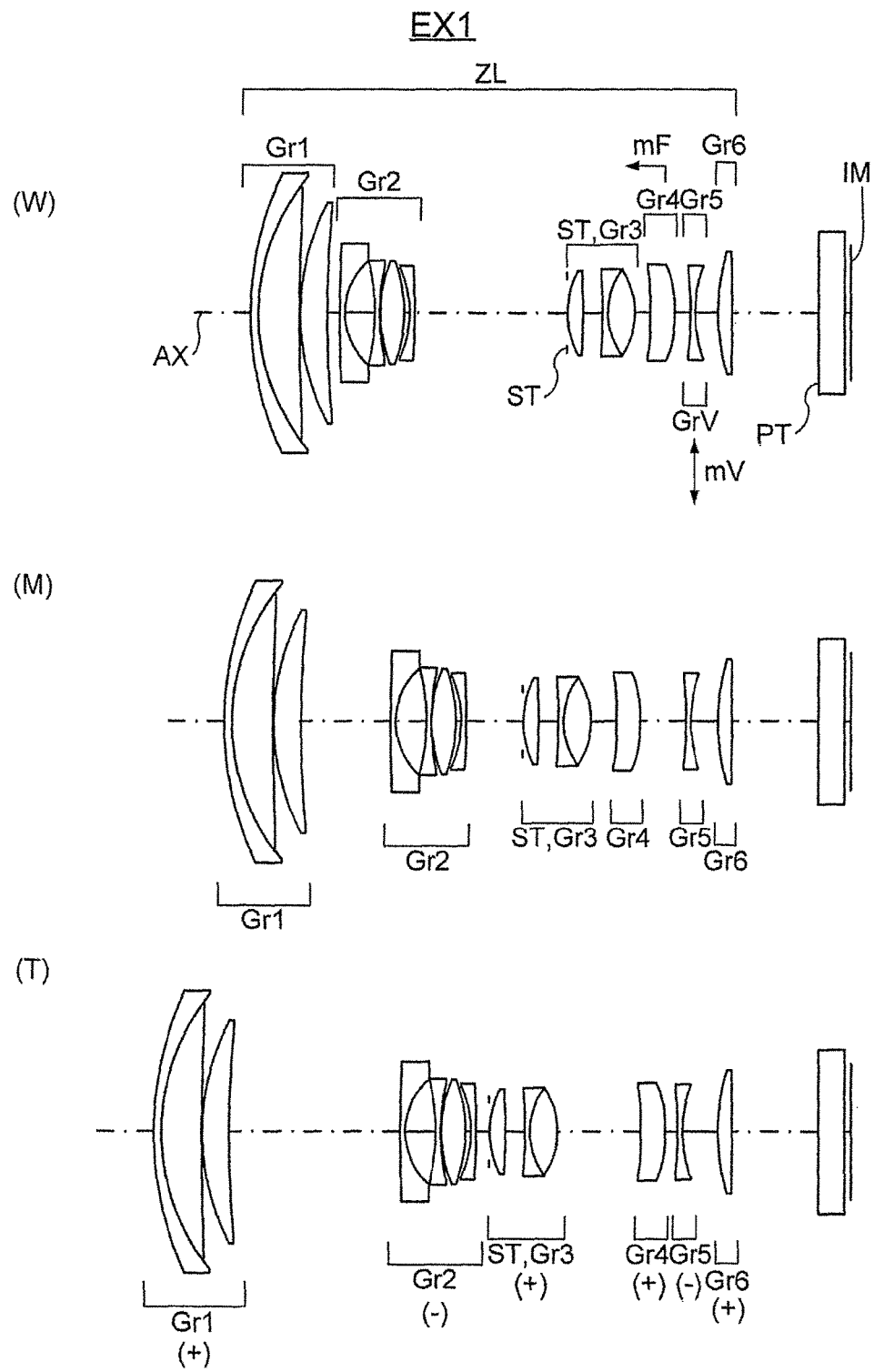
FIG. 1 comprises optical construction diagrams of a first embodiment (Example 1) of the present invention.
Figure 2:
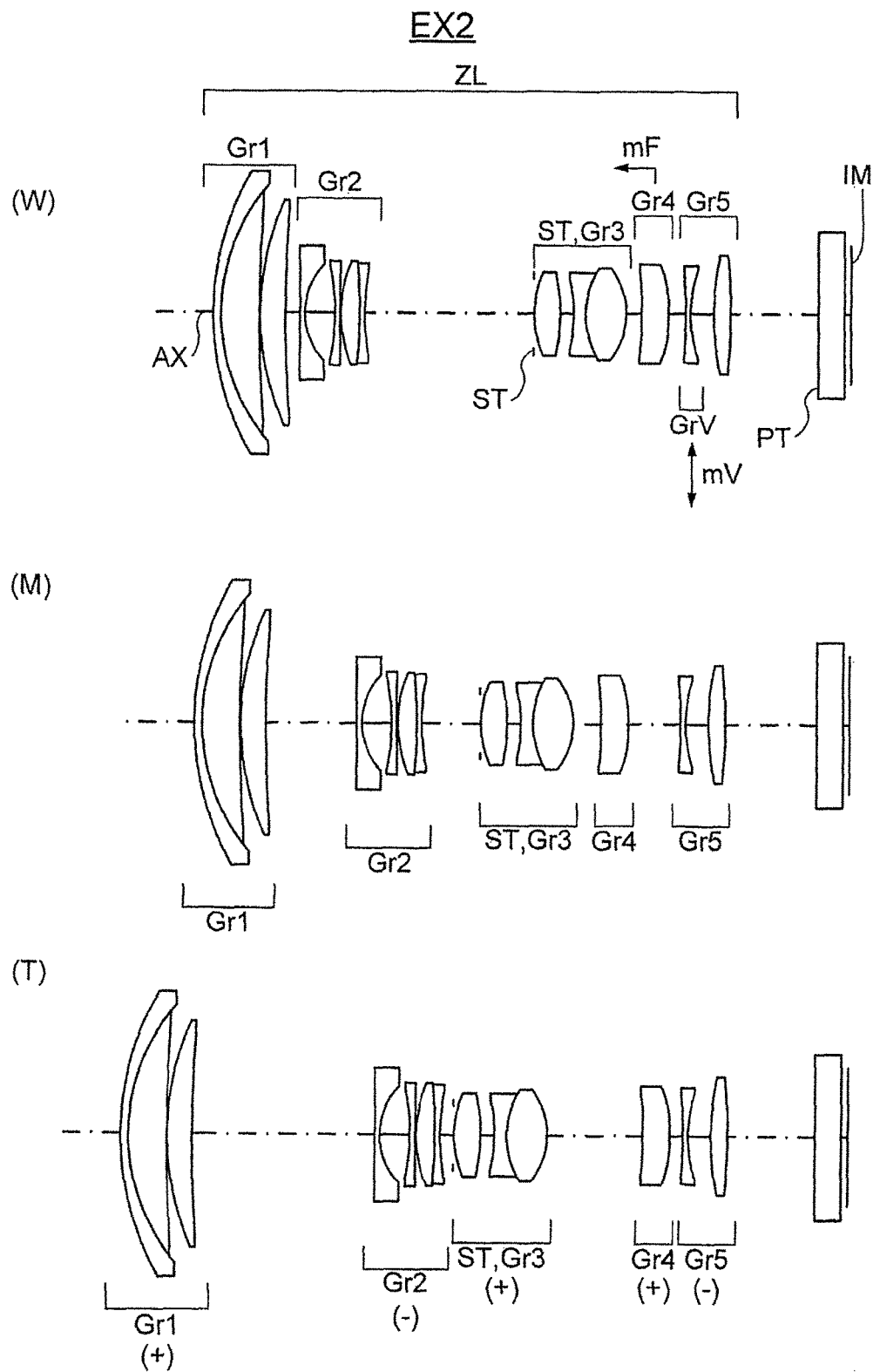
FIG. 2 comprises optical construction diagrams of a second embodiment (Example 2) of the present invention.
Figure 4:
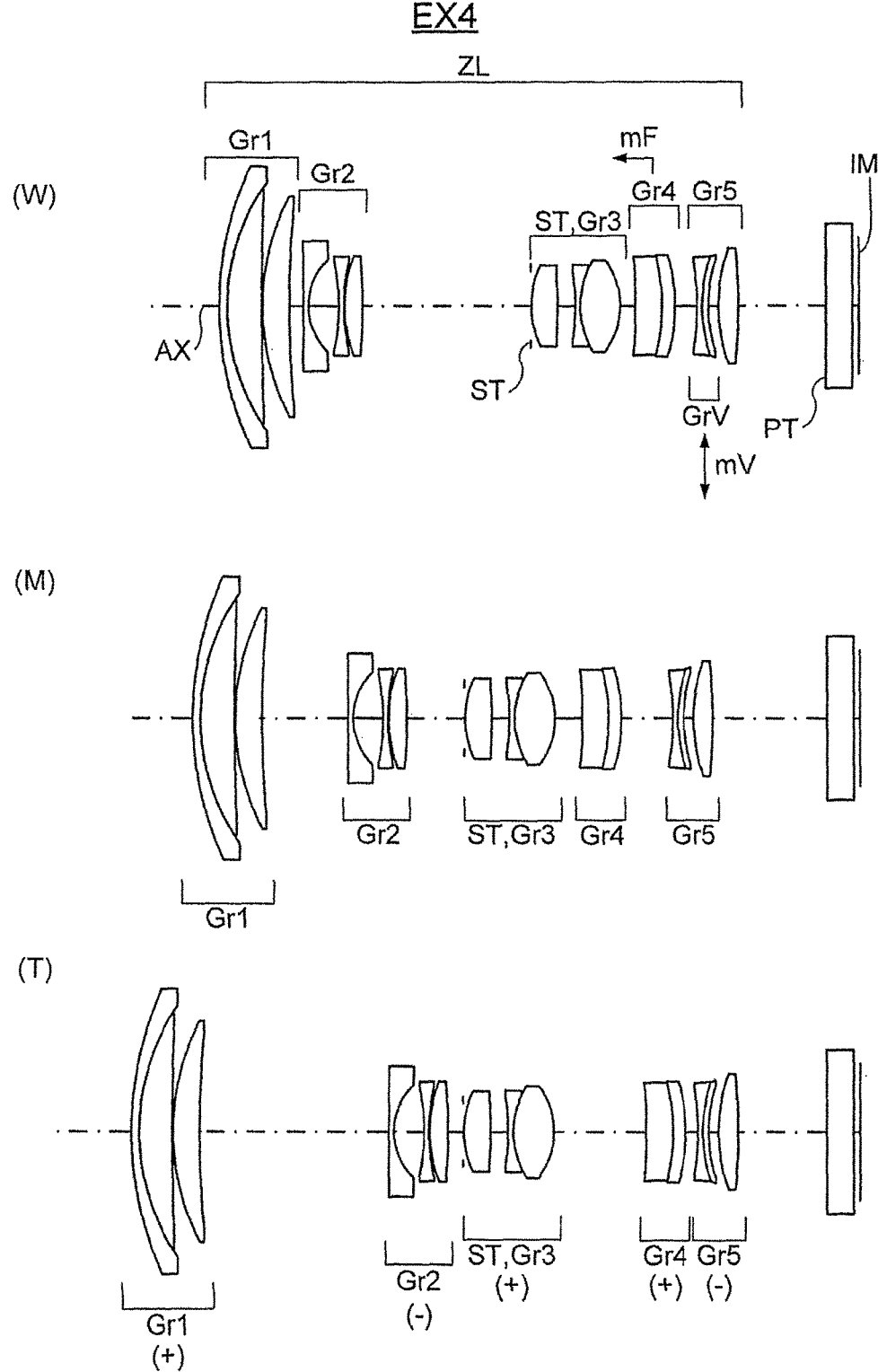
FIG. 4 comprises optical construction diagrams of a fourth embodiment (Example 4) of the present invention.
Figure 5A:
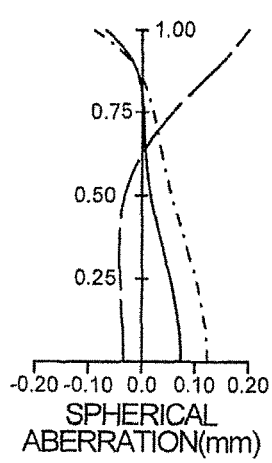
FIGS. 5A to 5I are longitudinal aberration diagrams of Example 1.
Figure 5B:
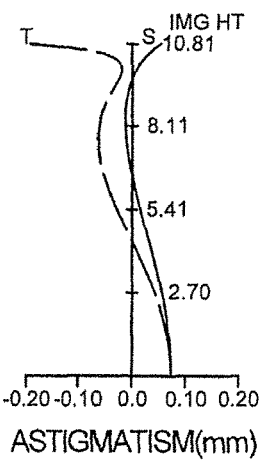
Figure 5C:
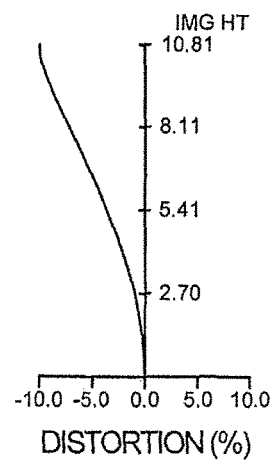
Figure 5D:
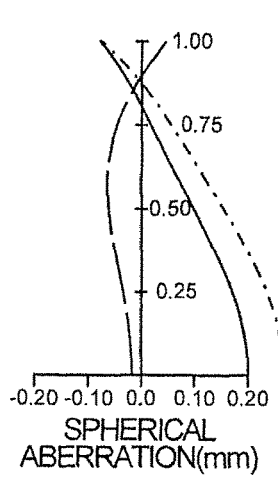
Figure 5E:
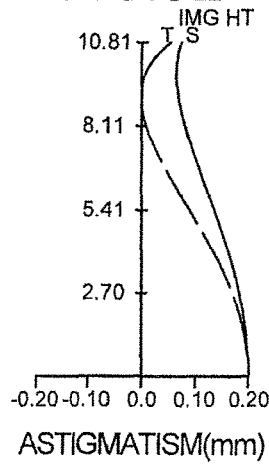
Figure 5F:
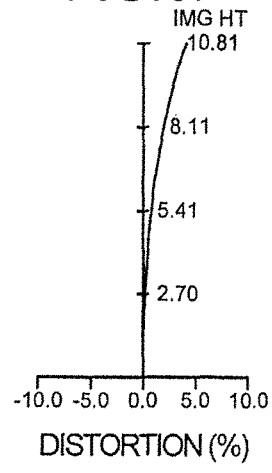
Figure 5G:
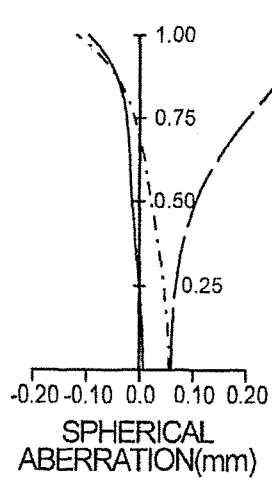
Figure 5H:
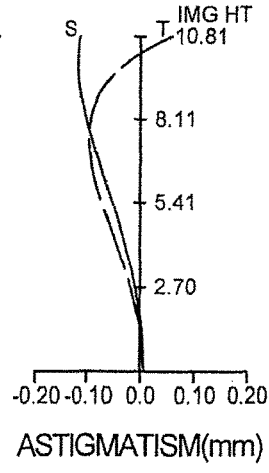
Figure 5I:
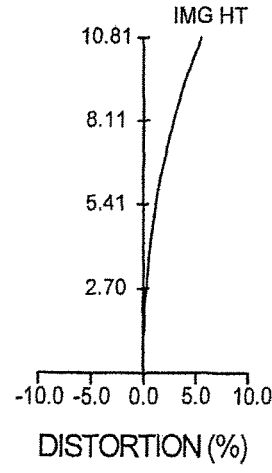
Figure 10A:
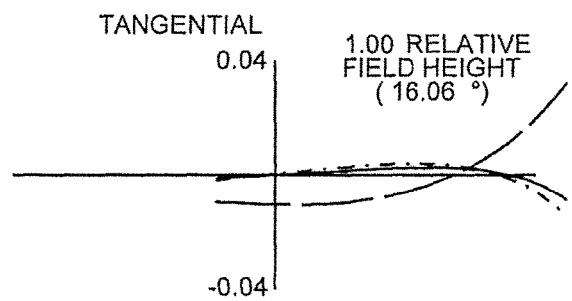
FIGS. 10A to 10F are lateral aberration diagram of Example 1, at the middle focal length.
Figure 10D:
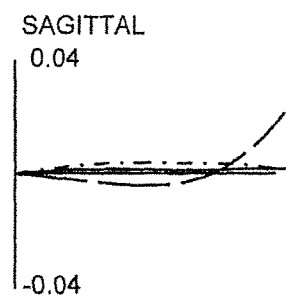
Figure 10B:
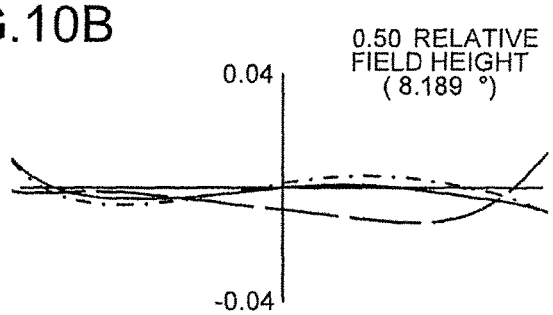
Figure 10E:
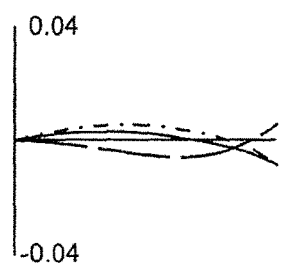
Figure 10C:
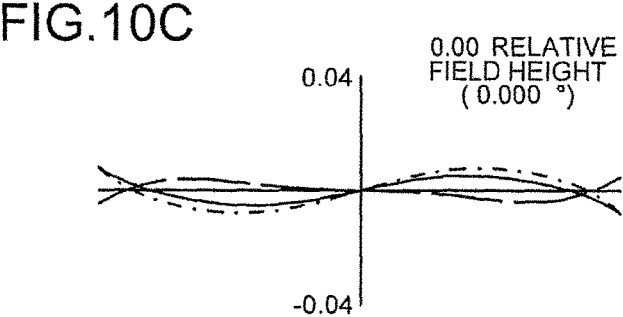
Figure 10F:
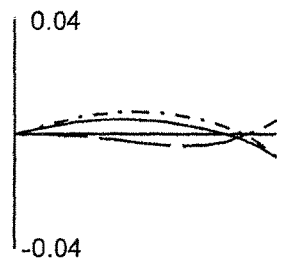
Figure 11A:
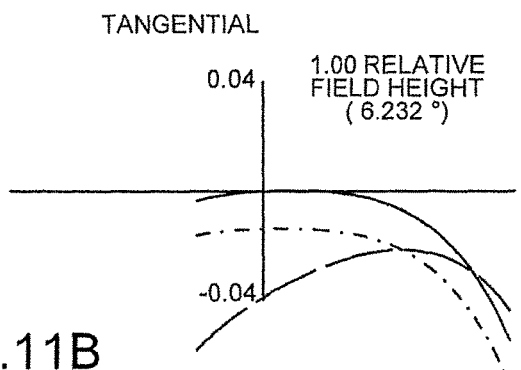
FIGS. 11A to 11F are lateral aberration diagram of Example 1, at the telephoto end.
Figure 11D:
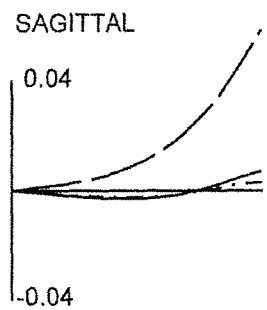
Figure 11B:
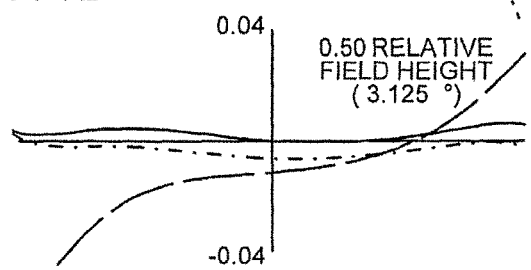
Figure 11E:
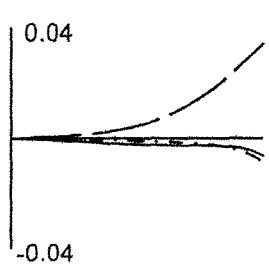
Figure 11C:
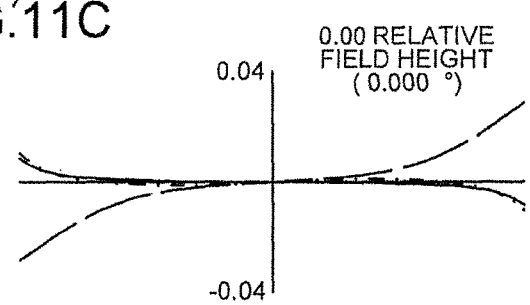
Figure 11F:
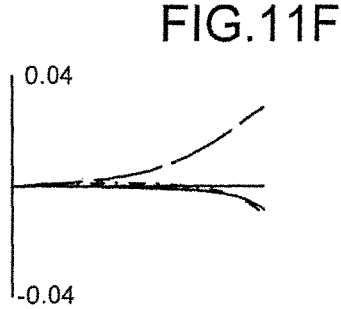
Figure 13A:
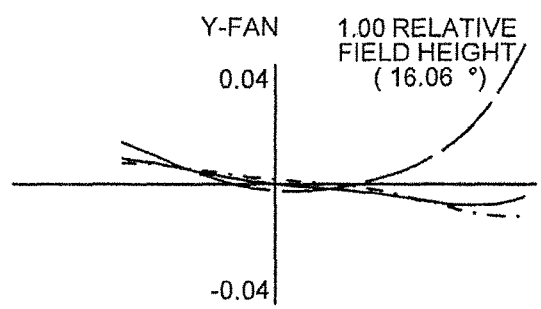
FIGS. 13A to 13F are lateral aberration diagram of Example 2, at the middle focal length.
Figure 13D:
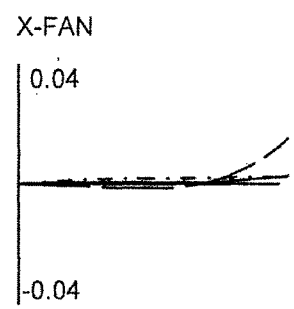
Figure 13B:
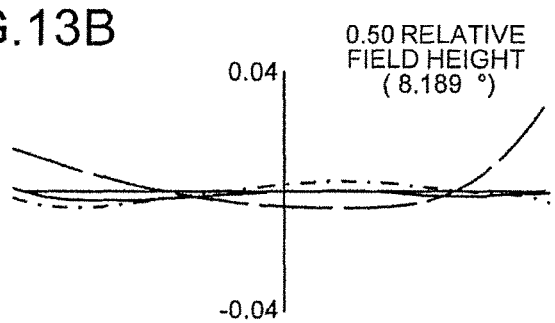
Figure 13E:
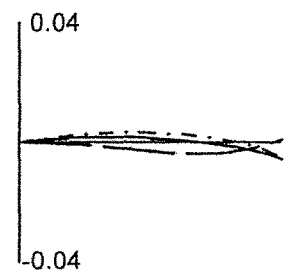
Figure 13C:
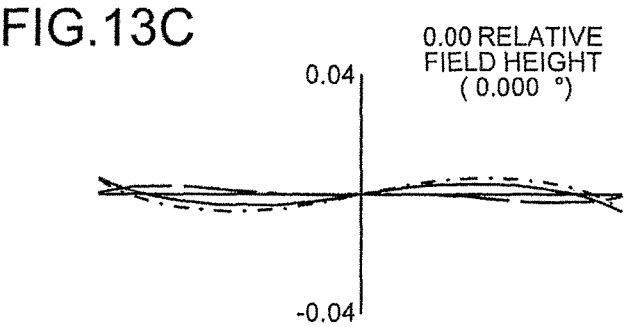
Figure 13F:
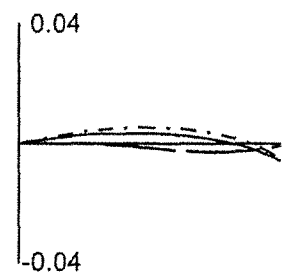
Figures 15A, 15D:
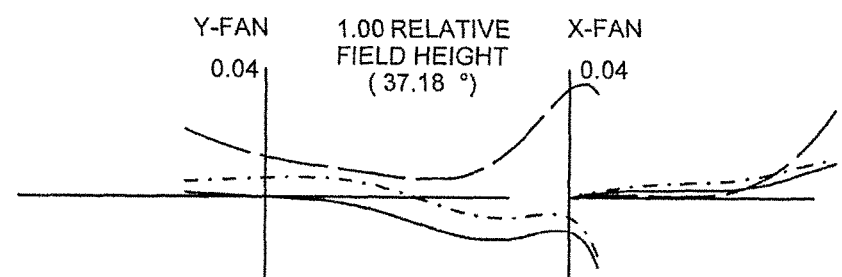
FIGS. 15A to 15F are lateral aberration diagram of Example 3, at the wide-angle end.
Figures 15B, 15E:
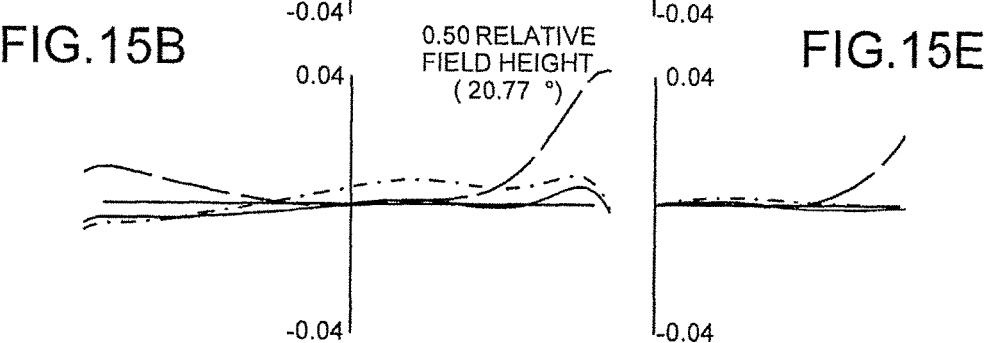
Figures 15C, 15F:
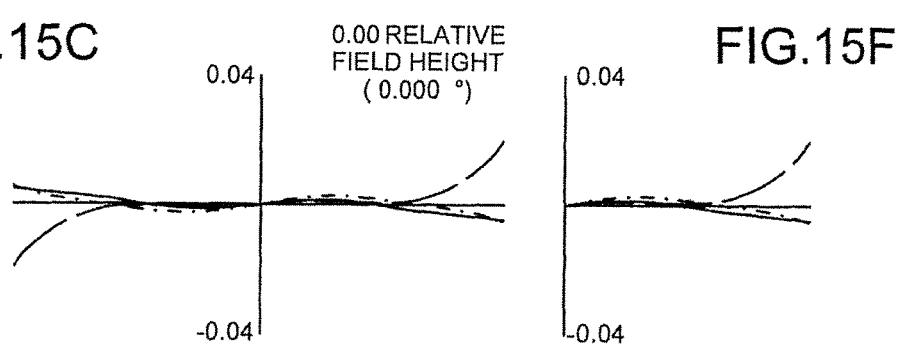
Figure 16A:
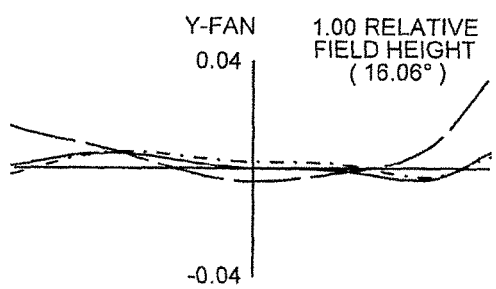
FIGS. 16A to 16F are lateral aberration diagram of Example 3, at the middle focal length.
Figure 16D:
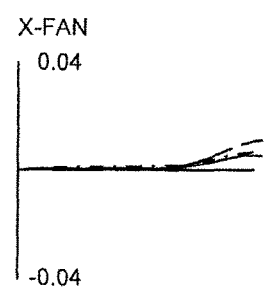
Figure 16B:
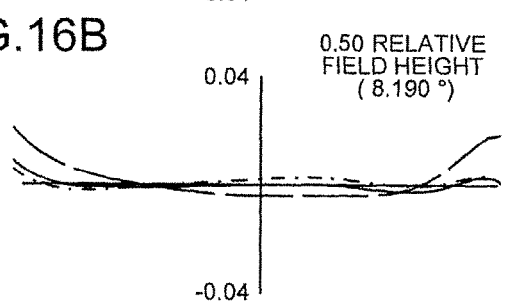
Figure 16E:
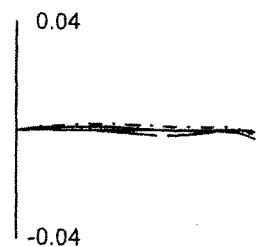
Figure 16C:
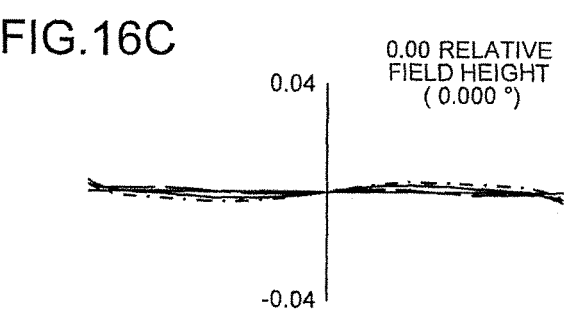
Figure 16F:
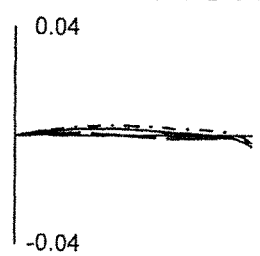
Figures 18A, 18B, 18C, 18D, 18E, 18F:
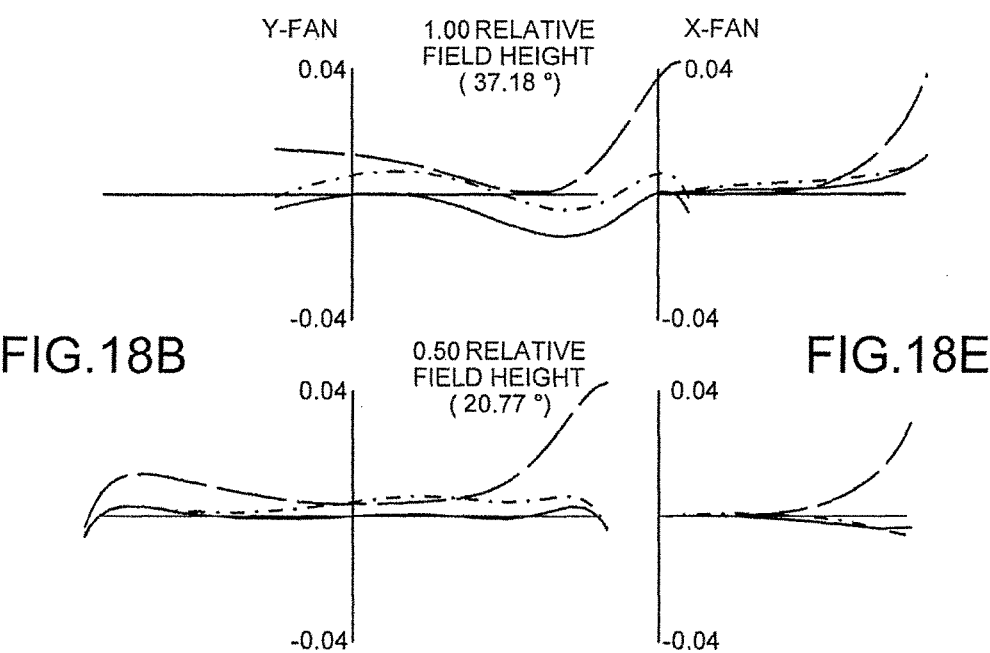
FIGS. 18A to 18F are lateral aberration diagram of Example 4, at the wide-angle end.
Figure 20A:
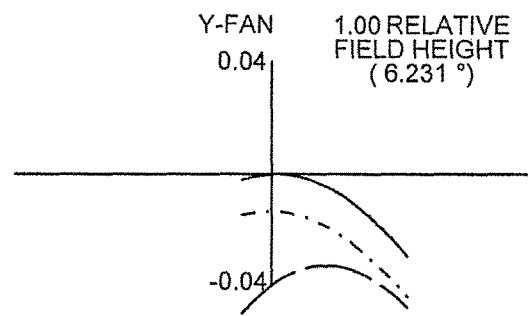
FIGS. 20A to 20F are lateral aberration diagram of Example 4, at the telephoto end.
Figure 20D:
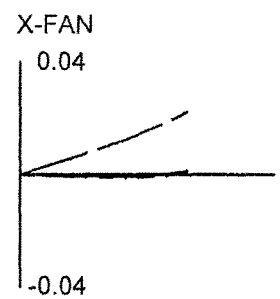
Figure 20B:
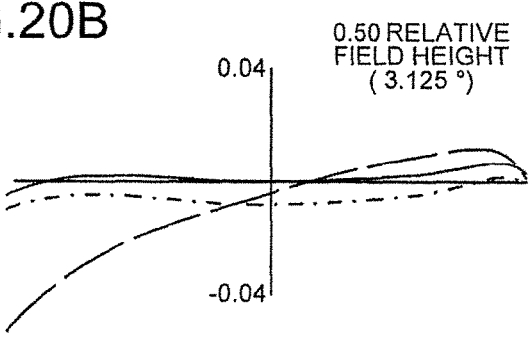
Figure 20E:
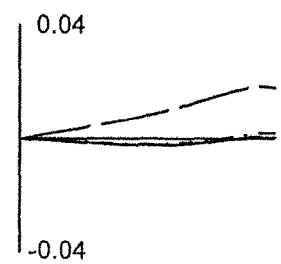
Figure 20C:
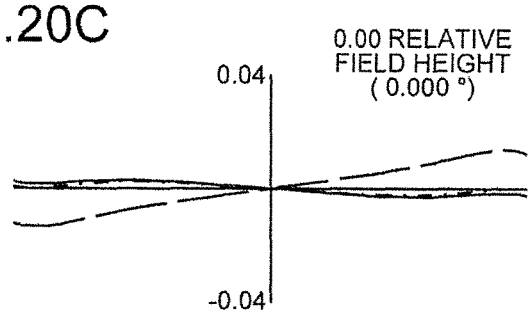
Figure 20F:
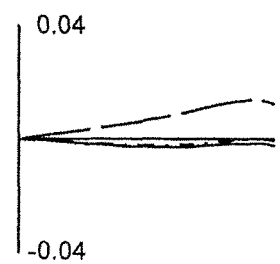

Hereinafter, variable-magnification optical systems of a first and a second type, imaging optical devices, and digital appliances according to the present invention will be described. A variable-magnification optical system of the first type is a variable-magnification optical system that includes, from the object side, a first lens group having a positive optical power, a second lens group having a negative optical power, a third lens group having a positive optical power, a fourth lens group having a positive optical power, and a fifth lens group having a negative optical power (an optical power is a quantity defined as the reciprocal of a focal length) and that achieves magnification variation from the wide-angle end to the telephoto end by varying all the axial distances between the lens groups. Moreover, it achieves focusing by moving the fourth lens group as a focusing group along an optical axis, and achieves vibration correction (that is, camera shake correction) by moving all or part of the fifth lens group as a vibration correction group in a direction perpendicular to the optical axis.

By adopting a construction including a positive-negative-positive-positive power arrangement from the object side as described above, it is possible to cover the larger part of the burden for magnification variation with variation in the group-to-group distances between the first and second lens groups and between the second and third lens groups, and this is advantageous from the viewpoint of total optical length. By achieving focusing with the fourth lens group, it is possible to separate the lens group for focusing from the lens group for magnification variation, and this makes it possible to achieve satisfactory focusing in any magnification variation state. By arranging a vibration correction group in the fifth lens group, it is possible to achieve vibration correction rearward of the fourth lens group which is the focusing group, and this makes it possible to reduce differences in incidence positions of off-axial rays entering the vibration correction group in any focusing state from infinity to close-up. It is thus possible to achieve satisfactory vibration correction.

In the above construction, to obtain high performance, it is preferable that Formulae (1) to (3) below be fulfilled.

$$4.0 < |f1/f2| < 6.0 \quad (1)$$

$$1.0 < f4/f1 < 1.5 \quad (2)$$

$$2.0 < |f4/fv| < 4.0 \quad (3)$$

where
- f1 represents the focal length of the first lens group;
- f2 represents the focal length of the second lens group;
- f4 represents the focal length of the fourth lens group; and
- fv represents the focal length of the vibration correction group.

Formula (1) defines the focal length ratio between the first and second lens groups. Below the lower limit of Formula (1), the optical power of the first lens group is excessively high, and thus the burden for magnification variation between the first and second lens groups is heavy, resulting in increased coma aberration in the negative direction. Above the upper limit of Formula (1), the optical power of the second lens group is excessively high, and thus the burden for magnification variation between the second and third lens groups is heavy, resulting in increased coma aberration in the positive direction. Thus, fulfilling Formula (1) helps achieve high performance during magnification variation with a good balance.

Formula (2) defines the focal length ratio between the fourth and first lens groups. Below the lower limit of Formula (2), the optical power of the fourth lens group is excessively high, resulting in notable variation in astigmatism and coma aberration during focusing. Above the upper limit of Formula (2), the optical power of the fourth lens group is excessively low, and this increases the amount of movement of the fourth lens group during focusing (in particular, at the telephoto end), resulting in increased variation in axial chromatic aberration and spherical aberration. Thus, fulfilling Formula (2) helps achieve high performance during focusing with a good balance.

Formula (3) defines the focal length ratio between the vibration correction group and the fourth lens group. Below the lower limit of Formula (3), the optical power of the vibration correction group is excessively low, and this increases the amount of decentering of the vibration correction group needed for vibration correction, resulting in increased variation in lateral chromatic aberration. Above the upper limit of Formula (3), the optical power of the vibration correction group is excessively high, resulting in increased variation in coma aberration during vibration correction. Thus, fulfilling Formula (3) helps achieve high performance during vibration correction with a good balance.

With the distinctive construction described above, it is possible to obtain a variable-magnification optical system and an imaging optical device that has a lightweight focusing group combined with a vibration correction function and that can be made compact in terms of optical total length. By employing such a variable-magnification optical system or an imaging optical device that is compact and has a vibration correction function in digital appliances such as digital cameras, it is possible to add a high performance image input function to the digital appliances in a compact fashion, and this contributes to achieving compactness, low cost, high performance, high functionality, etc. in the digital appliances. For example, a variable-magnification optical system of the first type is suitable as an interchangeable lens for mirrorless interchangeable-lens digital cameras, and, with it, it is possible to obtain a compact, lightweight interchangeable lens convenient to carry. Conditions for obtaining those benefits with a good balance, and for achieving higher optical performance, further compactness, etc., will be described below.

It is preferable that Formula (4) below be fulfilled.

$$2.5 < f4/f3 < 4.5 \quad (4)$$

where
- f3 represents the focal length of the third lens group; and
- f4 represents the focal length of the fourth lens group.

Formula (4) defines the focal length ratio between the third and fourth lens groups. Below the lower limit of Formula (4), the optical power of the third lens group is excessively low, and this reduces the burden for magnification variation between the second and third lens groups and hence increases the burden for magnification variation on the fourth lens group, making it impossible to obtain satisfactory performance over the entire focusing range. Above the upper limit of Formula (4), the optical power of the third lens group is excessively high, and this increases the burden for magnification variation between the second and third lens groups, resulting in large variation in coma aberration.

Thus, fulfilling Formula (4) helps obtain high performance during magnification variation and during focusing with a good balance.

It is preferable that an aperture stop be arranged between the second and third lens groups. By arranging an aperture stop between the second and third lens groups, it is possible to correct the astigmatism and coma aberration occurring in the second lens group with the third and following lens groups, and this helps correct astigmatism and coma aberration satisfactorily over the entire magnification variation range. It is therefore preferable to set the position of an aperture stop between the second and third lens groups in the variable-magnification optical system.

It is preferable that the vibration correction group be composed of a single lens element or a doublet lens element made up of a negative lens element and a positive lens element. By limiting the number of lens elements composing the vibration correction group in this way, it is possible to suppress the weight of the vibration correction group, and thus to reduce the members and the like necessary to drive the vibration correction group. This is advantageous to size reduction of the optical system.

It is preferable that Formula (5) below be fulfilled.

$$0.1 < (R5A+R5B)/(R5A-R5B) < 0.70 \quad (5)$$

where
R5A represents the radius of curvature of the surface arranged at the most object-side position in the vibration correction group; and
R5B represents the radius of curvature of a surface concave to the image side in the vibration correction group.

It is preferable that the most object-side surface in the vibration correction group is concave to the object side. It is also preferable that the vibration correction group have at least one lens surface concave to the image-surface side. With this construction, it is possible to suppress variation in coma aberration during vibration correction, and to obtain satisfactory vibration correction performance. A lens surface shape in the vibration correction group is specifically defined by Formula (5). Outside the range defined by Formula (5), it is difficult to suppress variation in coma aberration during vibration correction, resulting in notable degradation in performance during vibration correction. For example, below the lower limit of Formula (5), coma aberration varies greatly in the positive direction during vibration correction; above the upper limit of Formula (5), coma aberration varies greatly in the negative direction during vibration correction. Thus, fulfilling Formula (5) helps achieve high performance during vibration correction with a good balance.

It is preferable that the focusing group be composed of a single lens element or a doublet lens element made up of a negative lens element and a positive lens element. By limiting the number of lens elements composing the focusing group in this way, it is possible to reduce the weight of the focusing group, and to obtain a construction suitable for contrast AF.

It is preferable that Formula (6) below be fulfilled.

$$1.0 < (R4A+R4B)/(R4A-R4B) < 1.2 \quad (6)$$

where
R4A represents the radius of curvature of the most object-side surface in the fourth lens group; and
R4B represents the radius of curvature of the most image-side surface in the fourth lens group.

It is preferable that the fourth lens group, which is the focusing group, include a meniscus shape concave to the object side. By using a positive meniscus lens element concave to the object side in the focusing group, it is possible to suppress variation in coma aberration and astigmatism during focusing. A lens surface shape in the focusing group is specifically defined by Formula (6). Above the upper limit of Formula (6), the optical power of the focusing group is excessively low, and this increases the amount of movement of the focusing group during focusing, in particular in a telephoto state, resulting in large variation in axial chromatic aberration and spherical aberration during focusing. Below the lower limit of Formula (6), the optical power of the image-side surface of the focusing group is so high as to cause incidence positions of off-axial rays to vary with focusing, resulting in large variation in astigmatism and coma aberration. Thus, fulfilling Formula (6) helps achieve high performance during focusing with a good balance.

A variable-magnification optical system of the second type is a variable-magnification optical system that includes, from the object side, a first lens group having a positive optical power, a second lens group having a negative optical power, a third lens group having a positive optical power, a fourth lens group having a positive optical power, and a fifth lens group having a negative optical power (an optical power is a quantity defined as the reciprocal of a focal length) and that achieves magnification variation by varying axial distances between the lens groups. Moreover, it achieves focusing by moving the fourth lens group along the optical axis, and achieves vibration correction by moving a sub group including the most image-side lens element in the second lens group on a plane substantially perpendicular to the optical axis.

In a power arrangement that includes five lens groups, namely a positive, a negative. a positive, a positive, and a negative lens group from the object side as described above, when a vibration correction lens group is arranged within the second lens group, a drive mechanism for driving the fourth lens group, which is the focusing group, and a drive mechanism for driving the sub group, which is the vibration correction lens group, are located far away from each other, offering the advantage of higher layout efficiency inside a lens barrel. The entire second lens group may instead be used as the vibration correction lens group. In that case, however, since the second lens group has a comparatively large lens diameter and hence is comparatively heavy, to drive it at a sufficient speed to cope with the frequencies of camera shake, it is necessary to use a drive mechanism that produces a powerful driving force. This leads to an increased size of the system as a whole.

In a variable-magnification optical system that includes five lens groups, namely a positive, a negative. a positive, a positive, and a negative lens group from the object side, magnification variation action ascribable to variation in the distances between the first and second lens groups and between the second and third lens groups accounts for the large part of the magnification variation action of the entire optical system. Accordingly, to make the variable-magnification optical system compact, it is effective to increase the optical power of the second lens group. To achieve that, a negative lens element having a comparatively high optical power needs to be arranged within the second lens group, but if this lens element is decentered for vibration correction, large eccentric aberration occurs, and this makes it difficult to secure satisfactory performance during vibration correction. In general, when a plurality of lens groups are in a relationship where they produce aberrations of opposite signs to cancel each other's aberrations (that is, in a relationship of a strong bond in terms of aberrations), decentering one of them produces large eccentric aberration.

From the above viewpoint, in a case where part of a lens group is used as a vibration correction lens group, it is not advisable to drive a sub lens group located in the middle of the lens group for vibration correction, with the lens group divided into three groups, namely a stationary group, a vibration correction group, and a stationary group. It is more advantageous to drive an outer sub lens group abutting a group-to-group distance, with the lens group divided into two groups, namely a vibration correction group and a stationary group. This helps achieve greater independence among the sub lens groups in terms of aberrations without increasing the number of lens elements.

In a variable-magnification optical system that includes five lens groups, namely a positive, a negative. a positive, a positive, and a negative lens group from the object side, to allow passage of off-axial rays at the wide-angle end, the most object-side lens element in the second lens group has a comparatively large lens diameter. Accordingly, it is preferable to use, not the object-side sub lens group within the second lens group, but the image-side sub lens group within the second lens group as the vibration correction lens group, from the viewpoint of weight. Moreover, inside the second lens group, outside an image-side lens element in the radial direction, a space is left due to the difference between the diameters of object-side and image-side lens elements, and a drive mechanism for vibration correction can be arranged there, which is another advantage from the viewpoint of space efficiency.

In addition, to reduce the weight of the vibration correction lens group, it is preferable that Formula (7) below be fulfilled.

$$M/N<0.5 \tag{7}$$

where
M represents the number of lens elements composing the sub group; and
N represents the number of lens elements composing the second lens group, lens elements constituting a doublet lens element being counted individually.

If the number M of lens elements composing the sub group is so large as to fall outside the range given by Formula (7), the increased weight of the vibration correction lens group requires an increased driving force and hence a larger actuator, resulting in an increased size of the system as a whole. The second lens group has the highest optical power in the variable-magnification optical system, and thus the number N of lens elements composing the second lens group greatly affects the size of the system as a whole. Accordingly, if the number N of lens elements composing the second lens group is so small as to fall outside the range given by Formula (7), retaining a high optical power makes correction of aberrations (in particular, astigmatism) difficult, and compromising with a lower optical power leads to an increased size of the system as a whole. Thus, fulfilling Formula (7) helps achieve compactness, high performance, etc. with a good balance in the variable-magnification optical system having a vibration correction function.

With the distinctive construction described above, it is possible to achieve a high-performance variable-magnification optical system and a high-performance imaging optical device that have a lightweight focusing group, that is compact in terms of the size of the optical system as a whole, and that nevertheless offers a vibration correction function. By employing such a variable-magnification optical system or an imaging optical device that is compact and has a vibration correction function in digital appliances such as digital cameras, it is possible to add a high performance image input function to the digital appliances in a compact fashion, and this contributes to achieving compactness, low cost, high performance, high functionality, etc. in the digital appliances. For example, a variable-magnification optical system of the second type is suitable as an interchangeable lens for mirrorless interchangeable-lens digital cameras, and, with it, it is possible to realize a compact, lightweight interchangeable lens convenient to carry. Conditions for obtaining those benefits with a good balance, and for achieving higher optical performance, further compactness, etc., will be described below.

It is preferable that Formula (8) below be fulfilled.

$$3.0<fv/f2<12.0 \tag{8}$$

where
fv represents the focal length of the sub group; and
f2 represents the focal length of the second lens group.

Below the lower limit of Formula (8), the optical power of the vibration correction lens group is excessively high, and this makes it difficult to suppress the aberrations produced by the vibration correction lens group itself. This leads to, for example, increased spherical aberration and astigmatism. Increased spherical aberration causes increased eccentric coma aberration to occur during decentering for vibration correction. Increased astigmatism causes increased inclination of the image surface (so-called one-sided blur) to occur during decentering for vibration correction. By contrast, above the upper limit of Formula (8), the optical power of the vibration correction lens group is excessively low, and this either makes it difficult to secure the desired vibration correction sensitivity, or makes it necessary to increase the movement distance of the vibration correction lens group, resulting in an increased size of the variable-magnification optical system. Also, an increased optical power of the second lens group as a whole may cause increased variation in astigmatism during zooming. Thus, fulfilling Formula (8) helps achieve compactness, high performance, etc. with a good balance in the variable-magnification optical system having a vibration correction function.

It is further preferable that Formula (8a) below be fulfilled.

$$4.0<fv/f2<10.0 \tag{8a}$$

Formula (8a) defines a further preferable conditional range within the conditional range defined by Formula (8) above from the above-mentioned viewpoints. Accordingly, preferably, fulfilling Formula (8a) helps obtain the above-mentioned benefits more effectively.

It is preferable that Formula (9) below be fulfilled.

$$-4.0<(rA+rB)/(rA-rB)<-0.7 \tag{9}$$

where
rA represents the radius of curvature of the most object-side surface in the sub group; and
rB represents the radius of curvature of the most image-side surface in the sub group.

Arranging the negative lens element having the highest optical power within the second lens group at the most object-side position in the second lens group is effective in reducing the lens diameter of the second lens group. In that case, a convergent beam having passed through the first lens group having a positive optical power is turned into a divergent bean by the negative lens element having the high negative optical power arranged at the most object-side position in the second lens group, and then travels on toward the image side with gradually increasing ray heights within the second lens group. Above the upper limit of Formula (9), the front and rear surfaces of the vibration correction lens group (that is, the sub group) produce large spherical aberration, and this make it difficult to reduce the spherical aberration produced by the vibration correction lens group itself. As a result, decentering the vibration correction lens group produces increased eccentric coma aberration, and this makes it difficult to secure satisfactory optical performance during vibration correction. By contrast, below the lower limit of Formula (9), while the spherical aberration produced by the vibration correction lens group itself can advantageously be suppressed, it is difficult to secure the optical power desired in the vibration correction lens group itself. Thus, fulfilling Formula (9) helps achieve compactness, high performance, etc. with a good balance in the variable-magnification optical system having a vibration correction function.

It is further preferable that Formula (9a) below be fulfilled.

$$-3.0<(rA+rB)/(rA-rB)<-0.9 \tag{9a}$$

Formula (9a) defines a further preferable conditional range within the conditional range defined by Formula (9) above from the above-mentioned viewpoints. Accordingly, preferably, fulfilling Formula (9a) helps obtain the above-mentioned benefits more effectively.

It is preferable that, within the second lens group, an aspherical surface be arranged to the object side of the sub group. In a case where the aberrations produced by the vibration correction lens group itself within the second lens group are sufficiently suppressed, the aberrations produced by the other lens group there, namely the stationary group (that is, the part of the second lens group on the object side of the sub group), also need to be sufficiently suppressed. Otherwise, the second lens group as a whole produces large aberrations after all, and this makes it difficult to suppress variation in performance during zooming. As described previously, to make the variable-magnification optical system compact, it is necessary to increase the optical power of the second lens group. Thus, an increase in the number of lens elements within the second lens group can effectively be avoided by arranging an aspherical surface in the stationary group.

It is preferable that, within the second lens group, a positive lens element having a biconvex shape be arranged so as to cancel the aberrations produced by the negative lens element having the high negative optical power. It is also preferable that the above-mentioned aspherical surface be arranged only on the positive lens element having the biconvex shape from the viewpoint of the moldability of the aspherical-surface lens, that is, from the viewpoint of cost. Accordingly, it is preferable that the above-mentioned lens element including the aspherical surface be a single biconvex positive lens element.

It is preferable that the sub group be composed of a single negative lens element, and that Formula (10) below be fulfilled.

$$ft/Y\text{max}<7.5 \tag{10}$$

where ft represents the focal length of the entire system at the telephoto end; and Ymax represents the maximum image height in terms of an ideal image height excluding distortion, being a quantity fulfilling the relationship $\omega=\tan^{-1}$ (Ymax/f), where f represents the focal length of the entire system and w represents the half-angle of view.

It is preferable that the vibration correction lens group be composed of a single negative lens element, because that helps achieve weight reduction for reducing the load to be driven for vibration correction. Here, above the upper limit of Formula (10), the lateral chromatic aberration occurring during decentering of the vibration correction lens group is excessively large as compared with the maximum image height, and this makes it difficult to secure satisfactory optical performance during vibration correction.

It is preferable that Formula (11) below be fulfilled.

$$60<Vd \tag{11}$$

where

Vd represents the Abbe number of the negative lens element composing the sub group.

In a case where the vibration correction lens group is composed of a single negative lens element, it is preferable that Formula (11) be fulfilled. Below the lower limit of Formula (11), increased lateral chromatic aberration occurs during vibration correction, and this makes it difficult to secure satisfactory optical performance during vibration correction.

It is preferable that the sub group be composed of a doublet lens element made up of a negative lens element and a positive lens element. By using a doublet lens element made up of a negative lens element and a positive lens element as the vibration correction lens group, it is possible to suppress lateral chromatic aberration occurring during decentering of the vibration correction lens group. It is then, as compared with when discrete lens elements are used, also possible to suppress degraded aberrations resulting from an error in the positions of the negative and positive lens elements relative to each other occurring during manufacture.

It is preferable that the third and fifth lens groups move together during magnification variation. In a construction where the third and fifth lens groups move together during magnification variation, the third and fifth lens groups can be mounted on a single moving mechanism. Thus, with this construction, it is possible to reduce factors leading to manufacturing errors, and to alleviate degradation in performance resulting from manufacturing errors.

It is preferable that the third lens group, the driving mechanism for moving the fourth lens group for focusing, and the fifth lens group move tougher, and it is further preferable that the driving mechanism vary the axial distance between the third and fourth lens groups and the axial distance between the fourth and fifth lens groups. In a construction where the third lens group, the fourth lens group driving mechanism, and the fifth lens group move together, the third lens group, the fourth lens group driving mechanism, and the fifth lens group can be mounted on a single moving group. With this construction, in a lens system designed to be capable of purely mechanical zooming, that is, so-called manual zooming, depending on the focus state, an abrupt magnification variation operation by a user may cause collision between the focusing group and a neighboring lens group. Accordingly, measures need to be provided to protect the lens system from destruction in the event of collision. On the other hand, with a construction where the third lens group, the fourth lens group driving mechanism, and the fifth lens group are mounted on a single moving group as described above, irrespective of the focus state, it is possible to perfectly ensure that no collision occurs between the fourth lens group with the third lens group or the fifth lens group. It is thus no longer necessary to provide measures as mentioned above, and this helps simplify the mechanism.

It is preferable that Formula (12) below be fulfilled.

$$-4.0 < f5/f3 < -0.8 \quad (12)$$

where f3 represents the focal length of the third lens group; and
f5 represents the focal length of the fifth lens group.

Below the lower limit of Formula (12), the optical power of the fifth lens group is extremely low relative to that of the third lens group, and thus the magnification variation action exerted by movement of the fifth lens group is insufficient. By contrast, above the upper limit of Formula (12), the optical power of the fifth lens group is excessively high relative to that of the third lens group, and this makes it difficult to locate the rear principal point close to the image surface at the wide-angle end, and thus to obtain the desired focal length at the wide-angle end. Whether insufficient magnification variation action or difficulty securing the desired focal length at the wide-angle end, the consequence is difficulty with aberration correction and the like in the variable-magnification optical system as a whole, leaving large aberrations uncorrected on the whole, hence resulting in degraded optical performance. Thus, fulfilling Formula (12) helps achieve compactness, high performance, etc. with a good balance in the variable-magnification optical system having a vibration correction function.

It is further preferable that Formula (12a) below be fulfilled.

$$-2.0 < f5/f3 < -1.0 \quad (12a)$$

Formula (12a) defines a further preferable conditional range within the conditional range defined by Formula (12) above from the above-mentioned viewpoints. Accordingly, preferably, fulfilling Formula (12a) helps obtain the above-mentioned benefits more effectively.

It is preferable that Formula (13) below be fulfilled.

$$-1.0 < M5/f5 < -0.1 \quad (13)$$

where

M5 represents the distance along the optical axis from the position of the fifth lens group at the wide-angle end and the position of the fifth lens group at the telephoto end; and
f5 represents the focal length of the fifth lens group.

Below the lower limit of Formula (13), either the optical power of the fifth lens group is excessively high, or the amount of movement of the fifth lens group is excessively large, and this makes it difficult to suppress variation in astigmatism and coma aberration that accompanies the movement of the fifth lens group. By contrast, above the upper limit of Formula (13), either the amount of movement of the fifth lens group is excessively small, or the optical power of the fifth lens group is excessively low, and thus the magnification variation action by the fifth lens group is insufficient. As a result, to obtain the desired magnification variation, it is then necessary to increase the magnification variation action between the first and second lens groups. This leads to either an increased total length of the optical system at the telephoto end, or, as a consequence of avoiding that, an increased optical power in the second lens group, this in turn making it difficult to suppress variation in astigmatism and coma aberration during magnification variation. Thus, fulfilling Formula (13) helps achieve compactness, high performance, etc. with a good balance in the variable-magnification optical system having a vibration correction function.

It is further preferable that Formula (13a) below be fulfilled.

$$-0.7 < M5/f5 < -0.2 \quad (13a)$$

Formula (13a) defines a further preferable conditional range within the conditional range defined by Formula (13) above from the above-mentioned viewpoints. Accordingly, preferably, fulfilling Formula (13a) helps obtain the above-mentioned benefits more effectively.

It is preferable that Formula (14) below be fulfilled.

$$1.0 < f4/f3 < 4.0 \quad (14)$$

where f3 represents the focal length of the third lens group; and
f4 represents the focal length of the fourth lens group.

Below the lower limit of Formula (14), the optical power of the fourth lens group relative to that of the third lens group is excessively high, and this makes it difficult to suppress variation in astigmatism that accompanies the movement of the fourth lens group during focusing. By contrast, above the upper limit of Formula (14), the larger part of the converging action of the optical system concentrates on the third lens group, and thus the third lens group produces increased spherical aberration and coma aberration. Thus, fulfilling Formula (14) helps achieve a compactness, high performance, etc. with a good balance in the variable-magnification optical system having a vibration correction function.

It is further preferable that Formula (14a) below be fulfilled.

$$1.1 < f4/f3 < 3.0 \quad (14a)$$

Formula (14a) defines a further preferable conditional range within the conditional range defined by Formula (14) above from the above-mentioned viewpoints. Accordingly, preferably, fulfilling Formula (14a) helps obtain the above-mentioned benefits more effectively.

It is preferable that Formula (15) below be fulfilled.

$$0.5 < M4/M5 < 1.5 \quad (15)$$

where

M4 represents the distance along the optical axis from the position of the fourth lens group at the wide-angle end to the position of the fourth lens group at the telephoto end; and
M5 represents the distance along the optical axis from the position of the fifth lens group at the wide-angle end to the position of the fifth lens group at the telephoto end.

Below the lower limit of Formula (15), the amount of movement of the fourth lens group is excessively small relative to that of the fifth lens group, and it is then necessary, to secure the movement amount of the fifth lens group necessary to obtain the desired magnification variation, to secure a large distance between the fourth and fifth lens groups at the wide-angle end. As a result, the rear principal point of the entire optical system is located away from the image surface, and this makes it difficult to obtain the desired focal length at the wide-angle end. By contrast, below the upper limit of Formula (15), the amount of movement of the fourth lens group is excessively large relative to that of the fifth lens group, and it is then necessary, to secure the desired amount of movement for focusing, to secure a large distance between the third and fifth lens groups at the wide-angle end. As a result, the optical system has an increased size. Or, to avoid that, it is necessary to increase the optical power of the fourth lens group, and this makes it difficult to suppress variation in astigmatism that accompanies the movement of the fourth lens group during focusing. Thus, fulfilling Formula (15) helps achieve compactness, high performance, etc. with a good balance in the variable-magnification optical system having a vibration correction function.

It is further preferable that Formula (15a) below be fulfilled.

$$0.6 < M4/M5 < 1.2 \qquad (15a)$$

Formula (15a) defines a further preferable conditional range within the conditional range defined by Formula (15) above from the above-mentioned viewpoints. Accordingly, preferably, fulfilling Formula (15a) helps obtain the above-mentioned benefits more effectively.

Variable-magnification optical systems of the first and second types are suitable for use as imaging lenses in digital appliances having an image input function (for example, digital cameras); by combining one with an image sensing device or the like, it is possible to build an imaging optical device that takes in an image of an object optically and outputs it in the form of an electric signal. An imaging optical device is an optical device that constitutes a main component of a camera used to take a still and a moving picture of a subject, and is composed of, from the object side (that is, the subject side), a variable-magnification optical system (for example, a zoom lens system) for forming an optical image of an object and an image sensing device for converting the optical image formed by the variable-magnification optical system into an electrical signal. By arranging a variable-magnification optical system having one of the distinctive constructions described previously such that an optical image of a subject is formed on a light-receiving surface (that is, an imaging surface) of the image sensing device, it is possible to build a compact, inexpensive, high-performance imaging optical device, and a digital appliance provided with it.

Examples of digital appliances having an image input function include cameras such as digital cameras, video cameras, surveillance cameras, vehicle-mounted cameras, and cameras for videophones. Also included are any digital appliances and the like having a camera function added to them by incorporation or by optional attachment, such as personal computers, portable digital appliances (for example, cellular phones, smart phones (multifunction cellular phones), and mobile computers), and peripheral devices for them (for example, scanners and printers). As these examples suggest, imaging optical devices can not only be used to build cameras, but also be combined with various appliances to add a camera function to them. For example, it is possible to build digital appliances having an image input function, such as camera-equipped cellular phones.

Figure 33:
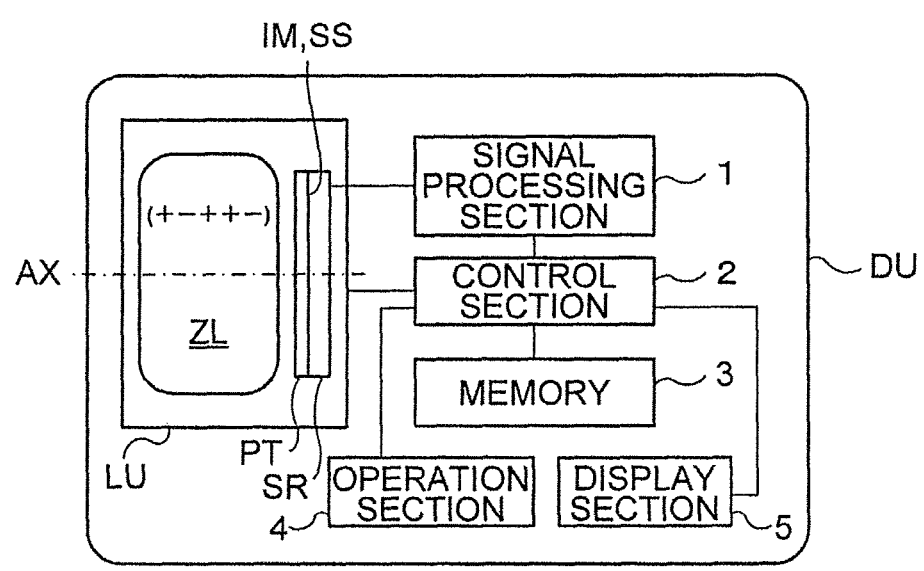
FIG. 33 is a schematic diagram showing an example of an outline configuration of a digital appliance incorporating a variable-magnification optical system.

FIG. 33 shows an example of an outline configuration of a digital appliance DU as one example of a digital appliance having an image input function, in a schematic cross section. The imaging optical device LU incorporated in the digital appliance DU shown in FIG. 33 includes, from the object side (that is, the subject side), a zoom lens system ZL (with an optical axis AX) which forms an optical image (image surface) IM of an object at varying magnifications, a plane-parallel plate PT (corresponding to a cover glass of an image sensing device SR, and optical filters and the like arranged as necessary, such as an optical low-pass filter and an infrared-cut filter), and an image sensing device SR which converts into an electrical signal the optical image IM formed on the light-receiving surface (imaging surface) SS by the zoom lens system ZL. When a digital appliance DU having an image input function is built with this imaging optical device LU, typically, the imaging optical device LU is arranged inside the body of the digital appliance DU. For the purpose of realizing a camera function, it is possible to adopt a configuration that suits specific requirements. For example, an imaging optical device LU built as a unit can be designed to be detachably attached to, or rotatably fitted to, the body of a digital appliance DU.

A zoom lens system ZL as a variable-magnification optical system of the first type is a variable-magnification optical system that has five lens groups, namely a positive, a negative, a positive, a positive, and a negative lens group, and that achieves magnification variation (that is, zooming) from the wide-angle end to the telephoto end by varying all the axial distances between the lens groups. It achieves focusing by moving the fourth lens group as a focusing group in the optical axis AX direction, and achieves vibration correction by moving all or part of the fifth lens group as a vibration correction group in a direction perpendicular to the optical axis AX.

A zoom lens system ZL as a variable-magnification optical system of the second type is a variable-magnification optical system that has five lens groups, namely a positive, a negative, a positive, a positive, and a negative lens group, and that achieves magnification variation (that is, zooming) by varying axial distances between the lens groups. It achieves focusing by moving the fourth lens group along the optical axis AX, and achieves vibration correction by moving a sub group including the most image-side lens element in the second lens group on a plane substantially perpendicular to the optical axis AX. During magnification variation, at least the third, fourth, and fifth lens groups move relative to the image surface, and an optical image IM is formed on the light-receiving surface SS of the image sensing device SR.

Used as the image sensing device SR is, for example, a solid-state image sensor, such as a CCD (charge-coupled device) image sensor or a CMOS (complementary metal-oxide semiconductor) image sensor, having a plurality of pixels. The zoom lens system ZL is so arranged that the optical image IM of the subject is formed on the light-receiving surface SS, which is the photoelectric conversion portion of the image sensing device SR. Thus, the optical image IM formed by the zoom lens system ZL is converted into an electrical signal by the image sensing device SR.

The digital appliance DU includes, in addition to the imaging optical device LU, a signal processor 1, a controller 2, a memory 3, an operation panel 4, a display 5, etc. The signal generated by the image sensing device SR is subjected to predetermined digital image processing, image compression, etc. as necessary in the signal processor 1, and is recorded, as a digital video signal, to the memory 3 (a semiconductor memory, an optical disk, or the like) or, as the case may be, transferred to an external device via a cable or after being converted into an infrared signal (for example, a communication function of a cellular phone). The controller 2 comprises a microprocessor, and controls, in a centralized fashion, image taking functions (such as a still image taking function and a moving image taking function), functions such as an image playback function, and operation of lens movement mechanisms for zooming, focusing, camera shake correct, etc. For example, the controller 2 controls the imaging optical device LU to perform at least either shooting of a still image of a subject or shooting of a moving image of a subject. The display 5 includes a display device such as a liquid crystal monitor, and displays an image based on an image signal resulting from conversion by the image sensing device SR or image information recorded in the memory 3. The operation panel 4 includes operated members such as operation buttons (for example, a shutter-release button), operation dials (for example, a shooting mode dial), etc., and conveys information entered by a user to the controller 2.

Now, by way of a first to a fourth embodiment, specific optical constructions of the zoom lens system ZL will be described in more detail. FIGS. 1 to 4 comprise optical construction diagrams corresponding to the zoom lens system ZL in the first to fourth embodiments respectively, showing, in an optical section, the lens arrangement, lens shapes, etc. observed at the wide-angle end (W), at the middle focal length (M), and at the telephoto end (T). In the first to fourth embodiments (FIGS. 1 to 4), the zoom lens system ZL includes, from the object side, a first lens group Gr1 having a positive optical power, a second lens group Gr2 having a negative optical power, a third lens group Gr3 having a positive optical power, a fourth lens group Gr4 having a positive optical power, and a fifth lens group Gr5 having a negative optical power, and is so constructed as to achieve magnification variation (that is, zooming) from the wide-angle end (W) to the telephoto end (T) by varying all the axial distances between the lens groups.

For magnification variation, the first lens group Gr1, the second lens group Gr2, the third lens group Gr3, the fourth lens group Gr4, and the fifth lens group Gr5 each move relative to the image surface IM. An aperture stop ST is located to the object side of the third lens group Gr3, and moves together with the third lens group Gr3 during zooming. For focusing, the fourth lens group Gr4 moves along the optical axis AX. That is, the fourth lens group Gr4 is a focusing group, and as indicated by arrow mF, moves toward the object side during focusing on a close object. The entire fifth lens group Gr5 or a sub group including the most object-side lens element in the fifth lens group Gr5 is a vibration correction group GrV, and as indicated by arrow mV, moves perpendicularly to the optical axis AX for vibration correction.

In the first embodiment (FIG. 1), the zoom lens system ZL has six lens groups, namely a positive, a negative, a positive, a positive, a negative, and a positive lens group, and has a zoom arrangement where, during zooming, the first to fifth lens groups Gr1 to Gr5 are movable and the sixth lens group Gr6 is stationary. The fourth lens group Gr4 acts as a focusing group, and the fifth lens group Gr5 acts as a vibration correction group. During zooming from the wide-angle end (W) to the telephoto end (T), the first lens group Gr1 moves monotonically toward the object side, the second lens group Gr2 moves monotonically toward the image side, the third lens group Gr3 moves monotonically toward the object side, the fourth lens group Gr4 first moves toward the object side and then makes a U-turn toward the image side, and the fifth lens group Gr5 moves monotonically toward the object side.

In the second embodiment (FIG. 2), the zoom lens system ZL has five lens groups, namely a positive, a negative, a positive, a positive, and a negative lens group, and has a zoom arrangement where, during zooming, the first to fifth lens groups Gr1 to Gr5 are movable. The fourth lens group acts as a focusing group, and the most object-side lens element within the fifth lens group Gr5 acts as a vibration correction group. During magnification variation from the wide-angle end (W) to the telephoto end (T), the first lens group Gr1 moves monotonically toward the object side, the second lens group Gr2 moves monotonically toward the image side, the third lens group Gr3 moves monotonically toward the object side, the fourth lens group Gr4 first moves toward the object side and then makes a U-turn toward the image side, and the fifth lens group Gr5 first moves toward the object side and then makes a U-turn toward the image side.

In the third embodiment (FIG. 3), the zoom lens system ZL has five lens groups, namely a positive, a negative, a positive, a positive, and a negative lens group, and has a zoom arrangement where, during zooming, the first to fifth lens groups Gr1 to Gr5 are movable. The fourth lens group Gr4 acts as a focusing group, and the most object-side doublet lens element within the fifth lens group Gr5 acts as a vibration correction group. During zooming from the wide-angle end (W) to the telephoto end (T), the first lens group Gr1 moves monotonically toward the object side, the second lens group Gr2 moves monotonically toward the image side, the third lens group Gr3 moves monotonically toward the object side, the fourth lens group Gr4 first moves toward the object side and then makes a U-turn toward the image side, and the fifth lens group Gr5 first moves toward the object side and then makes a U-turn toward the image side.

In the fourth embodiment (FIG. 4), the zoom lens system ZL has five lens groups, namely a positive, a negative, a positive, a positive, and a negative lens group, and has a zoom arrangement where, during zooming, the first to fifth lens groups Gr1 to Gr5 are movable. The fourth lens group Gr4 acts as a focusing group, and the most object-side doublet lens element within the fifth lens group Gr5 acts as a vibration correction group. During zooming from the wide-angle end (W) to the telephoto end (T), the first lens group Gr1 moves monotonically toward the object side, the second lens group Gr2 moves monotonically toward the image side, the third lens group Gr3 moves monotonically toward the object side, the fourth lens group Gr4 first moves toward the object side and then makes a U-turn toward the image side, and the fifth lens group Gr5 first moves toward the object side and then makes a U-turn toward the image side.

In the first embodiment (FIG. 1), each lens group is composed, in terms of the paraxial surface shapes of the constituent lens elements, as follows from the object side. The first lens group Gr1 is composed of a doublet lens element made up of a negative meniscus lens element concave to the image side and a positive meniscus lens element convex to the object side and a positive meniscus lens element convex to the object side. The second lens group Gr2 is composed of a negative meniscus lens element concave to the image side, a biconcave negative lens element, a biconvex positive lens element, and a negative meniscus lens element concave to the object side. The third lens group Gr3 is composed of a biconvex positive lens element having aspherical surfaces on both sides and a doublet lens element made up of a biconcave negative lens element and a biconvex positive lens element. To the object side of the third lens group Gr3, an aperture stop ST is arranged. The fourth lens group Gr4 is composed of a single positive meniscus lens element convex to the image side and having aspherical surfaces on both sides. The fifth lens group Gr5 is composed of a single biconcave negative lens element (a vibration correction group GrV). The sixth lens group Gr6 is composed of a single biconvex positive lens element.

In the second embodiment (FIG. 2), each lens group is composed, in terms of the paraxial surface shapes of the constituent lens elements, as follows from the object side. The first lens group Gr1 is composed of a doublet lens element made up of a negative meniscus lens element concave to the image side and a positive meniscus lens element convex to the object side and a positive meniscus lens element convex to the object side. The second lens group Gr2 is composed of two biconcave negative lens elements and a doublet lens element made up of a biconvex positive lens element and a biconcave negative lens element. The third lens group Gr3 is composed of a biconvex positive lens element having aspherical surfaces on both sides and a doublet lens element made up of a biconcave negative lens element and a biconvex positive lens element. To the object side of the third lens group Gr3, an aperture stop ST is arranged. The fourth lens group Gr4 is composed of a single positive meniscus lens element convex to the image side and having aspherical surfaces on both sides. The fifth lens group Gr5 is composed of a biconcave negative lens element (a vibration correction group GrV) and a biconvex positive lens element.

In the third embodiment (FIG. 3), each lens group is composed, in terms of the paraxial surface shapes of the constituent lens elements, as follows from the object side. The first lens group Gr1 is composed of a doublet lens element made up of a negative meniscus lens element concave to the image side and a positive meniscus lens element convex to the object side and a positive meniscus lens element convex to the object side. The second lens group Gr2 is composed of two biconcave negative lens elements and a doublet lens element made up of a biconvex positive lens element and a biconcave negative lens element. The third lens group Gr3 is composed of a biconvex positive lens element having aspherical surfaces on both sides and a doublet lens element made up of a biconcave negative lens element and a biconvex positive lens element. To the object side of the third lens group Gr3, an aperture stop ST is arranged. The fourth lens group Gr4 is composed of a single positive meniscus lens element convex to the image side and having aspherical surfaces on both sides. The fifth lens group Gr5 is composed of a doublet lens element (a vibration correction group GrV) made up of a biconcave negative lens element and a positive meniscus lens element convex to the object side and a biconvex positive lens element.

In the fourth embodiment (FIG. 4), each lens group is composed, in terms of the paraxial surface shapes of the constituent lens elements, as follows from the object side. The first lens group Gr1 is composed of a doublet lens element made up of a negative meniscus lens element concave to the image side and a positive meniscus lens element convex to the object side and a positive meniscus lens element convex to the object side. The second lens group Gr2 is composed of two biconcave negative lens elements and a biconvex positive lens element. The third lens group Gr3 is composed of a biconvex positive lens element having aspherical surfaces on both sides and a doublet lens element made up of a biconcave negative lens element and a biconvex positive lens element. To the object side of the third lens group Gr3, an aperture stop ST is arranged. The fourth lens group Gr4 is composed of a doublet lens element made up of a biconvex positive lens element having an aspherical surface on the object side and a negative meniscus lens element concave to the object side and having an aspherical surface on the image side. The fifth lens group Gr5 is composed of a doublet lens element (a vibration correction group GrV) made up of a biconcave negative lens element and a negative meniscus lens element concave to the image side and a biconvex positive lens element.

Figure 21:
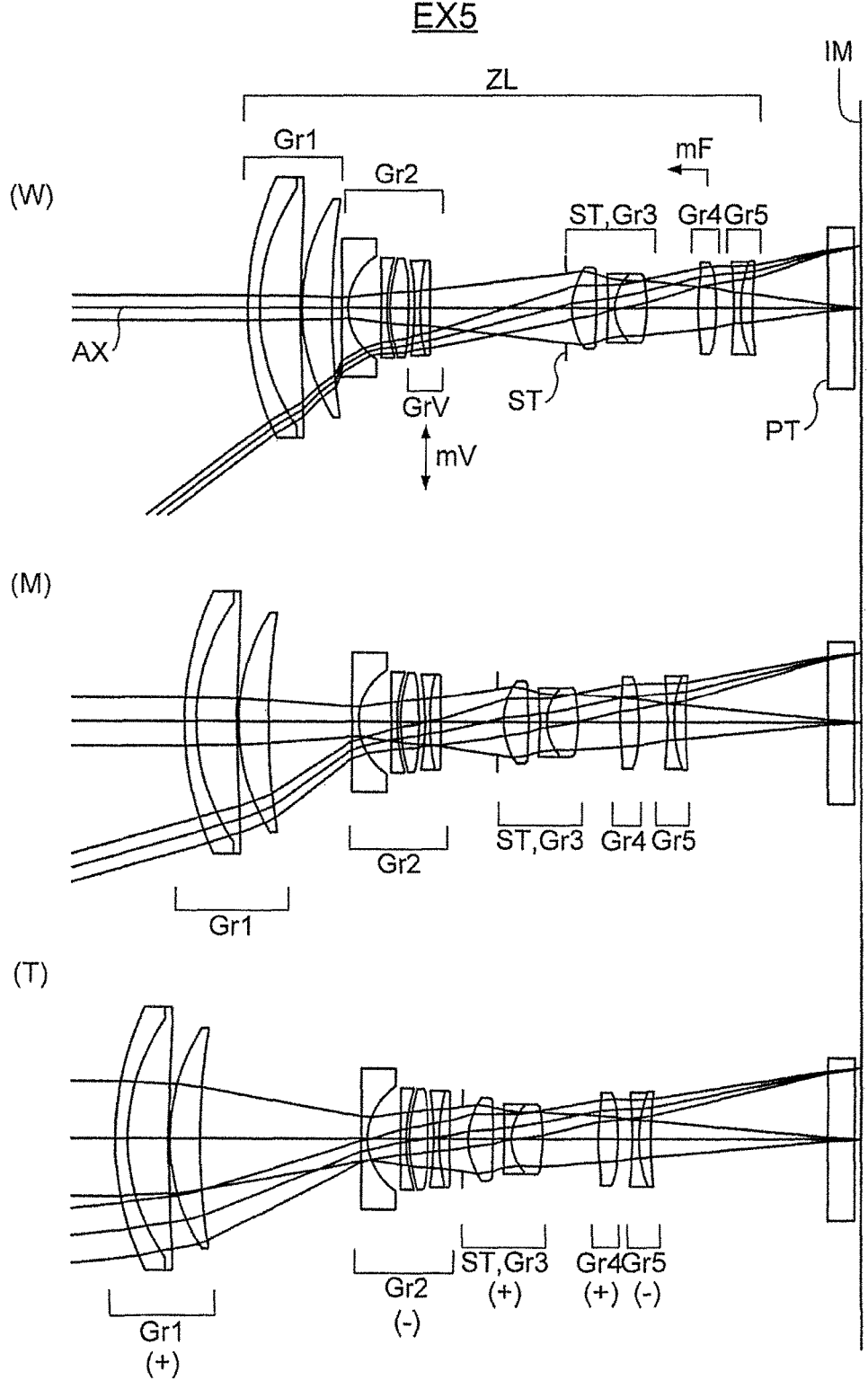
FIG. 21 comprises optical construction diagrams of a fifth embodiment (Example 5) of the present invention.
Figure 22:
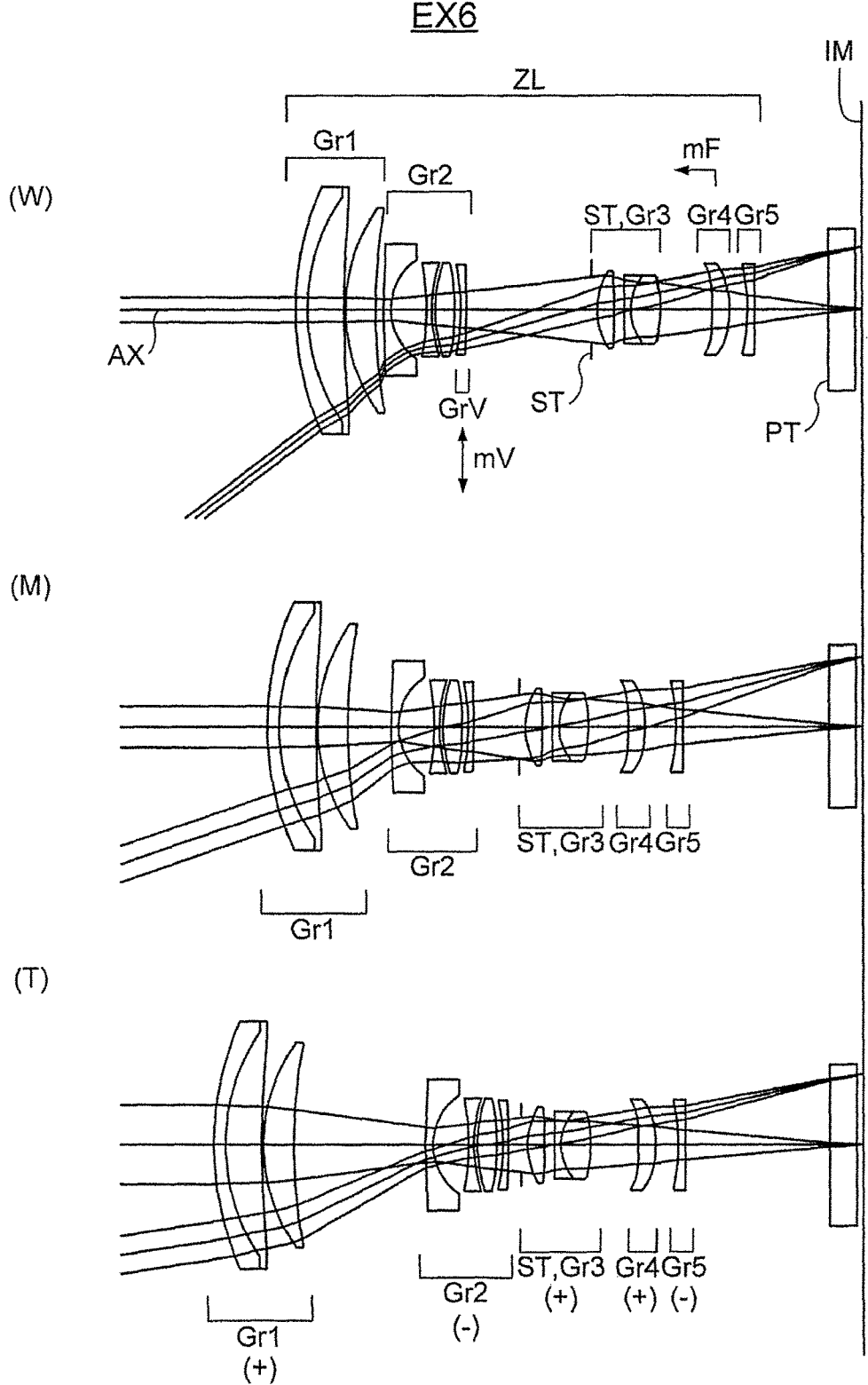
FIG. 22 comprises optical construction diagrams of a sixth embodiment (Example 6) of the present invention.
Figure 23:
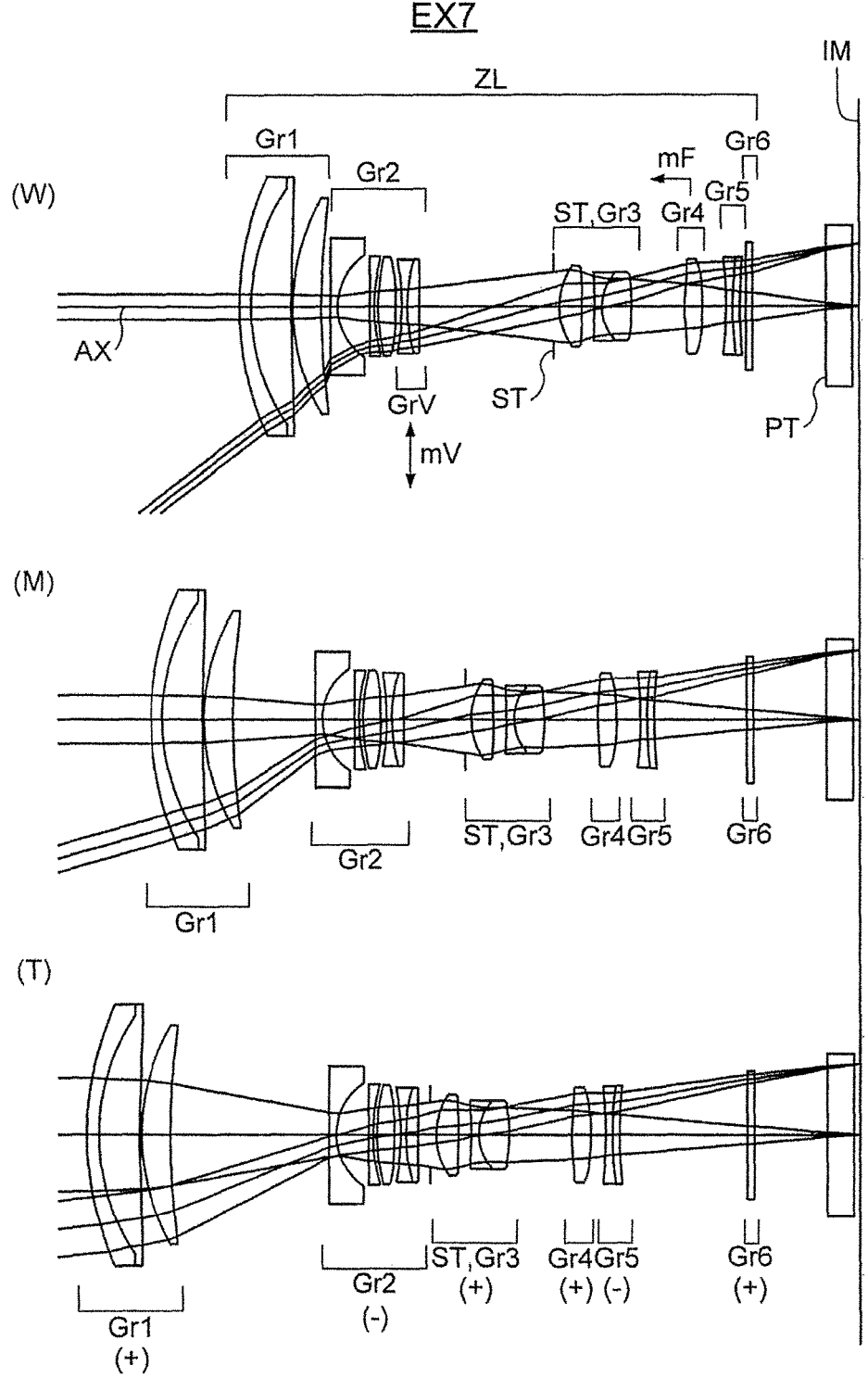
FIG. 23 comprises optical construction diagrams of a seventh embodiment (Example 7) of the present invention.
Figure 27A:
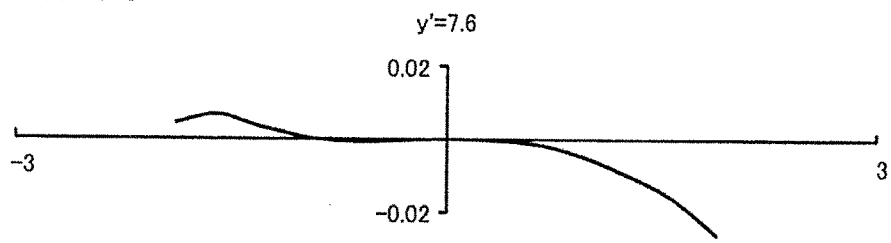
FIGS. 27A to 27E are lateral aberration diagram of Example 5, without and with camera shake correction, at the wide-angle end.
Figure 27B:
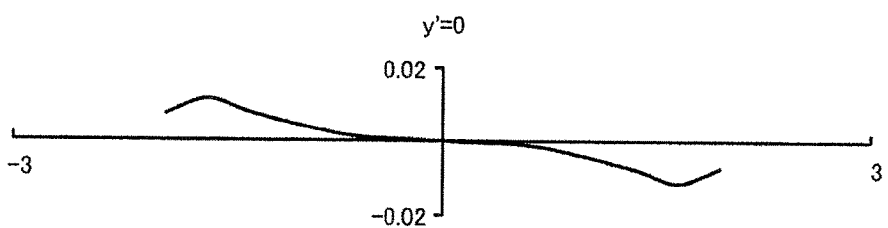
Figure 27C:
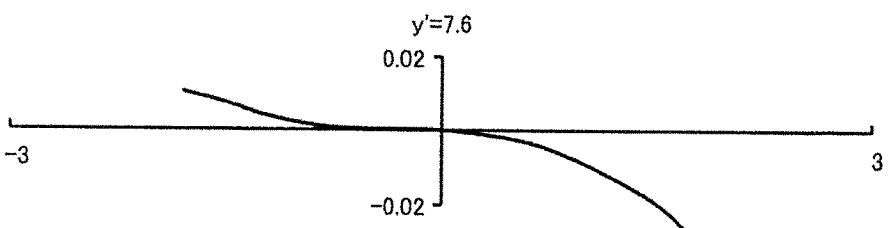
Figure 27D:
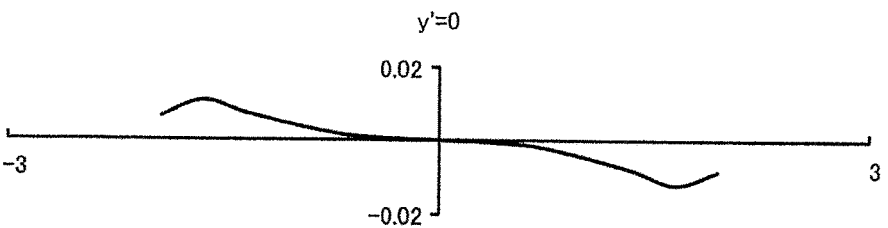
Figure 27E:
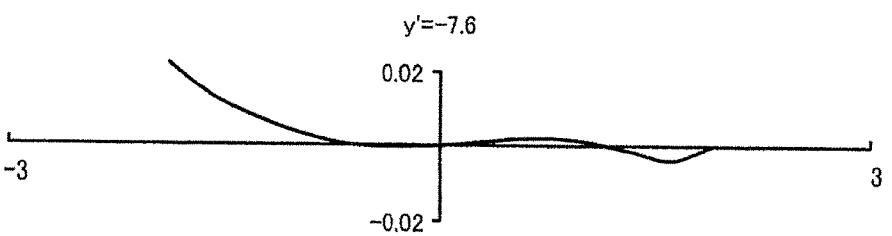
Figure 28A:
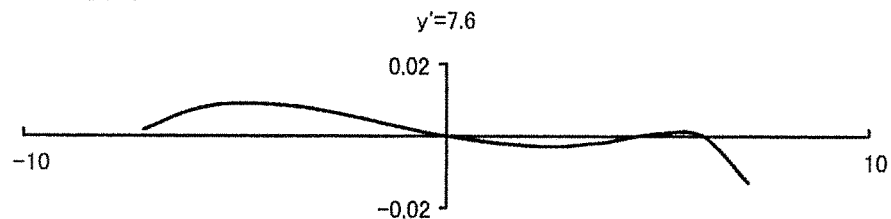
FIGS. 28A to 28E are lateral aberration diagram of Example 5, without and with camera shake correction, at the telephoto end.
Figure 28B:
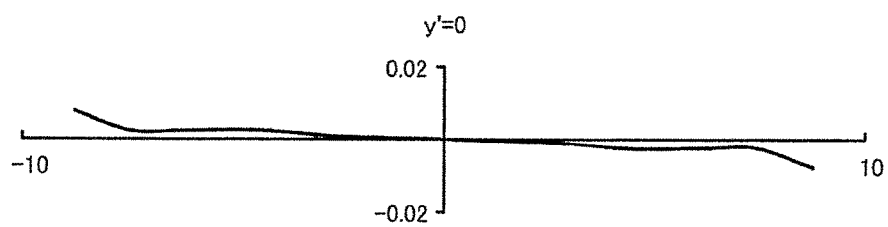
Figure 28C:
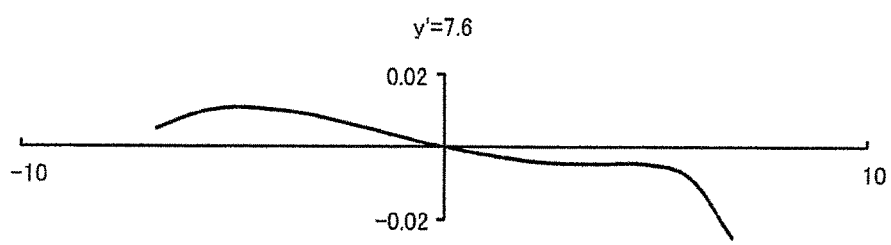
Figure 28D:
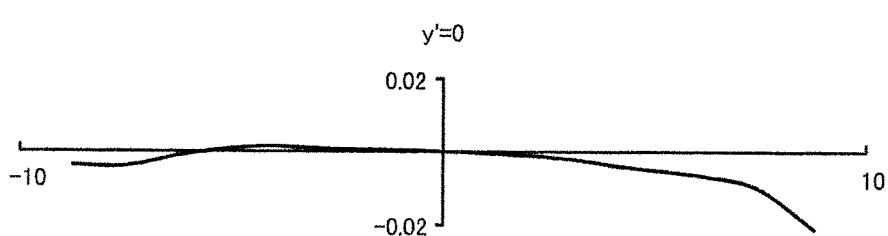
Figure 28E:
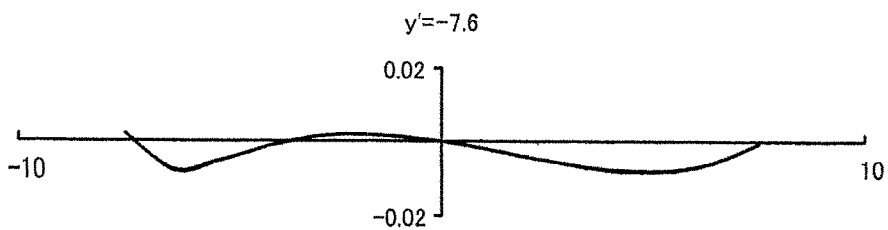
Figure 29A:
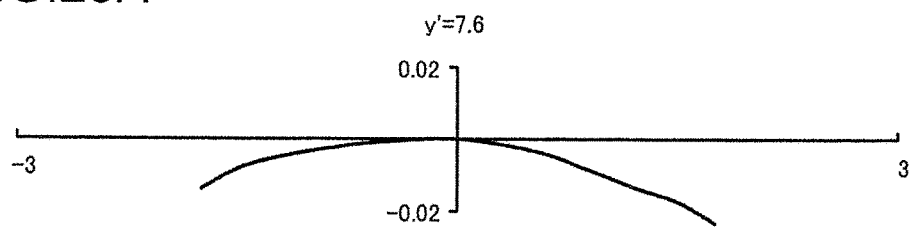
FIGS. 29A to 29E are lateral aberration diagram of Example 6, without and with camera shake correction, at the wide-angle end.
Figure 29B:
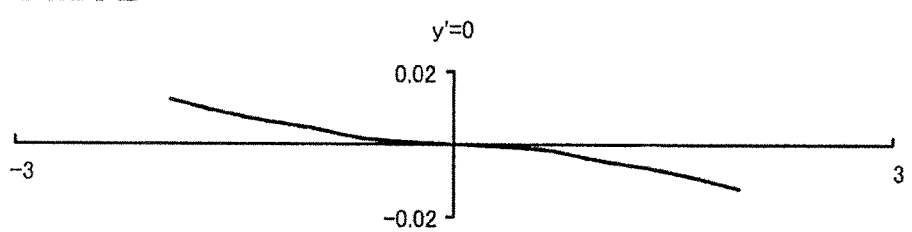
Figure 29C:
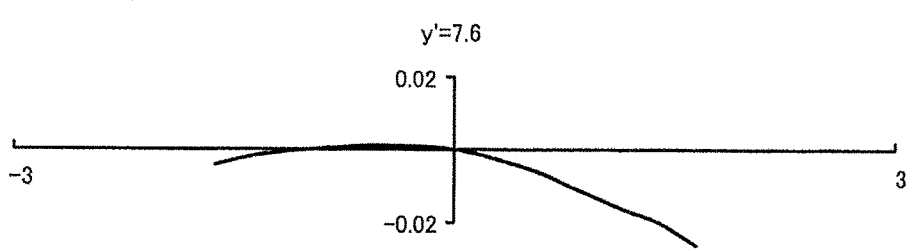
Figure 29D:
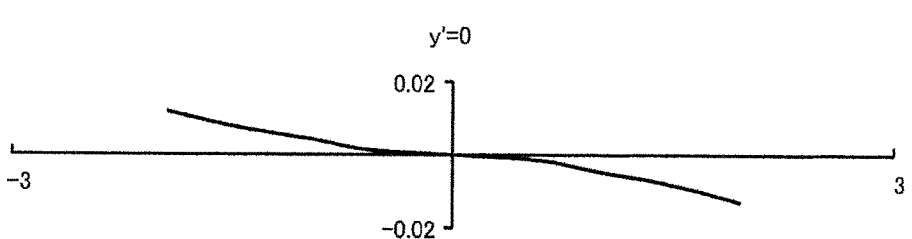
Figure 29E:
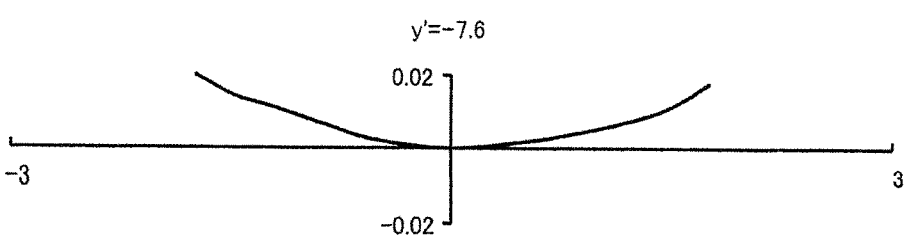
Figure 30A:
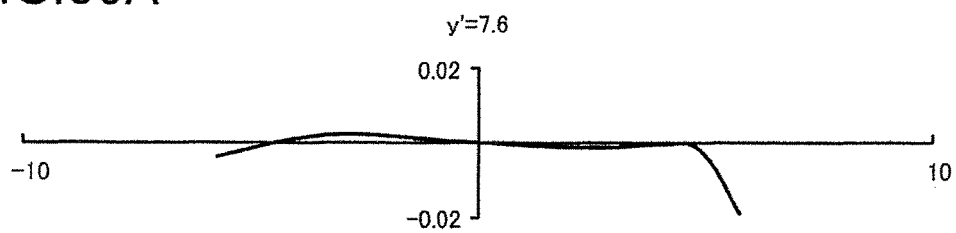
FIGS. 30A to 30E are lateral aberration diagram of Example 6, without and with camera shake correction, at the telephoto end.
Figure 30B:
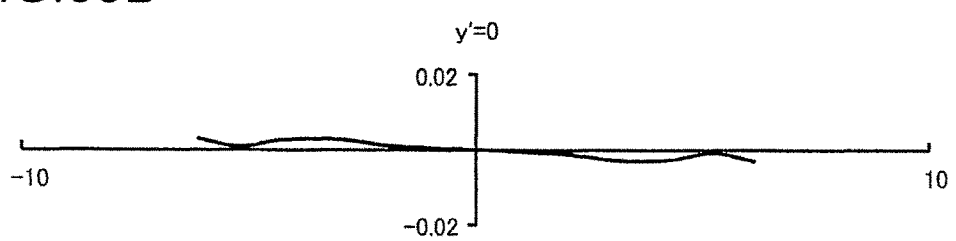
Figure 30C:
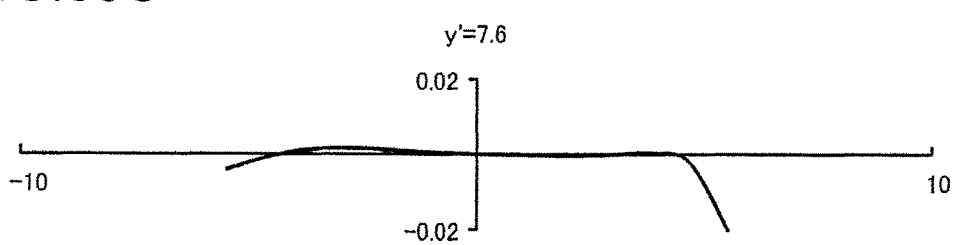
Figure 30D:
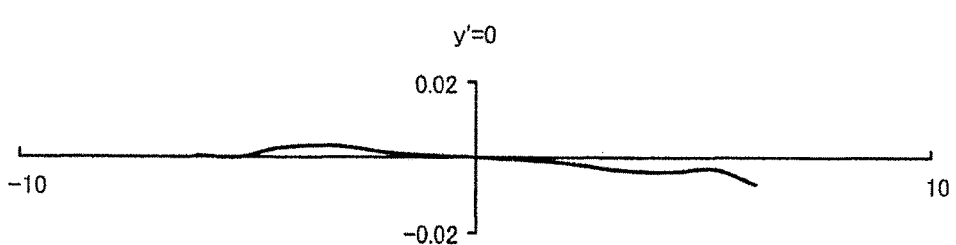
Figure 30E:
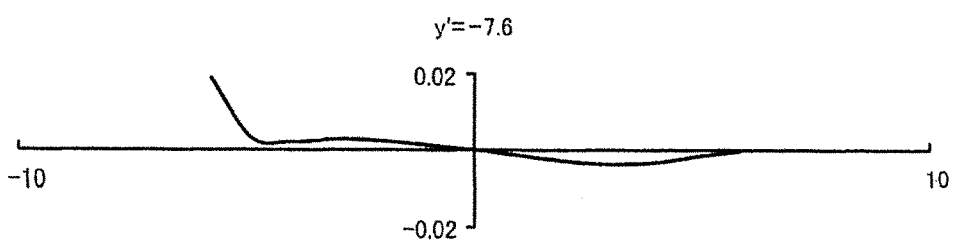
Figure 31A:
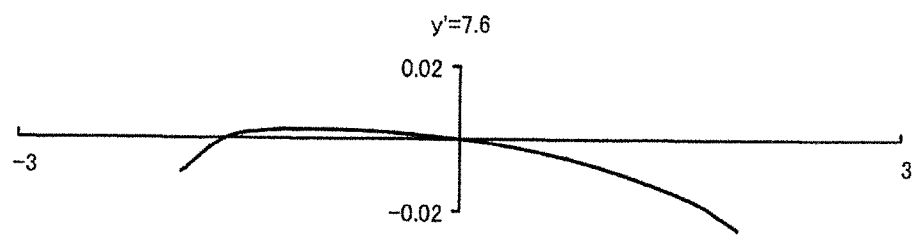
FIGS. 31A to 31E are lateral aberration diagram of Example 7, without and with camera shake correction, at the wide-angle end.
Figure 31B:
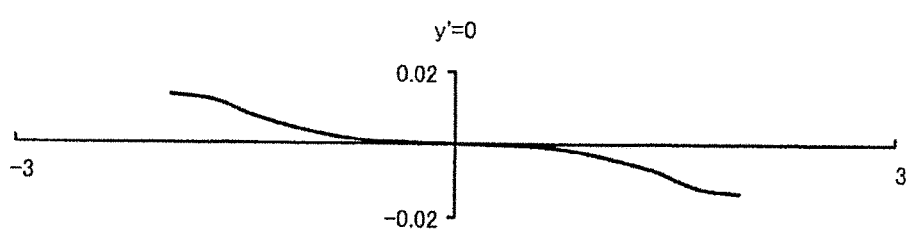
Figure 31C:
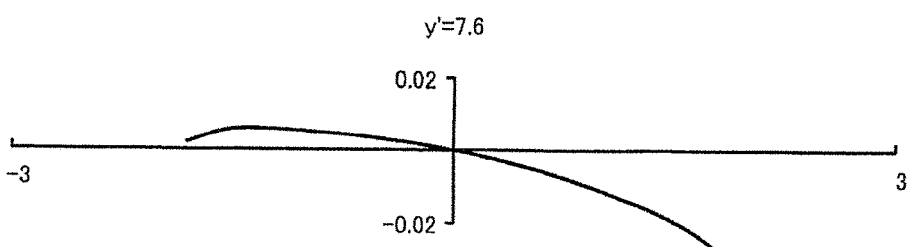
Figure 31D:
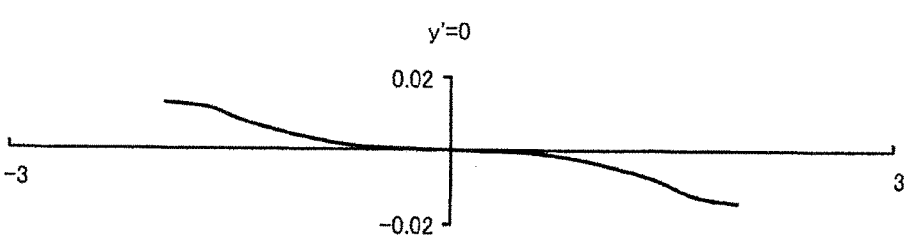
Figure 31E:
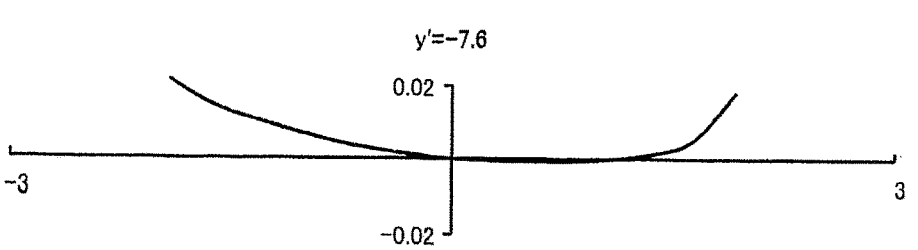
Figure 32A:
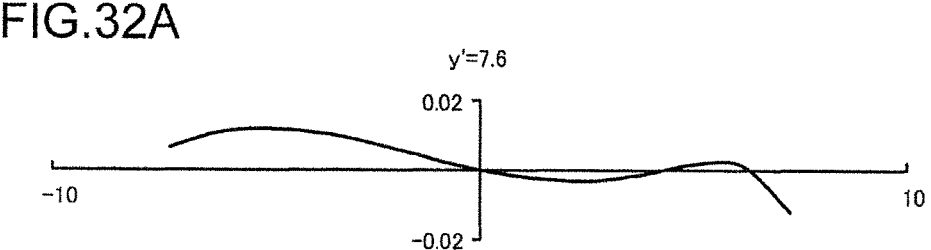
FIGS. 32A to 32E are lateral aberration diagram of Example 7, without and with camera shake correction, at the telephoto end.
Figure 32B:
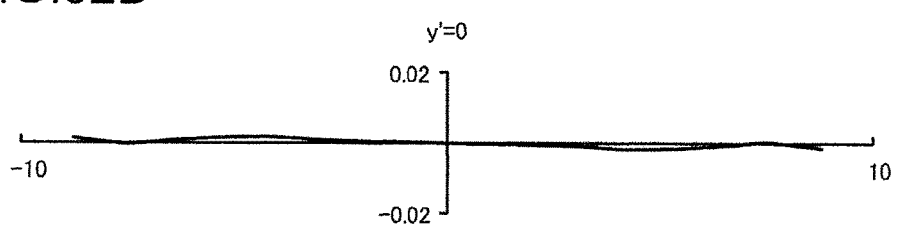
Figure 32C:
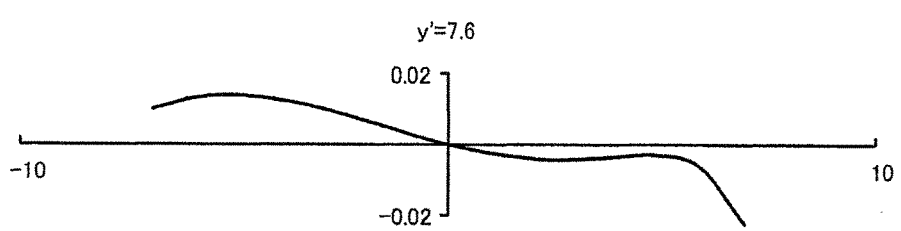
Figure 32D:
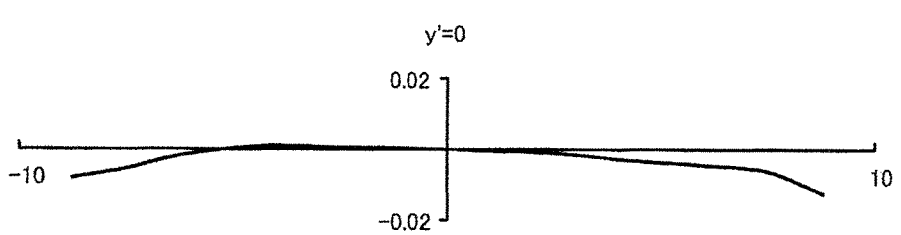
Figure 32E:
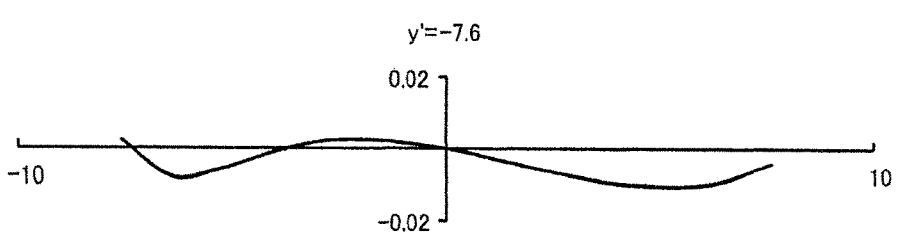

Next, by way of a fifth to a seventh embodiment, specific optical constructions of the zoom lens system ZL will be described in more detail. FIGS. 21 to 23 comprise optical construction diagrams corresponding to the zoom lens system ZL in the fifth to seventh embodiments respectively, showing, in an optical section, the lens arrangement, lens shapes, etc. observed at the wide-angle end (W), at the middle focal length (M), and at the telephoto end (T).

In the fifth to seventh embodiments (FIGS. 21 to 23), the zoom lens system ZL includes, from the object side, a first lens group Gr1 having a positive optical power, a second lens group Gr2 having a negative optical power, a third lens group Gr3 having a positive optical power, a fourth lens group Gr4 having a positive optical power, and a fifth lens group Gr5 having a negative optical power, and is so constructed as to achieve magnification variation (that is, zooming) by varying axial distances between the lens groups. For magnification variation, at least the third lens group Gr3, the fourth lens group Gr4, and the fifth lens group Gr5 move relative to the image surface IM. An aperture stop ST is located at the object side of the third lens group Gr3, and moves together with the third lens group Gr3 during zooming. For focusing, the fourth lens group Gr4 moves along the optical axis AX. That is, the fourth lens group Gr4 is a focusing group, and as indicated by arrow mF, moves toward the object side during focusing on a close object. A sub group GrV including the most image-side lens element in the second lens group Gr2 is a vibration correction group, and as indicated by arrow mV, moves perpendicularly to the optical axis AX for vibration correction.

In the fifth embodiment (FIG. 21), the zoom lens system ZL has five lens groups, namely a positive, a negative, a positive, a positive, and a negative lens group, and has a zoom arrangement where, during zooming, all the lens groups are movable. Here, the third lens group Gr3 and the fifth lens group Gr5 are linked together so as to move together. During magnification variation from the wide-angle end (W) to the telephoto end (T), the first lens group Gr1 moves monotonically toward the object side, the second lens group Gr2 moves first toward the object side and then toward the image side. The third to fifth lens groups Gr3 to Gr5 move monotonically toward the object side.

In the sixth embodiment (FIG. 22), the zoom lens system ZL has five lens groups, namely a positive, a negative, a positive, a positive, and a negative lens group, and has a zoom arrangement where, during zooming, all the lens groups are movable. Here, the third lens group Gr3 and the fifth lens group Gr5 are linked together so as to move together. During magnification variation from the wide-angle end (W) to the telephoto end (T), the first lens group Gr1 moves monotonically toward the object side, the second lens group Gr2 moves first toward the image side, then toward the object side, and then again toward the image side. The third to fifth groups Gr3 to Gr5 move toward the object side and, short of the telephoto end (T), back toward the image side.

In the seventh embodiment (FIG. 23), the zoom lens system ZL has six lens groups, namely a positive, a negative, a positive, a positive, a negative, and a positive lens group, and has a zoom arrangement where, during zooming, the first to fifth lens groups Gr1 to Gr5 are movable. Here, the third lens group Gr3 and the fifth lens group Gr5 are linked together so as to move together. During magnification variation from the wide-angle end (W) to the telephoto end (T), the first lens group Gr1 moves monotonically toward the object side, the second lens group Gr2 moves first toward the object side, then toward the image side, and then again toward the object side. The third to fifth groups Gr3 to Gr5 move monotonically toward the object side.

In the fifth embodiment (FIG. 21), each lens group is composed, in terms of the paraxial surface shapes of the constituent lens elements, as follows from the object side. The first lens group Gr1 is composed of a doublet lens element made up of a negative meniscus lens element concave to the image side and a positive meniscus lens element convex to the object side and a positive meniscus lens element convex to the object side. The second lens group Gr2 is composed of a negative meniscus lens element concave to the image side, a biconcave negative lens element, a biconvex positive lens element having aspherical surfaces on both sides, and a doublet lens element (a sub group GrV) made up of a biconcave negative lens element and a planoconvex positive lens element. The third lens group Gr3 is composed of a biconvex positive lens element having aspherical surfaces on both sides and a doublet lens element made up of a biconcave negative lens element and a biconvex positive lens element. To the object side of the third lens group Gr3, an aperture stop ST is arranged. The fourth lens group Gr4 is composed of a single biconvex positive lens element having aspherical surfaces on both sides. The fifth lens group Gr5 is composed of a single doublet lens element made up of a biconcave negative lens element and a positive meniscus lens element convex to the object side.

In the sixth embodiment (FIG. 22), each lens group is composed, in terms of the paraxial surface shapes of the constituent lens elements, as follows from the object side. The first lens group Gr1 is composed of a doublet lens element made up of a negative meniscus lens element concave to the image side and a positive meniscus lens element convex to the object side and a positive meniscus lens element convex to the object side. The second lens group Gr2 is composed of a negative meniscus lens element concave to the image side, a biconcave negative lens element, a biconvex positive lens element having aspherical surfaces on both sides, and a negative meniscus lens element concave to the object side (a sub group GrV). The third lens group Gr3 is composed of a biconvex positive lens element having aspherical surfaces on both sides and a doublet lens element made up of a biconcave negative lens element and a biconvex positive lens element. To the object side of the third lens group Gr3, an aperture stop ST is arranged. The fourth lens group Gr4 is composed of a single positive meniscus lens element convex to the image side and having aspherical surfaces on both sides. The fifth lens group Gr5 is composed of a single biconcave negative lens element.

In the seventh embodiment (FIG. 23), each lens group is composed, in terms of the paraxial surface shapes of the constituent lens elements, as follows from the object side. The first lens group Gr1 is composed of a doublet lens element made up of a negative meniscus lens element concave to the image side and a positive meniscus lens element convex to the object side and a positive meniscus lens element convex to the object side. The second lens group Gr2 is composed of two negative meniscus lens elements concave to the image side, a biconvex positive lens element having aspherical surfaces on both sides, and a doublet lens element (a sub group GrV) made up of a biconcave negative lens element and a planoconvex positive lens element. The third lens group Gr3 is composed of a biconvex positive lens element and a doublet lens element made up of a biconcave negative lens element and a biconvex positive lens element. To the object side of the third lens group Gr3, an aperture stop ST is arranged. The fourth lens group Gr4 is composed of a single biconvex positive lens element having aspherical surfaces on both sides. The fifth lens group Gr5 is composed of a single doublet lens element made up of a biconcave negative lens element and a positive meniscus lens element convex to the object side. The sixth lens group Gr6 is composed of a single biconvex positive lens element.

EXAMPLES

Hereinafter, the construction and other features of variable-magnification optical systems embodying the present invention will be described more specifically with reference to the construction data and other data of practical examples. Examples 1 to 7 (EX1 to EX7) presented below are numerical examples corresponding to the first to seventh embodiments, respectively, described above. Accordingly, the optical construction diagrams (FIGS. 1 to 4) showing the first to fourth embodiments also show the lens arrangement, lens shapes, and other features of the corresponding ones of Examples 1 to 4, and the optical construction diagrams (FIGS. 21 to 23) showing the fifth to seventh embodiments also show the lens arrangement, optical path, and other features of the corresponding ones of Examples 5 to 7.

In the construction data of each practical example, listed as surface data are, from left to right, surface number, radius of curvature r (mm), axial surface-to-surface distance d (mm), refractive index nd for the d-line (with a wavelength of 587.56 nm), and Abbe number νd for the d-line. A surface whose surface number is marked with an asterisk "*" is an aspherical surface, of which the surface shape is defined by formula (AS) below in a local rectangular coordinate system (x, y, z) having its origin at the vertex of the surface. Listed as aspherical surface data are aspherical surface coefficients etc. In the aspherical surface data of each practical example, any absent term indicates that the corresponding coefficient equals zero, and throughout the data, "E-n" stands for "$\times 10^{-n}$."

$$z=(c \cdot h^2)/\{1+\sqrt{[1-(1+K) \cdot c^2 \cdot h^2]}\}+\Sigma(Aj \cdot h^j) \quad (AS)$$

where h represents the height in the direction perpendicular to the z-axis (optical axis AX) ($h^2=x^2+y^2$);

z represents the amount of sag in the optical axis AX direction at the height h (relative to the vertex of the surface)

c represents the curvature (the reciprocal of the radius of curvature) at the vertex of the surface;

K represents a conic constant; and

Aj represents the aspherical surface coefficient of order j.

Listed as miscellaneous data are zoom ratio and, for each of the different focal length conditions W, M, and T, focal length (f, mm) of the entire system, f-number (FNO), half-angle of view (ω, °), image height (Y', mm), total lens length (TL, mm), backfocus (BF, mm), and variable surface-to-surface distance di (where i represents the surface number, mm). Listed as zooming group data are the focal lengths of the respective lens groups (f1, f2, f3, f4, f5, f6; mm). Here, the backfocus BF denotes the distance from the image-side surface of the plane-parallel plate PT to the image surface IM, and the total lens length TL denotes the distance from the foremost surface of the lens system to the image surface IM. Tables 1 and 3 list data related to the relevant formulae in each practical example, and Tables 2 and 4 list values corresponding to the relevant formulae in each practical example.

FIGS. 5A-5I, FIGS. 6A-6I, FIGS. 7A-7I, and FIGS. 8A-8I are longitudinal aberration diagrams (in ordinary condition (without decentering), focused at infinity) corresponding to Examples 1 to 4 (EX1 to EX4) respectively, FIGS. 5A-5C, 6A-6C, 7A-7C, and 8A-8C showing the aberrations observed at the wide-angle end (W), FIGS. 5D-5F, 6D-6F, 7D-7F, and 8D-8F showing the aberrations observed at the middle focal length (M), and FIGS. 5G-5I, 6G-6I, 7G-7I, and 8G-8I showing the aberrations observed at the telephoto end (T). Of these diagrams, FIGS. 5A, 5D, 5G, 6A, 6D, 6G, 7A, 7D, 7G, 8A, 8D, and 8G are spherical aberration diagrams, FIGS. 5B, 5E, 5H, 6B, 6E, 6H, 7B, 7E, 7H, 8B, and 8H are astigmatism diagrams, and FIGS. 5C, 5F, 5I, 6C, 6F, 6I, 7C, 7F, 7I, 8C, 8F, and 8I are distortion diagrams.

In spherical aberration diagrams, a solid line represents the amount of spherical aberration for the d-line (with a wavelength of 587.56 nm), a dash-and-dot line represents the amount of spherical aberration for the C-line (with a wavelength of 656.28 nm), and a broken line represents the amount of spherical aberration for the g-line (with a wavelength of 435.84 nm), all in terms of deviations (mm) from the paraxial image surface in the optical axis AX direction, the vertical axis representing the height of incidence at the pupil as normalized with respect to the maximum height of incidence (hence, the relative height at the pupil). In astigmatism diagrams, a broken line T represents the tangential image surface for the d-line, and a solid line S represents the sagittal image surface for the d-line, both in terms of deviations (mm) from the paraxial image surface in the optical axis AX direction, the vertical axis representing the image height (IMG HT, in mm) In distortion diagrams, the horizontal axis represents the distortion (%) for the d-line, and the vertical axis represents the image height (IMG HT, in mm). The maximum value of the image height IMG HT corresponds to one-half of the diagonal length of the light-receiving surface SS of the image sensing device SR.

FIGS. 9A-9F, 10A-10F, and 11A-11F, FIGS. 12A-12F, 13A-13F, and 14A-14F, FIGS. 15A-15F, 16A-16F, and 17A-17F, and FIGS. 18A-18F, 19A-19F, and 20A-20F are lateral aberration diagrams corresponding to Examples 1 to 4 (EX1 to EX4) respectively, showing the lateral aberrations (mm) observed in ordinary condition (without decentering) in each of the different focal length conditions W, M, and T. Of these diagrams, FIGS. 9A-9C, 10A-10C, and 11A-11C, FIGS. 12A-12C, 13A-13C, and 14A-14C, FIGS. 15A-15C, 16A-16C, and 17A-17C, and FIGS. 18A-18C, 19A-19C, and 20A-20C show the lateral aberrations in tangential rays, and FIGS. 9D-9F, 10D-10F, and 11D-11F, FIGS. 12D-12F, 13D-13F, and 14D-14F, FIGS. 15D-15F, 16D-16F, and 17D-17F, and FIGS. 18D-18F, 19D-19F, and 20D-20F show the lateral aberrations in sagittal rays. Here, the lateral aberrations observed at the image height ratio (half-angle of view ω°) indicated under RELATIVE FIELD HEIGHT are represented by a solid line for the d-line (with a wavelength of 587.56 nm), by a dash-and-dot line for the C-line (with a wavelength of 656.28 nm), and by a broken line for the g-line (with a wavelength of 435.84 nm). An image height ratio is a relative image height obtained by normalizing an image height with respect to the maximum image height Y'.

FIGS. 24A-24I, FIGS. 25A-25I, and FIGS. 26A-26I are aberration diagrams (in ordinary condition (without decentering), focused at infinity) corresponding to Examples 5 to 7 (EX5 to EX7) respectively, FIGS. 24A-24C, 25A-25C, and 26A-26C showing the aberrations observed at the wide-angle end (W), FIGS. 24D-24F, 25D-25F, and 26D-26F showing the aberrations observed at the middle focal length (M), and FIGS. 24G-24I, 25G-25I, FIGS. 26G-26I showing the aberrations observed at the telephoto end (T) (the diagrams suffixed with "A," "D," and "G" showing spherical aberrations etc., the diagrams suffixed with "B," "E," and "H" showing astigmatism, and the diagrams suffixed with "C," "F," and "I" showing distortion). In these diagrams, FNO represents f-number, and Y' (mm) represents the maximum image height on the light-receiving surface SS of the image sensing device SR (corresponding to the distance from the optical axis AX). In spherical aberration diagrams, a solid line d, a dash-and-dot line g, and a dash-dot-dot line c represent the spherical aberration (mm) for the d-, g-, and c-lines respectively, and a broken line SC represent the deviation (mm) from the sine condition. In astigmatism diagrams, a broken line DM represents the meridional image surface, and a solid line DS represents a sagittal image surface, each representing the astigmatism (mm) for the d-line. In distortion diagrams, a solid line represents the distortion (%) for the d-line.

FIGS. 27A-27E and 28A-28E, FIGS. 29A-29E and 30A-30E, and FIGS. 31A-31E and 32A-32E are lateral aberration diagrams of Examples 5 to 7 (EX5 to EX7), respectively, without decentering (in ordinary condition) and with decentering (during camera shake correction), all with focus at infinity. FIGS. 27A-27E and 28A-28E correspond to Example 5, FIGS. 29A-29E and 30A-30E correspond to Example 6, and FIGS. 31A-31E and 32A-32E correspond to Example 7. Of these diagrams, FIGS. 27A, 27B, 28A, 28B, 29A, 29B, 30A, 30B, 31A, 31B, 32A, and 32B are lateral aberration diagrams without decentering, and FIGS. 27C-27E, 28C-28E, 29C-29E, 30C-30E, 31C-31E, and 32C-32E are lateral aberration diagrams with decentering (y' (mm) represents the image height on the light-receiving surface SS of the image sensing device SR (corresponding to the distance from the optical axis AX)). FIGS. 27A-27E, 29A-29E, and 31A-31E show the degradation in axial and off-axial lateral aberrations observed when image blur of an angle of 0.3 degrees is corrected by decentering the decenterable lens component (that is, the sub group (vibration correction group) GrV) at the wide-angle end (W), and FIGS. 28A-28E, 30A-30E, and 32A-32E show the degradation in axial and off-axial lateral aberrations observed when image blur of an angle of 0.3 degrees is corrected by decentering the decenterable lens component at the telephoto end (T).

Example 1

Unit: mm

Surface Data

| Surface No. | r | d | nd | vd |
|---|---|---|---|---|
| 1 | 53.353 | 1.200 | 1.8467 | 23.78 |
| 2 | 34.674 | 6.416 | 1.4970 | 81.61 |
| 3 | 402.870 | 0.100 | | |
| 4 | 38.442 | 4.236 | 1.6968 | 55.46 |
| 5 | 191.178 | d5 | | |
| 6 | 312.305 | 0.800 | 1.9108 | 35.25 |
| 7 | 11.384 | 4.798 | | |
| 8 | −33.732 | 0.800 | 1.7725 | 49.62 |
| 9 | 34.947 | 0.100 | | |
| 10 | 21.959 | 3.793 | 1.8467 | 23.78 |
| 11 | −24.154 | 0.854 | | |
| 12 | −18.083 | 0.800 | 1.8348 | 42.72 |
| 13 | −130.439 | d13 | | |
| 14 (Aperture) | ∞ | 0.100 | | |
| 15* | 15.000 | 2.454 | 1.7308 | 40.50 |
| 16* | −64.765 | 3.097 | | |
| 17 | −97.252 | 0.800 | 1.9037 | 31.31 |
| 18 | 11.577 | 4.360 | 1.4970 | 81.61 |
| 19 | −12.667 | d19 | | |
| 20* | −968.683 | 3.846 | 1.5831 | 59.38 |
| 21* | −35.765 | d21 | | |
| 22 | −66.082 | 0.800 | 1.8348 | 42.72 |

-continued

Unit: mm

| | | | | |
|---|---|---|---|---|
| 23 | 22.247 | d23 | | |
| 24 | 35.757 | 2.171 | 1.6727 | 32.17 |
| 25 | −658.266 | 13.500 | | |
| 26 | ∞ | 4.200 | 1.5168 | 64.20 |
| 27 | ∞ | BF | | |

Aspherical Surface Data

| | K | A4 | A6 | A8 |
|---|---|---|---|---|
| Surface 15 | 0.00000 | 7.4222E−06 | −9.8313E−09 | 1.9918E−09 |
| Surface 16 | 0.00000 | 8.6528E−05 | −1.1015E−08 | −1.3227E−10 |
| Surface 20 | 0.00000 | −1.1988E−04 | −9.3860E−07 | 0.0000E+00 |
| Surface 21 | 0.00000 | −1.2049E−04 | −6.4789E−07 | 0.0000E+00 |

Miscellaneous Data
Zoom Ratio 6.95

| | Wide (W) | Mid (M) | Tele (T) |
|---|---|---|---|
| Focal Length | 14.260 | 37.580 | 99.050 |
| F-number | 3.500 | 5.000 | 5.600 |
| Half-Angle of View (°) | 37.186 | 16.056 | 6.231 |
| Image Height | 9.717 | 11.198 | 11.406 |
| Total Lens Length | 94.980 | 98.931 | 109.980 |
| BF | 1.050 | 1.050 | 1.050 |
| d5 | 2.000 | 14.277 | 26.978 |
| d13 | 23.992 | 8.813 | 2.000 |
| d19 | 2.489 | 3.893 | 13.003 |
| d21 | 2.594 | 7.308 | 2.000 |
| d23 | 3.630 | 4.364 | 5.723 |

Zoom Lens Group Data

| Group | Starting Surface | Focal Length |
|---|---|---|
| 1 | 1 | 53.023 |
| 2 | 6 | −10.787 |
| 3 | 15 | 19.161 |
| 4 | 20 | 63.589 |
| 5 | 22 | −19.855 |
| 6 | 24 | 50.479 |

Example 2

Unit: mm

Surface Data

| Surface No. | r | d | nd | vd |
|---|---|---|---|---|
| 1 | 45.466 | 1.200 | 1.8467 | 23.78 |
| 2 | 31.613 | 5.943 | 1.4970 | 81.61 |
| 3 | 250.961 | 0.100 | | |
| 4 | 44.010 | 3.874 | 1.6968 | 55.46 |
| 5 | 226.794 | d5 | | |
| 6 | −851.489 | 0.800 | 1.9108 | 35.25 |
| 7 | 10.873 | 4.711 | | |
| 8 | −35.933 | 0.800 | 1.8042 | 46.50 |
| 9 | 443.298 | 0.166 | | |
| 10 | 20.941 | 2.943 | 1.9229 | 20.88 |
| 11 | −82.200 | 0.800 | 1.8348 | 42.72 |
| 12 | 37.313 | d12 | | |
| 13 (Aperture) | ∞ | 0.100 | | |
| 14* | 16.355 | 4.031 | 1.7308 | 40.50 |
| 15* | −24.902 | 2.084 | | |
| 16 | −24.142 | 1.883 | 1.9037 | 31.31 |
| 17 | 13.821 | 6.282 | 1.4970 | 81.61 |
| 18 | −11.790 | d18 | | |
| 19* | −802.917 | 4.200 | 1.5891 | 61.25 |
| 20* | −35.420 | d20 | | |
| 21 | −86.192 | 0.800 | 1.8348 | 42.72 |
| 22 | 21.050 | 3.674 | | |

-continued

Unit: mm

| | | | | |
|---|---|---|---|---|
| 23 | 44.976 | 2.646 | 1.6730 | 38.15 |
| 24 | −88.794 | d24 | | |
| 25 | ∞ | 4.200 | 1.5168 | 64.20 |
| 26 | ∞ | BF | | |

Aspherical Surface Data

| | K | A4 | A6 | A8 |
|---|---|---|---|---|
| Surface 14 | 0.00000 | −5.4651E−06 | 1.0123E−07 | 9.6859E−09 |
| Surface 15 | 0.00000 | 8.2055E−05 | 1.3694E−07 | 9.7214E−09 |
| Surface 19 | 0.00000 | −1.1413E−04 | −7.1734E−07 | 0.0000E+00 |
| Surface 20 | 0.00000 | −1.1072E−04 | −4.8996E−07 | 0.0000E+00 |

Miscellaneous Data
Zoom Ratio 6.95

| | Wide (W) | Mid (M) | Tele (T) |
|---|---|---|---|
| Focal Length | 14.260 | 37.590 | 99.060 |
| F-number | 3.600 | 5.000 | 5.500 |
| Half-Angle of View (°) | 37.182 | 16.053 | 6.231 |
| Image Height | 9.721 | 11.319 | 11.684 |
| Total Lens Length | 99.643 | 102.280 | 113.387 |
| BF | 1.050 | 1.050 | 1.050 |
| d5 | 2.249 | 14.243 | 28.562 |
| d12 | 26.227 | 8.973 | 2.081 |
| d18 | 2.373 | 4.308 | 14.711 |
| d20 | 2.805 | 8.179 | 2.115 |
| d24 | 13.702 | 14.289 | 13.631 |

Zoom Lens Group Data

| Group | Starting Surface | Focal Length |
|---|---|---|
| 1 | 1 | 55.083 |
| 2 | 6 | −11.414 |
| 3 | 14 | 20.822 |
| 4 | 19 | 62.771 |
| 5 | 21 | −44.660 |

Example 3

Unit: mm

Surface Data

| Surface No. | r | d | nd | vd |
|---|---|---|---|---|
| 1 | 55.637 | 1.200 | 1.8467 | 23.78 |
| 2 | 35.997 | 5.169 | 1.4970 | 81.61 |
| 3 | 688.516 | 0.100 | | |
| 4 | 41.080 | 4.006 | 1.6968 | 55.46 |
| 5 | 195.320 | d5 | | |
| 6 | −454.535 | 0.800 | 1.9108 | 35.25 |
| 7 | 10.583 | 4.625 | | |
| 8 | −30.504 | 0.800 | 1.8810 | 40.14 |
| 9 | 29.951 | 0.100 | | |
| 10 | 22.006 | 2.919 | 1.9229 | 20.88 |
| 11 | −61.375 | d11 | | |
| 12 (Aperture) | ∞ | 0.100 | | |
| 13* | 15.660 | 4.639 | 1.7308 | 40.50 |
| 14* | −48.995 | 2.624 | | |
| 15 | −48.941 | 0.800 | 1.9037 | 31.31 |
| 16 | 12.525 | 7.782 | 1.4970 | 81.61 |
| 17 | −12.999 | d17 | | |
| 18* | −940.006 | 4.200 | 1.5831 | 59.46 |
| 19* | −36.781 | d19 | | |
| 20 | −54.041 | 0.800 | 1.8830 | 40.80 |
| 21 | 22.058 | 1.000 | 1.4970 | 81.61 |
| 22 | 23.898 | 1.948 | | |
| 23 | 29.826 | 2.894 | 1.6541 | 39.68 |
| 24 | −131.437 | d24 | | |

-continued

| Unit: mm | | | | |
|---|---|---|---|---|
| 25 | ∞ | 4.200 | 1.5168 | 64.20 |
| 26 | ∞ | BF | | |

Aspherical Surface Data

| | K | A4 | A6 | A8 |
|---|---|---|---|---|
| Surface 13 | 0.00000 | 1.6992E−05 | 1.5202E−07 | 1.0224E−08 |
| Surface 14 | 0.00000 | 9.3824E−05 | 3.0875E−07 | 1.2966E−08 |
| Surface 18 | 0.00000 | −1.0940E−04 | −6.1173E−07 | 0.0000E+00 |
| Surface 19 | 0.00000 | −1.0586E−04 | −4.3117E−07 | 0.0000E+00 |

Miscellaneous Data
Zoom Ratio 6.95

| | Wide (W) | Mid (M) | Tele (T) |
|---|---|---|---|
| Focal Length | 14.260 | 37.580 | 99.050 |
| F-number | 3.600 | 5.000 | 5.500 |
| Half-Angle of View (°) | 37.185 | 16.056 | 6.231 |
| Image Height | 9.720 | 11.078 | 11.484 |
| Total Lens Length | 99.980 | 103.937 | 113.974 |
| BF | 1.050 | 1.050 | 1.050 |
| d5 | 2.301 | 13.711 | 30.225 |
| d11 | 26.501 | 8.831 | 2.045 |
| d17 | 2.392 | 3.802 | 14.447 |
| d19 | 3.530 | 8.133 | 2.000 |
| d24 | 13.500 | 17.703 | 13.500 |

Zoom Lens Group Data

| Group | Starting Surface | Focal Length |
|---|---|---|
| 1 | 1 | 55.323 |
| 2 | 6 | −11.763 |
| 3 | 13 | 21.854 |
| 4 | 18 | 65.531 |
| 5 | 20 | −40.815 |

-continued

| Unit: mm | | | | |
|---|---|---|---|---|
| 26 | ∞ | 4.200 | 1.5168 | 64.20 |
| 27 | ∞ | BF | | |

Aspherical Surface Data

| | K | A4 | A6 | A8 |
|---|---|---|---|---|
| Surface 13 | 0.00000 | 2.0212E−05 | 4.4038E−07 | 1.2928E−08 |
| Surface 14 | 0.00000 | 9.6020E−05 | 7.0304E−07 | 1.6560E−08 |
| Surface 18 | 0.00000 | −8.8546E−05 | 2.7168E−08 | 0.0000E+00 |
| Surface 20 | 0.00000 | −5.0144E−05 | 0.0000E+00 | 0.0000E+00 |

Miscellaneous Data
Zoom Ratio 6.95

| | Wide (W) | Mid (M) | Tele (T) |
|---|---|---|---|
| Focal Length | 14.260 | 37.580 | 99.060 |
| F-number | 3.600 | 5.000 | 5.500 |
| Half-Angle of View (°) | 37.184 | 16.054 | 6.231 |
| Image Height | 9.729 | 11.008 | 11.383 |
| Total Lens Length | 99.980 | 104.333 | 113.986 |
| BF | 1.050 | 1.050 | 1.050 |
| d5 | 2.178 | 13.391 | 29.559 |
| d11 | 26.288 | 9.032 | 2.379 |
| d17 | 2.387 | 4.195 | 14.395 |
| d20 | 3.661 | 8.061 | 2.000 |
| d25 | 13.500 | 17.688 | 13.688 |

Zoom Lens Group Data

| Group | Starting Surface | Focal Length |
|---|---|---|
| 1 | 1 | 55.323 |
| 2 | 6 | −11.763 |
| 3 | 13 | 21.854 |
| 4 | 18 | 65.531 |
| 5 | 21 | −40.815 |

Example 4

| Unit: mm | | | | |
|---|---|---|---|---|
| Surface Data | | | | |
| Surface No. | r | d | nd | vd |
| 1 | 55.068 | 1.200 | 1.8467 | 23.78 |
| 2 | 35.333 | 5.320 | 1.4970 | 81.61 |
| 3 | 482.141 | 0.100 | | |
| 4 | 39.209 | 4.129 | 1.6968 | 55.46 |
| 5 | 183.047 | d5 | | |
| 6 | −6788.303 | 0.800 | 1.8830 | 40.80 |
| 7 | 10.292 | 4.753 | | |
| 8 | −34.335 | 0.800 | 1.8830 | 40.80 |
| 9 | 32.325 | 0.100 | | |
| 10 | 21.895 | 2.847 | 1.9229 | 20.88 |
| 11 | −104.275 | d11 | | |
| 12 (Aperture) | ∞ | 0.100 | | |
| 13* | 15.819 | 4.124 | 1.7308 | 40.50 |
| 14* | −50.999 | 2.696 | | |
| 15 | −38.375 | 0.800 | 1.9037 | 31.31 |
| 16 | 13.826 | 6.345 | 1.4970 | 81.61 |
| 17 | −12.402 | d17 | | |
| 18* | 224178.550 | 4.200 | 1.5831 | 59.46 |
| 19 | −33.203 | 2.000 | 1.8820 | 37.22 |
| 20* | −34.848 | d20 | | |
| 21 | −45.157 | 0.800 | 1.8830 | 40.80 |
| 22 | 24.457 | 0.963 | 1.4970 | 81.61 |
| 23 | 23.855 | 1.604 | | |
| 24 | 28.021 | 3.034 | 1.6541 | 39.68 |
| 25 | −101.530 | d25 | | |

Example 5

| Unit: mm | | | | |
|---|---|---|---|---|
| Surface Data | | | | |
| Surface No. | r | d | nd | vd |
| 1 | 48.898 | 1.800 | 1.84666 | 23.78 |
| 2 | 32.654 | 6.169 | 1.49700 | 81.61 |
| 3 | 272.082 | 0.300 | | |
| 4 | 32.035 | 4.572 | 1.69680 | 55.48 |
| 5 | 109.041 | Variable | | |
| 6 | 269.010 | 1.200 | 1.91082 | 35.25 |
| 7 | 9.488 | 5.286 | | |
| 8 | −219.618 | 0.800 | 1.77250 | 49.65 |
| 9 | 25.498 | 0.504 | | |
| 10* | 23.223 | 2.903 | 1.84666 | 23.78 |
| 11* | −80.599 | 1.000 | | |
| 12 | −46.624 | 0.800 | 1.83481 | 42.72 |
| 13 | 33.992 | 1.609 | 1.84666 | 23.78 |
| 14 | ∞ | Variable | | |
| 15 (Aperture) | ∞ | 0.930 | | |
| 16* | 10.618 | 3.818 | 1.73077 | 40.50 |
| 17* | −82.008 | 1.817 | | |
| 18 | −89.945 | 1.057 | 1.90366 | 31.31 |
| 19 | 7.459 | 4.867 | 1.49700 | 81.61 |
| 20 | −24.493 | Variable | | |
| 21* | 30.345 | 2.867 | 1.58313 | 59.38 |
| 22* | −51.375 | Variable | | |
| 23 | −72.731 | 1.000 | 1.83481 | 42.72 |
| 24 | 20.048 | 1.834 | 1.67270 | 32.17 |
| 25 | 73.090 | Variable | | |

-continued

| Unit: mm | | | | |
|---|---|---|---|---|
| 26 | ∞ | 4.200 | 1.51680 | 64.20 |
| 27 | ∞ | BF | | |

Aspherical Surface Data

| | K | A4 | A6 | A8 |
|---|---|---|---|---|
| Surface 10 | 0.00000 | −2.26008E−06 | −1.12461E−07 | −7.12245E−09 |
| Surface 11 | 0.00000 | −4.13799E−05 | −1.90824E−07 | −8.43392E−09 |
| Surface 16 | 0.00000 | −3.83814E−05 | −1.45574E−08 | 4.00546E−09 |
| Surface 17 | 0.00000 | 3.32806E−05 | 3.50436E−07 | 2.45802E−09 |
| Surface 21 | 0.00000 | −8.40535E−05 | −2.14381E−06 | |
| Surface 22 | 0.00000 | −8.48713E−05 | −2.02828E−06 | |

Miscellaneous Data
Zoom Ratio 7.143

| | Wide (W) | Mid (M) | Tele (T) |
|---|---|---|---|
| Focal Length | 14.000 | 37.422 | 100.000 |
| F-number | 3.600 | 5.000 | 5.700 |
| Half-Angle of View (°) | 37.686 | 16.119 | 6.173 |
| Image Height | 9.704 | 10.854 | 10.984 |
| Total Lens Length | 95.044 | 104.622 | 115.000 |
| BF | 1.076 | 1.054 | 0.991 |
| d5 | 1.324 | 12.639 | 24.576 |
| d14 | 21.043 | 8.844 | 1.970 |
| d20 | 7.911 | 6.367 | 8.513 |
| d22 | 2.802 | 4.346 | 2.200 |
| d25 | 11.554 | 22.038 | 27.417 |

Zoom Lens Group Data

| Group | Starting Surface | Focal Length |
|---|---|---|
| 1 | 1 | 49.663 |
| 2 | 6 | −10.103 |
| 3 | 15 | 22.659 |
| 4 | 21 | 33.143 |
| 5 | 23 | −34.395 |

Example 6

| Unit: mm | | | | |
|---|---|---|---|---|
| Surface Data | | | | |
| Surface No. | r | d | nd | vd |
| 1 | 46.831 | 1.800 | 1.84666 | 23.78 |
| 2 | 31.030 | 5.572 | 1.49700 | 81.61 |
| 3 | 179.398 | 0.300 | | |
| 4 | 27.841 | 4.571 | 1.69680 | 55.48 |
| 5 | 87.175 | Variable | | |
| 6 | 156.065 | 1.200 | 1.91082 | 35.25 |
| 7 | 9.247 | 5.536 | | |
| 8 | −39.150 | 0.800 | 1.77250 | 49.65 |
| 9 | 23.322 | 0.501 | | |
| 10* | 22.052 | 2.974 | 1.84666 | 23.78 |
| 11* | −42.991 | 1.000 | | |
| 12 | −35.026 | 0.800 | 1.49700 | 81.61 |
| 13 | −152.535 | Variable | | |
| 14 (Aperture) | ∞ | 0.930 | | |
| 15* | 10.953 | 2.612 | 1.73077 | 40.50 |
| 16* | −76.558 | 1.646 | | |
| 17 | −324.973 | 1.001 | 1.90366 | 31.31 |
| 18 | 7.913 | 4.597 | 1.49700 | 81.61 |
| 19 | −21.398 | Variable | | |
| 20* | −65.511 | 2.648 | 1.58313 | 59.38 |
| 21* | −18.281 | Variable | | |
| 22 | −30.571 | 1.000 | 1.83481 | 42.72 |
| 23 | 1223.683 | Variable | | |

-continued

| Unit: mm | | | | |
|---|---|---|---|---|
| 24 | ∞ | 4.200 | 1.51680 | 64.20 |
| 25 | ∞ | BF | | |

Aspherical Surface Data

| | K | A4 | A6 | A8 |
|---|---|---|---|---|
| Surface 10 | 0.00000 | 3.46391E−06 | 1.77182E−07 | −1.29219E−08 |
| Surface 11 | 0.00000 | −2.40172E−05 | 1.56016E−07 | −1.33631E−08 |
| Surface 15 | 0.00000 | −3.55272E−05 | −1.25475E−07 | 1.16889E−08 |
| Surface 16 | 0.00000 | 4.25279E−05 | 2.18514E−07 | 6.64296E−09 |
| Surface 20 | 0.00000 | −1.55759E−04 | −3.96523E−06 | |
| Surface 21 | 0.00000 | −1.06996E−04 | −2.97413E−06 | |

Miscellaneous Data
Zoom Ratio 5.000

| | Wide (W) | Mid (M) | Tele (T) |
|---|---|---|---|
| Focal Length | 14.000 | 31.300 | 70.000 |
| F-number | 3.600 | 5.000 | 5.700 |
| Half-Angle of View (°) | 37.686 | 19.061 | 8.783 |
| Image Height | 9.696 | 10.765 | 10.980 |
| Total Lens Length | 87.458 | 91.726 | 100.000 |
| BF | 1.076 | 1.055 | 0.991 |
| d5 | 1.272 | 6.723 | 20.278 |
| d13 | 19.335 | 6.960 | 1.970 |
| d19 | 8.004 | 6.147 | 7.344 |
| d21 | 2.803 | 4.660 | 3.463 |
| d23 | 11.281 | 22.494 | 22.266 |

Zoom Lens Group Data

| Group | Starting Surface | Focal Length |
|---|---|---|
| 1 | 1 | 47.089 |
| 2 | 6 | −10.516 |
| 3 | 14 | 20.050 |
| 4 | 20 | 42.604 |
| 5 | 22 | −35.715 |

Example 7

| Unit: mm | | | | |
|---|---|---|---|---|
| Surface Data | | | | |
| Surface No. | r | d | nd | vd |
| 1 | 49.692 | 1.800 | 1.84666 | 23.78 |
| 2 | 33.275 | 6.163 | 1.49700 | 81.61 |
| 3 | 338.133 | 0.300 | | |
| 4 | 33.430 | 4.469 | 1.69680 | 55.48 |
| 5 | 121.392 | Variable | | |
| 6 | 900.526 | 1.200 | 1.91082 | 35.25 |
| 7 | 9.533 | 4.966 | | |
| 8 | 376.111 | 0.800 | 1.77250 | 49.65 |
| 9 | 28.891 | 0.602 | | |
| 10* | 28.693 | 2.799 | 1.84666 | 23.78 |
| 11* | −64.608 | 1.000 | | |
| 12 | −39.469 | 0.800 | 1.83481 | 42.72 |
| 13 | 26.388 | 1.835 | 1.84666 | 23.78 |
| 14 | ∞ | Variable | | |
| 15 (Aperture) | ∞ | 0.930 | | |
| 16* | 10.722 | 3.391 | 1.73077 | 40.50 |
| 17* | −91.497 | 2.011 | | |
| 18 | −107.198 | 1.143 | 1.90366 | 31.31 |
| 19 | 7.485 | 4.661 | 1.49700 | 81.61 |
| 20 | −31.084 | Variable | | |
| 21* | 33.824 | 2.923 | 1.58313 | 59.38 |
| 22* | −45.302 | Variable | | |
| 23 | −68.702 | 1.000 | 1.80420 | 46.49 |
| 24 | 61.291 | 1.094 | 1.78472 | 25.72 |

-continued

Unit: mm

| | | | | |
|---|---|---|---|---|
| 25 | 75.683 | Variable | | |
| 26 | 7769.088 | 1.159 | 1.83481 | 42.72 |
| 27 | −331.545 | 11.250 | | |
| 28 | ∞ | 4.200 | 1.51680 | 64.20 |
| 29 | ∞ | BF | | |

Aspherical Surface Data

| | K | A4 | A6 | A8 |
|---|---|---|---|---|
| Surface 10 | 0.00000 | 9.15770E−07 | −2.01406E−07 | −4.84394E−09 |
| Surface 11 | 0.00000 | −5.00636E−05 | −3.22182E−07 | −6.52489E−09 |
| Surface 16 | 0.00000 | −3.91008E−05 | −2.99751E−08 | 2.32568E−09 |
| Surface 17 | 0.00000 | 2.48704E−05 | 2.47912E−07 | 1.66315E−09 |
| Surface 21 | 0.00000 | −7.22289E−05 | −1.94517E−06 | |
| Surface 22 | 0.00000 | −6.45725E−05 | −1.84095E−06 | |

Miscellaneous Data
Zoom Ratio 7.143

| | Wide (W) | Mid (M) | Tele (T) |
|---|---|---|---|
| Focal Length | 14.000 | 37.420 | 100.000 |
| F-number | 3.600 | 5.003 | 5.700 |
| Half-Angle of View (°) | 37.686 | 16.120 | 6.173 |
| Image Height | 9.699 | 10.857 | 10.980 |
| Total Lens Length | 96.397 | 110.203 | 120.000 |
| BF | 1.076 | 1.056 | 0.991 |
| d5 | 1.416 | 12.773 | 24.705 |
| d14 | 20.604 | 9.508 | 1.970 |
| d20 | 8.209 | 8.158 | 9.517 |
| d22 | 3.680 | 3.732 | 2.373 |
| d25 | 0.916 | 14.482 | 19.948 |

Zoom Lens Group Data

| Group | Starting Surface | Focal Length |
|---|---|---|
| 1 | 1 | 49.772 |
| 2 | 6 | −10.075 |
| 3 | 15 | 24.045 |
| 4 | 21 | 33.667 |
| 5 | 23 | −44.370 |
| 6 | 26 | 380.920 |

TABLE 1

| Related Data | Example 1 | Example 2 | Example 3 | Example 4 |
|---|---|---|---|---|
| f1 | 53.02 | 55.08 | 55.32 | 54.58 |
| f2 | −10.79 | −11.41 | −11.76 | −11.71 |
| f3 | 19.16 | 20.82 | 21.86 | 21.83 |
| f4 | 63.59 | 62.77 | 65.53 | 60.41 |
| fv | −19.86 | −20.20 | −18.06 | −17.56 |
| R5A | −66.08 | −86.19 | −54.04 | −45.16 |
| R5B | 22.25 | 21.05 | 23.90 | 23.85 |
| R4A | −968.68 | −802.92 | −940.01 | 2.242E+05 |
| R4B | −35.77 | −35.42 | −36.78 | −34.85 |

TABLE 2

| Values of Formulae | Example 1 | Example 2 | Example 3 | Example 4 |
|---|---|---|---|---|
| (1) |f1/f2| | 4.91 | 4.83 | 4.70 | 4.66 |
| (2) f4/f1 | 1.20 | 1.14 | 1.18 | 1.11 |
| (3) |f4/fv| | 3.20 | 3.11 | 3.63 | 3.44 |
| (4) f4/f3 | 3.32 | 3.01 | 3.00 | 2.77 |
| (5) (R5A + R5B)/(R5A − R5B) | 0.50 | 0.61 | 0.39 | 0.31 |
| (6) (R4A + R4B)/(R4A − R4B) | 1.08 | 1.09 | 1.08 | 1.00 |

TABLE 3

| Related Data | Example 5 | Example 6 | Example 7 |
|---|---|---|---|
| M | 2 | 1 | 2 |
| N | 5 | 4 | 5 |
| fv | −56.967 | −91.689 | −48.314 |
| f2 | −10.103 | −10.516 | −10.075 |
| rA | −46.624 | −35.026 | −39.469 |
| rB | ∞ | −152.535 | ∞ |
| ft | 100.000 | 70.000 | 100.000 |
| Ymax | 10.815 | 10.815 | 10.815 |
| Vd | — | 81.610 | — |
| f5 | −34.395 | −35.715 | −44.370 |
| f3 | 22.659 | 20.050 | 24.045 |
| M5 | 15.261 | 10.985 | 19.032 |
| f4 | 33.143 | 42.604 | 33.667 |
| M4 | 15.863 | 11.645 | 17.725 |

TABLE 4

| Values of Formulae | Example 5 | Example 6 | Example 7 |
|---|---|---|---|
| (7) M/N | 0.40 | 0.25 | 0.40 |
| (8) fv/f2 | 5.64 | 8.72 | 4.80 |
| (9) (rA + rB)/(rA − rB) | −1.00 | −1.60 | −1.00 |
| (10) ft/Ymax | 9.25 | 6.47 | 9.25 |
| (11) Vd | — | 81.61 | — |
| (12) f5/f3 | −1.52 | −1.78 | −1.85 |
| (13) M5/f5 | −0.44 | −0.31 | −0.43 |
| (14) f4/f3 | 1.46 | 2.12 | 1.40 |
| (15) M4/M5 | 1.04 | 1.06 | 0.93 |

What is claimed is:

1. A variable-magnification optical system comprising, from an object side, a first lens group having a positive optical power, a second lens group having a negative optical power, a third lens group having a positive optical power, a fourth lens group having a positive optical power, and a fifth lens group having a negative optical power, the variable-magnification optical system achieving magnification variation by varying axial distances between the lens groups, the variable-magnification optical system achieving focusing by moving the fourth lens group along an optical axis, the variable-magnification optical system achieving vibration correction by moving a sub group including a most image-side lens element within the second lens group on a plane perpendicular to an optical axis, wherein Formulae (7), (8a), and (14) below are fulfilled:

$$M/N<0.5 \quad (7)$$

$$4.0<fv/f2<10.0 \quad (8a)$$

$$1.0<f4/f3<4.0 \quad (14)$$

where

M represents a number of lens elements composing the sub group;

N represents a number of lens elements composing the second lens group, lens elements constituting a doublet lens element being counted individually:

fv represents a focal length of the sub group;

f2 represents a focal length of the second lens group;

f3 represents a focal length of the third lens group; and f4 represents a focal length of the fourth lens group.

2. The variable-magnification optical system according to claim 1, wherein Formula (9) below is fulfilled:

$$-4.0<(rA+rB)/(rA-rB)<-0.7 \quad (9)$$

where
- rA represents a radius of curvature of a most object-side surface in the sub group; and
- rB represents a radius of curvature of a most image-side surface in the sub group.

3. The variable-magnification optical system according to claim 1,
wherein an aspherical surface is arranged to an object side of the sub group within the second lens group.

4. The variable-magnification optical system according to claim 1,
wherein the sub group is composed of a single negative lens element, and Formula (10) below is fulfilled:

$$ft/Y\max<7.5 \tag{10}$$

where
- ft represents a total focal length of the variable-magnification optical system at a telephoto end; and
- Ymax represents a maximum image height in terms of an ideal image height excluding distortion, being a quantity fulfilling a relationship $\omega=\tan^{-1}(Y\max/f)$, where f represents the total focal length of the variable-magnification optical system and w represents a half-angle of view.

5. The variable-magnification optical system according to claim 1,
wherein the third and fifth lens groups move integrally during magnification variation.

6. The variable-magnification optical system according to claim 1,
wherein Formula (12) below is fulfilled:

$$-4.0<f5/f3<-0.8 \tag{12}$$

where
f5 represents a focal length of the fifth lens group.

7. The variable-magnification optical system according to claim 1,
wherein Formula (13) below is fulfilled:

$$-1.0<M5/f5<-0.1 \tag{13}$$

where
- M5 represents a distance along the optical axis from a position of the fifth lens group at a wide-angle end and a position of the fifth lens group at a telephoto end; and
- f5 represents a focal length of the fifth lens group.

8. The variable-magnification optical system according to claim 1,
wherein Formula (15) below is fulfilled:

$$0.5<M4/M5<1.5 \tag{15}$$

where
- M4 represents a distance along the optical axis from a position of the fourth lens group at a wide-angle end to a position of the fourth lens group at a telephoto end; and
- M5 represents a distance along the optical axis from a position of the fifth lens group at the wide-angle end to a position of the fifth lens group at the telephoto end.

9. An imaging optical device comprising the variable-magnification optical system according to claim 1 and an image sensing device for converting an optical image formed on a light-receiving surface thereof into an electrical signal, wherein the variable-magnification optical system is arranged such that an optical image of a subject is formed on the light-receiving surface of the image sensing device.

10. A digital appliance comprising the imaging optical device according to claim 9 so as to additionally have at least one of a function of taking a still image of a subject and a function of taking a moving image of a subject.

* * * * *

UNITED STATES PATENT AND TRADEMARK OFFICE
CERTIFICATE OF CORRECTION

PATENT NO. : 10,007,099 B2  
APPLICATION NO. : 15/183494  
DATED : June 26, 2018  
INVENTOR(S) : Souma Page 1 of 1

It is certified that error appears in the above-identified patent and that said Letters Patent is hereby corrected as shown below:

On the Title Page

Item (12) "Yamada , et al." should read -- Souma --.

Item (72) should read -- Inventor(s): Yoshihito Souma --.

Signed and Sealed this  
Thirty-first Day of March, 2020

Andrei Iancu  
*Director of the United States Patent and Trademark Office*